United States Patent [19]
Morimoto et al.

[11] Patent Number: 5,868,234
[45] Date of Patent: Feb. 9, 1999

[54] TRANSFER DEVICE FOR TRANSFERRING SOLID ARTICLES

[75] Inventors: Shuji Morimoto, Suita; Junichi Kikuta, Osaka; Takeichiro Sogo, Ashiya, all of Japan

[73] Assignees: Takeda Chemical Industries, Ltd.; Unimetal Co., Ltd., both of Osaka, Japan

[21] Appl. No.: 591,031

[22] Filed: Jan. 25, 1996

[30] Foreign Application Priority Data

| Jan. 26, 1995 | [JP] | Japan | 7-010701 |
| Feb. 3, 1995 | [JP] | Japan | 7-017311 |
| Jul. 31, 1995 | [JP] | Japan | 7-194587 |
| Aug. 18, 1995 | [JP] | Japan | 7-210478 |
| Oct. 13, 1995 | [JP] | Japan | 7-26067 |

[51] Int. Cl.$^6$ .................................................. B65G 11/06
[52] U.S. Cl. ............................................................ 193/12
[58] Field of Search .................................................. 193/12

[56] References Cited

U.S. PATENT DOCUMENTS

| 1,800,067 | 4/1931 | Godinez | 193/12 |
| 2,766,002 | 10/1956 | Banks . | |
| 3,278,054 | 10/1966 | Stott | 193/12 |
| 3,565,226 | 2/1971 | Winchester | 193/12 |
| 3,976,176 | 8/1976 | Kurtz et al. | 193/12 |
| 4,726,456 | 2/1988 | Hogsett | 193/12 |
| 5,083,651 | 1/1992 | Wiese | 193/12 |

FOREIGN PATENT DOCUMENTS

| 350467 | 6/1979 | Austria . | |
| 61-127420 | 6/1986 | Japan . | |
| 3-13153 | 2/1991 | Japan . | |
| 6-135522 | 5/1994 | Japan . | |
| 7-309411 | 11/1995 | Japan . | |
| 167978 | 6/1934 | Switzerland . | |
| 219863 | 8/1924 | United Kingdom | 193/12 |
| 599284 | 3/1948 | United Kingdom | 193/12 |
| 2220927 | 1/1990 | United Kingdom | 193/12 |

*Primary Examiner*—Karen M. Young
*Assistant Examiner*—Thuy V. Tran
*Attorney, Agent, or Firm*—Wenderoth, Lind & Ponack, L.L.P.

[57] ABSTRACT

A transfer device for transferring solid articles, comprising: a cylindrical member which has a supply opening formed at one end portion and a discharge opening formed at the other end portion, such that an angle formed between an axis of the cylindrical member and a horizontal plane is not more than 75°; a transfer member which is rotatably provided in the cylindrical member; the transfer member including a rotary shaft extending along the axis of the cylindrical member and a helical vane projecting from a peripheral surface of the rotary shaft such that lead angle of the helical vane at its outer peripheral edge ranges from 3° to 25°; and a drive member so as to rotate the transfer member about the axis of the cylindrical member at a rotational speed of not more than 500 r.p.m.

65 Claims, 57 Drawing Sheets

TRANSFER DEVICE FOR TRANSFERRING SOLID ARTICLES

BACKGROUND OF THE INVENTION

The present invention generally relates to transfer devices in which solid articles such as tablets, capsules, granules and powders are transferred efficiently along a transfer face of a helical vane provided in a cylindrical member without causing damage to the solid articles. More particularly, this invention relates to a transfer device in which the fluidity of the solid articles is raised and moisture absorption of the solid articles is prevented during their transfer, while also facilitating efficient removal of dust or other foreign particles, mixed into transfer space, and efficient rinsing and drying of the transfer device at the time of its maintenance.

Generally, in production processes of solid articles such as granules and powders, the solid articles are transferred horizontally, upwardly or downwardly and between neighboring production processes. Meanwhile, since the surfaces of pharmaceutical tablets or capsules are readily damaged by external force applied during their transfer so as to be subjected to cracks or chips and since the entry of foreign matter into the pharmaceutical tablets or capsules should be prevented such that strict quality level of the pharmaceutical tablets or capsules is required to be maintained, great care should be given to their transfer.

Conventionally, in order to transfer solid articles such as tablets, mechanical transfer devices have been employed and include a bucket conveyor, an inclined belt conveyor and a brush conveyor disclosed, for example, in Japanese Patent Publication No. 3-13153 (1991).

As shown in FIG. 1, the prior art bucket conveyor includes a number of buckets 202 mounted on a vertically circulating conveyor 201. Solid articles supplied from a discharge opening 204 of a preceding process 203 are received by a bucket 202 disposed below. Bucket 202 is then conveyed upwardly by a belt conveyor 201 such that the solid articles accommodated in the bucket 202 are discharged to a supply opening 207 of the next process 206.

However, in the prior art bucket conveyor, since the solid articles are supplied into or discharged from the bucket, the solid articles are readily subjected to impact at the time of their supply or discharge so as to be damaged on their surfaces, thereby resulting in a risk of cracks or chips of the solid articles. Therefore, it is especially difficult to use the prior art bucket conveyor for transfer of pharmaceuticals. Meanwhile, disassembly, assembly and maintenance of the bucket conveyor cannot be performed easily. Furthermore, it is extremely difficult to rinse the bucket conveyor in its assembled state and the bucket conveyor cannot be rinsed with water. Hence, when solid articles of one kind are replaced by solid articles of another kind, mutual contamination may take place. Therefore, troublesome cleaning operation, in which several workers manually wipe over the bucket conveyor for a long period of time is necessary. Thus, the replacement of the solid articles of one kind by the solid articles of another kind is not easy. In addition, since a transfer path of the solid articles opens outwardly, the bucket conveyor can be neither converted to in-line application nor closed, thereby resulting in the risk of entry of foreign matter into the bucket conveyor.

As shown in FIG. 2, the prior art inclined belt conveyor 214 includes a supply portion 211 and a discharge portion 212, which are both disposed horizontally, and an upwardly inclined intermediate portion 213. Solid articles supplied from a preceding process 215, to the supply portion 211 disposed below, are transferred upwardly by the belt conveyor 214 and then, discharged from the upper discharge portion 212 to a supply opening 217 of the next process 216.

Disassembly and assembly of the prior art inclined belt conveyor 214 are also not easy. Furthermore, the inclined belt conveyor 214 in its assembled state cannot be rinsed with water. Thus, the prior art inclined belt conveyor 214 has drawbacks similar to those of the prior art bucket conveyor.

As shown in FIG. 3, the prior art brush conveyor includes an inclined cylindrical member 221 having a supply opening 223 and a discharge opening 225, formed at its lower portion 222 and its upper portion 224, respectively. A helical coil 226 is fixed to an inner surface of the cylindrical member 221 and a rotary brush 228 is rotatably provided along an axis 227 of the cylindrical member 221. Solid articles supplied into the supply opening 223 from a preceding process are pushed outwardly by the rotary brush 228 so as to be rotated along the inner surface of the cylindrical member 221. Since the helical coil 226 is fixed to the inner surface of the cylindrical member 221, the solid articles are transferred upwardly along the coil 226 so as to be discharged to the next process from the upper discharge opening 225. This prior art brush conveyor has the advantage of being easily converted into in-line application or being closed.

However, in the prior art brush conveyor, since the solid articles are depressed against the inner surface of the cylindrical member 221 during their transfer by the rotary brush 228, so as to be rubbed against the inner surface of the cylindrical member 221, the solid articles may be damaged on their surfaces. Accordingly, it is difficult to use the prior art brush conveyor for transfer of pharmaceutical tablets or the like. Meanwhile, in the prior art brush conveyor, if the solid articles penetrate into the rotary brush 228, so as to be brought out of contact with the coil 226, the solid articles are merely rotated about the axis 227 of the cylindrical member 221. Thus, the solid articles cannot be transferred upwardly along the coil 226. In other words, only a portion of the solid articles, those which remain adjacent to the inner surface of the cylindrical member 221, are transferred, thereby resulting in poor transfer efficiency.

Furthermore, in the prior art brush conveyor, since only a portion of the solid articles, are transferred upwardly, friction between the solid articles and the coil 226 must be increased. For example, in the case of sugar-coated tablets, if the angle of inclination of the cylindrical member 221 is set at 20° or more, the solid articles cannot be transferred upwardly even if the number of revolutions of the rotary brush 228 is raised. In addition, since it is desirable that the friction between the solid articles and the coil 226 be minimized to prevent damage to the solid articles, high friction of the solid articles with the coil 226 for transferring the solid articles upwardly and low friction of the solid articles with the coil 226 for preventing damage to the solid articles are contradictory to each other. Consequently, in the prior art brush conveyor, if the solid articles are to be transferred without causing damage to the solid articles, the angle of inclination of the cylindrical member 221 cannot be increased.

Meanwhile, in order to solve the above mentioned problems of the conventional transfer devices, the applicant disclosed in, for example, Japanese Patent Application Nos. 6-211100 (1994) and 7-194587 (1995), shown in FIG. 4, a transfer device 230 which is capable of transferring solid articles, such as tablets, efficiently without causing damage to the solid articles, is closed as a whole so as to enable so-called in-line rinsing in its assembled state, which may be disassembled and assembled simply through reduction of the number of its components, and which may be easily maintained. This transfer device 230 includes a cylindrical member 232 having a supply portion 231 provided at one end, a central shaft 234 extending through an axis 233 of the cylindrical member 232 and a helical vane 235 provided around the central shaft 234. A transfer space 236 is defined between a peripheral surface of the central shaft 234 and an inner surface of the cylindrical member 232. A transfer face 237 is formed on one of the opposite faces of the helical vane 235 such that solid articles 238 supplied into the transfer space 236 from the supply portion 231 can be transferred along the transfer face 237 towards the other end of the cylindrical member 232.

As shown in FIG. 4, where the solid articles 238 are to be transferred vertically downwardly, the helical vane 235 is not required to be rotated. In other words, the solid articles 238 are gravitationally transferred while helically turning around the central shaft 234. On the other hand, where the solid articles 238 are to be transferred horizontally or upwardly, the axis 233 of the cylindrical member 232 is set to a transfer direction and the helical vane 235 is rotated about the axis 233 of the cylindrical member 232, so that the solid articles 238 are displaced along the central shaft 234 so as to be transferred.

In the known transfer device 230 referred to above, since the solid articles 238 are integrally transferred without much change of relative position, the solid articles 238 can be transferred efficiently without being subjected to external force such as impact force. Furthermore, since the transfer space 236 is covered by the cylindrical member 232, the transfer device 230 can be closed easily. Thus, in-line rinsing of the transfer device 230 can be performed. Furthermore, since the number of components of the transfer device 230 is quite small, maintenance, such as disassembly and assembly, can be performed easily. However, the known transfer device 230 has the following inconveniences (1) to (5).

(1) Since the solid articles 238 are displaced on the transfer face 237 formed on one face of the helical vane 235, the surfaces of solid articles 238 may be damaged if frictional force applied from the transfer face 237 to the solid articles 238 becomes extremely large. Such may be the case where the transfer rate of the solid articles 238 is increased.

(2) Where the solid articles 238 are formed by powder, the so-called bridging phenomenon of the powder may occur, thereby resulting in the risk of clogging the transfer space 236.

(3) Since the transfer space 236 is enclosed within the cylindrical member 232, the flow of ambient gas of the solid articles 238 is small. Therefore, the solid articles 238 are likely to absorb moisture due to the rise of humidity in the transfer space 236 and thus, may lose their superficial gloss or be deformed. For example, when humidity reaches 80%, the external appearance of sugar-coated tablets may be injured due to dissolution of the surfaces of the sugar-coated tablets or loss of gloss of the of the sugar-coated tablets.

(4) Since the flow of ambient gas of the solid 238 is small, it is difficult to remove dust and other foreign matters mixed in between the solid articles 238.

(5) As the transfer face 237 is formed on one face of the helical vane 235, the helical vane 235 has corner portions in the vicinity of the central shaft 234. Since it is difficult to pass cleaning fluid and drying air through the corner portions, the corner portions of the helical vane 235 cannot be rinsed or dried easily.

Moreover, the present invention also relates to a transfer device acting as a supply device for supplying solid articles into a vessel which is provided with the supply device. More particularly, the present invention relates to a supply device for supplying pharmaceutical tablets such as sugar-coated tablets, uncoated tablets and film coated tablets, pharmaceutical solid articles such as granules, powders and capsules or solid articles such as candies into various vessels including transfer vessels such as a container, a tank and a flow bin, a tank, a drum, and a hopper and where the vessel is provided with the supply device.

Where pharmaceutical tablets, such as sugarcoated tablets, uncoated tablets and film coated tablets, pharmaceutical solid articles, such as granules, powders and capsules or solid articles, such as candies, are supplied into a container, the solid articles may strike a bottom of the container or impinge upon one another thereby resulting in failures, cracks or chips on surfaces of the solid articles. Especially in the case of pharmaceutical tablets, defects such as cracks and chips pose a serious problem. Accordingly, various attempts to mitigate the impact of the fall have been made.

For example, in a container 241 formed by a flow bin as shown in FIG. 5, a plurality of flat plates (baffles) 242 inclined towards a bottom 241b of the container 241 are provided in the container 241 at multiple stages from a supply opening 241a. Solid articles 243 are supplied into the container 241 from the supply opening 241a and fall to the bottom 241b while sequentially hitting the baffles 242. However, by adding baffles 242 the container 241 becomes structurally complicated. Furthermore, since the baffles 242 are required to be attached to the interior of the container 241 by welding, production costs of the container 241 rise. In addition, it becomes more difficult to rinse the container 241, even in its disassembled state. Meanwhile, it is impossible to prevent impacts even though the solid articles 243 fall onto the baffles 242. In addition, since the container 241 is not suitable for storing fine powder, it is difficult to use the container 241 for both pharmaceutical tablets and powdery solid articles.

On the other hand, a device shown in FIG. 6 is disclosed in Japanese Patent Laid-Open Publication No. 6-135522 (1994). This known device includes a cylindrical member 255 standing vertically from the vicinity of the bottom of a container (not shown). A plurality of screw members 257, each formed with a helical groove 256, are provided in the cylindrical member 255 so as to be spaced a predetermined interval from each other by a collar 258. Meanwhile, an upper lid 259 having an inlet 259a is mounted on an upper end of the cylindrical member 25S and a lower lid 260 having an outlet 260a is mounted on a lower end of the cylindrical member 255. Furthermore, openings 255a and 255b are formed at portions of a side wall of the cylindrical member 255, which correspond to the collars 258, respectively. Solid articles are supplied into the cylindrical member 255 from the inlet 259a. The solid articles are, in turn, guided by the helical groove 256 while being turned helically so as to fall into the container from the outlet 260a. When the solid articles have accumulated on the bottom of the container, the outlet 260a is closed by the accumulated solid articles. Thus additional solid articles supplied from the inlet 259a remain in the helical groove 256 of the lowermost screw member 257. If solid articles are further supplied into the cylindrical member 255 from the inlet 259a, the solid articles remaining in the helical groove 256 of the lowermost screw member 257 eventually reach the lower opening 255a and are, in turn, discharged from the opening 255a. If the solid articles are further accumulated in the cylindrical member 255 so as to close the opening 255a, the solid articles remaining in the helical groove 256 of the intermediate screw member 257 rise and thus, are discharged from the upper opening 255b. In the known device of FIG. 6, as the amount of accumulated solid articles increases, the solid articles are discharged sequentially first from the outlet 260a, then from the lower opening 255a and finally from the upper opening 255b.

However, in the device of FIG. 6, since the solid articles still must fall into the container or out of openings 255a and 255b, the solid articles may be subjected to cracks or chips in dependence of their strength. In this device, the solid articles are not discharged into the container until the solid articles remaining in the helical groove 256 reach the upper opening 255b after the outlet 260a and the lower opening 255a have been closed by the accumulated solid articles. Furthermore, in this device, based on conditions such as size of the openings 255a and 255b, positions of the openings 255a and 255b, the type of the solid articles to be supplied, the amount of the solid articles supplied per unit period, a phenomenon may occur in which the solid articles fall into the container from the openings 255a and 255b before sufficient solids have accumulated at outlet 206a. If the solid articles fall from the openings 255a and 255b as described above, the solid articles may be subjected to failures, cracks and chips.

Furthermore, in this device, since the only portions of the cylindrical member 255 which remain open are the inlet 259a, the outlet 260a, and the openings 255a and 255b little ventilation in the helical groove 256 occurs, so that the solid articles may be damped. Especially, in the case of sugar-coated tablets not subjected to sufficient cool drying after the coating process. In this case, the tablets may be damped according to ambient conditions such as temperature, so that water may condense on the coated surfaces of the tablets, thereby resulting in loss of gloss of the surfaces of the tablets. Another problem occurs printed if the solid articles are damped. A printed portion of one solid article may impinge upon a nonprinted portion of another solid article at the time of the fall so as to transfer the print of one solid article to a nonprinted portion of the other. Moreover, since the solid articles are discharged from a plurality of openings 255a and 255b, the amount of supply of tablets and the types of the usable tablets are restricted.

The device of FIG. 7, disclosed by application in Japanese Patent Laid-Open Publication No. 61-127420 (1986), shows a transfer device acting as a supply device which includes a helical chute 281 for guiding tablets and a lift means 282 for displacing the helical chute 281 upwardly while rotating the helical chute 281 in a predetermined direction. In this prior art supply device, the amount of solid articles accumulated in a container 283 increases as the lowermost position of the helical chute 281 is lifted, such that the falling distance of the solid articles is maintained at a predetermined value.

In the conventional supply device of FIG. 7, since the direction of discharge of the solid articles 273 into the container 283 changes in response to the rotation of the helical chute 281, the solid articles 273 are uniformly accumulated in the container 283. Moreover, since the solid articles 273 are discharged from a lower end of the helical chute 281 continuously, efficiency for supplying the solid articles 273 is excellent. However, since the lift means 282 and a control means for controlling the lift means 282 are required, the conventional supply device is structurally complicated. Thus, it is difficult to perform maintenance checks and production cost tend to be high.

SUMMARY OF THE INVENTION

Accordingly, an essential object of the present invention is to provide, with a view to eliminating the above mentioned disadvantages of the prior art, a transfer device for transferring solid articles, in which the fluidity of the solid articles is raised and the moisture absorption of the solid articles is prevented during their transfer, such that not only the removal of dust, and foreign matter mixed into the transfer space but also the rinsing and drying of the transfer device at the time of its maintenance can be performed efficiently.

Another object of the present invention is to provide a transfer device which is capable of efficiently transferring the solid articles without causing damage to the solid articles, which can be closed as a whole to enable in-line rinsing in its assembled state and can be disassembled or assembled simply through a substantial reduction of the number of its components and whose maintenance and service can be performed easily.

A further object of the present invention is to provide a transfer device for supplying solid articles into a vessel, which is capable of uniformly supplying the solid articles into the vessel while also obviating defects such as flaws, cracks and chips on surfaces of the solid articles and is structurally simple so as to undergo maintenance checks easily.

Yet another object of the present invention is to provide a transfer device which prevents deterioration of the quality of the solid articles due to dampness of the solid articles during their supply and which prevents the staining of the solid articles during the transfer solid articles.

In order to accomplish these objects of the present invention, a transfer device for transferring solid articles, according to one embodiment of the present invention comprises: a cylindrical member which has a supply opening formed at one end portion and a discharge opening formed at the other end portion respectively, such that an angle formed between an axis of the cylindrical member and a horizontal plane is not more than 75°; a transfer member which is rotatably provided in the cylindrical member; the transfer member including a rotary shaft extending along the axis of the cylindrical member and a helical vane projecting from a peripheral surface of the rotary shaft such that a lead angle of the helical vane at its outer peripheral edge ranges from 3° to 25°; and a drive member which is coupled with the rotary shaft of the transfer member so as to rotate the transfer member about the axis of the cylindrical member at a rotational speed of not more than 500 r.p.m.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 8:
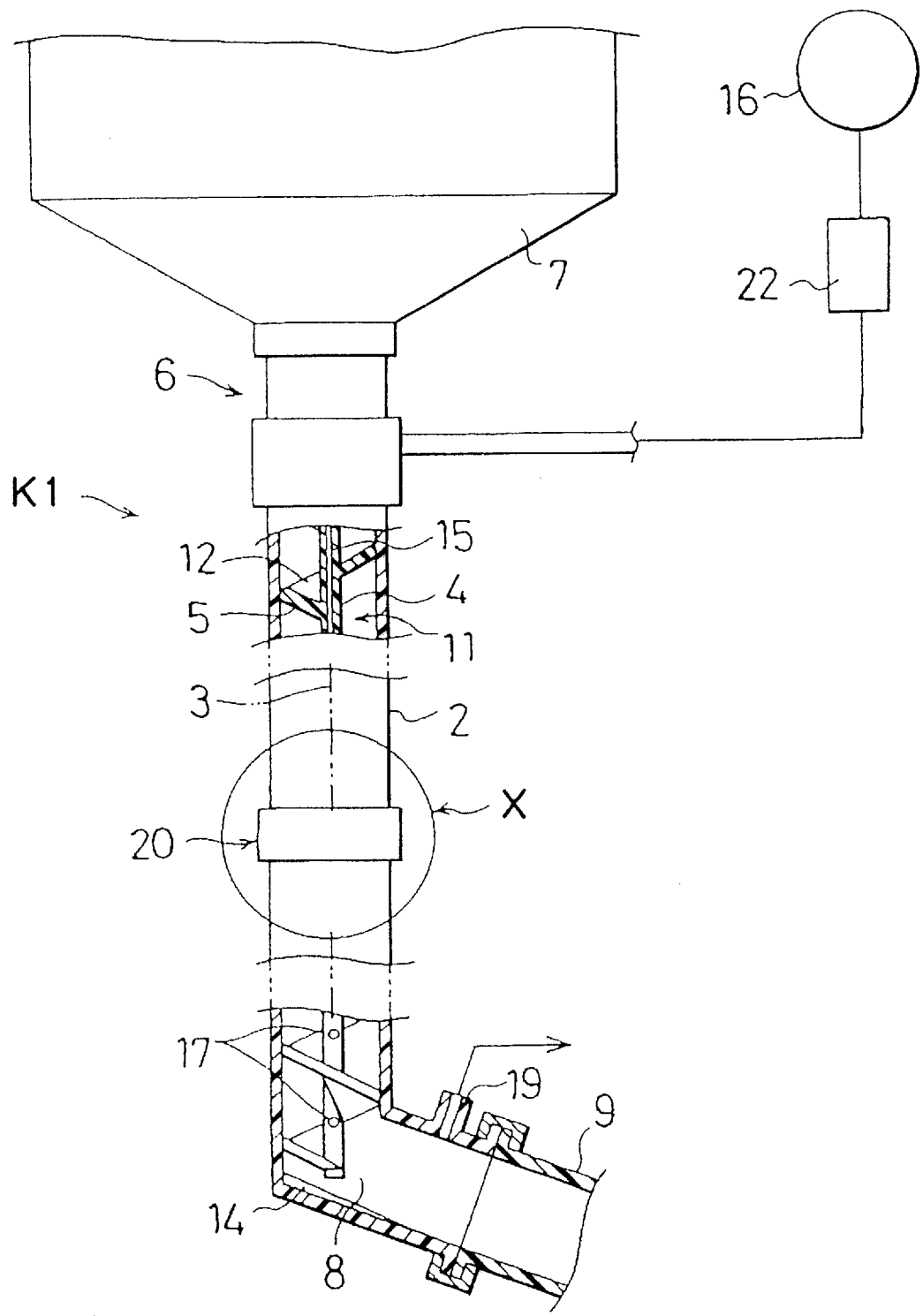
FIG. 8 is a partially broken front elevational view of a transfer device for transferring solid articles, according to a first embodiment of the present invention.
Figure 9:
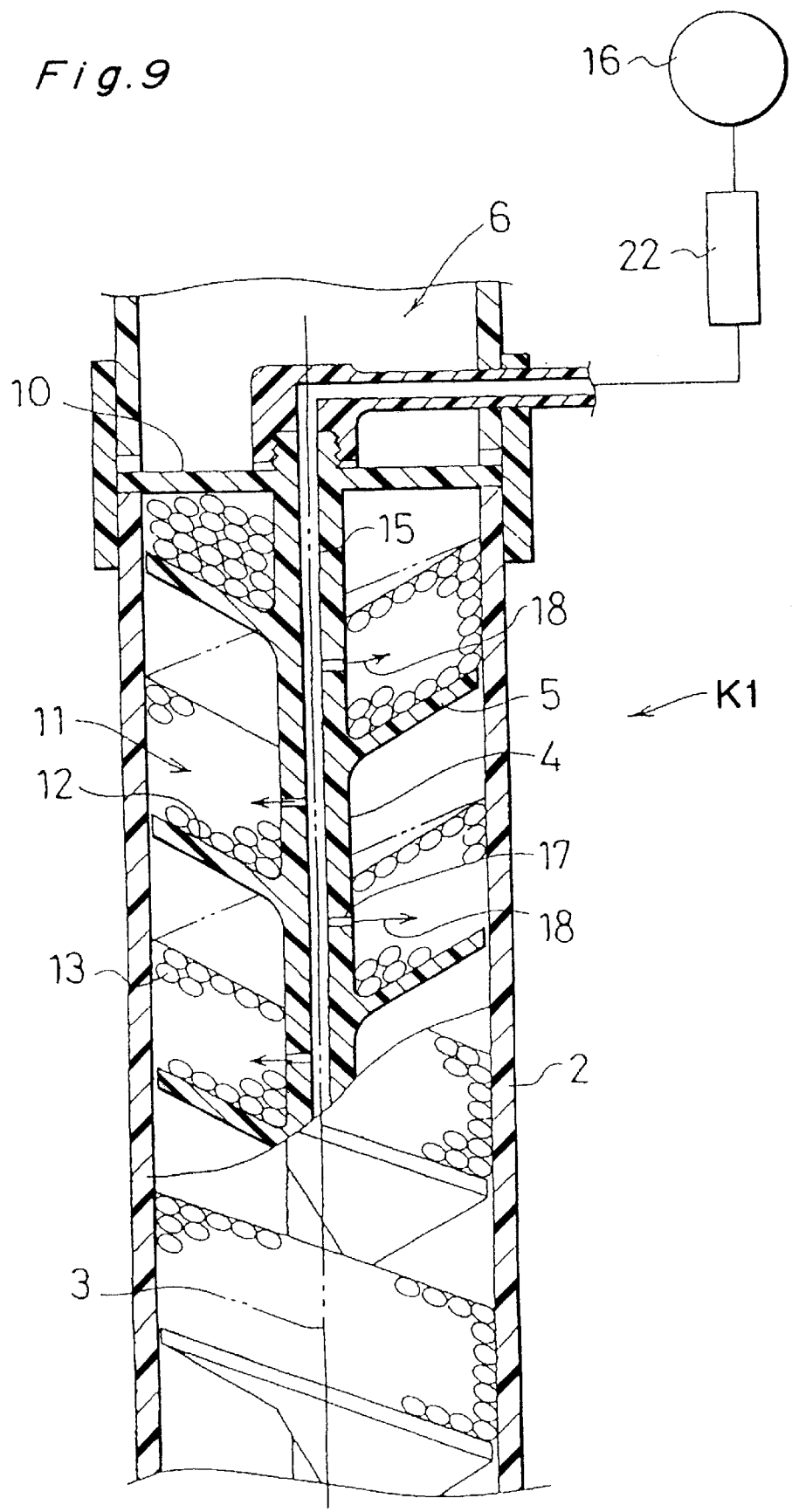
FIG. 9 is a sectional view of a supply portion of the transfer device of FIG. 8.
Figure 10:
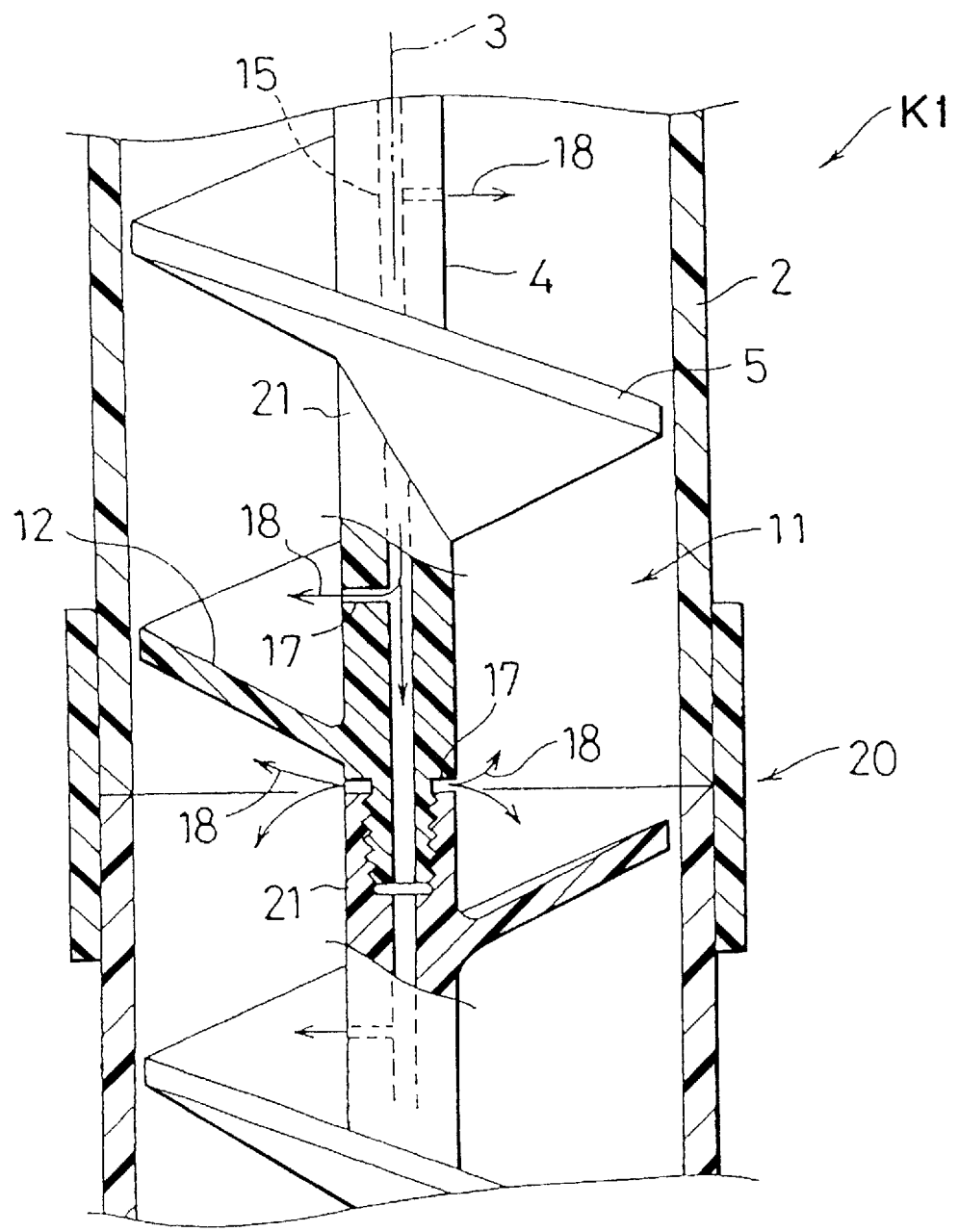
FIG. 10 is an enlarged sectional view of a portion X in FIG. 8.

Referring now to the drawings, there is shown in FIGS. 8 to 10, a transfer device K1 for transferring tablets 13, according to a first embodiment of the present invention. As shown in FIG. 8, the transfer device K1 includes a cylindrical member 2 disposed vertically, a central shaft 4 extending through an axis 3 of the cylindrical member 2 and a helical vane 5 integrally projecting radially outwardly from a peripheral surface of the central shaft 4. A supply portion 6 and a discharge portion 8 are, respectively, provided at an upper end portion and a lower end portion of the cylindrical member 2. A hopper 7 is mounted on the supply portion 6, while a discharge pipe 9 leading to a next process is coupled with the discharge portion 8. Meanwhile, as shown in FIG. 9, a rod 10 secured to an upper end portion of the central shaft 4 is detachably brought into engagement with an upper end of the cylindrical member 2. Thus, the central shaft 4 and the helical vane 5 are non-rotatably fixed in the cylindrical member 2.

A helical transfer space 11 is defined between the peripheral surface of the central shaft 4 and an inner surface of the cylindrical member 2. Additionally, a transfer face 12 is formed on an upper face of the helical vane 5. The tablets 13 supplied into the transfer space 11 from the supply portion 6 fall slidingly along the transfer face 12 towards the lower end portion of the cylindrical member 2. The tablets are then discharged from the discharge portion 8 to the next process via the discharge pipe 9. Meanwhile, cushioning medium 14 reduces the impact of the tablets 13 falling from the discharge portion 8.

An air passage 15 is formed in the central shaft 4 extending along the axis 3 of the cylindrical member 2. An upper end of the air passage 15 is connected with a compressor 16 acting as a supply source of pressurized air 18. A plurality of injection holes 17 communicating with the air passage 15 are formed on the peripheral surface of the central shaft 4, centrifugally from the axis 3 of the cylindrical member 2. Thus, injection holes 17 open the transfer space 11 such that the low-humidity pressurized air 18 from the compressor 16 can be injected into the transfer space 11 from the injection holes 17.

The pressurized air 18 injected into the transfer space 11 from the injection holes 17 flows into gaps among the tablets 13 or gaps between the transfer face 12 and peripheries of the tablets 13. Thus reducing the frictional force applied to the tablets 13 such that the fluidity of the tablets 13 is raised. At this time, it is best to utilize a low temperature pressurized air 18 as a low temperature pressurized air 18 better absorbs heat generated during transfer of tablets 13, thereby resulting in the prevention of damage to the tablets 13 due to the frictional heat.

Meanwhile, since the pressurized air 18 expels high-humidity gas or dust surrounding the tablets 13, humidity around the tablets 13 is lowered. Thus, the loss of gloss on surfaces of the tablets 13 and the deformation of the tablets 13 can be prevented. In addition, dust and other particles mixed into gaps among the tablets 13 are expelled by the pressurized air 18 and thus, can be easily separated from the tablets 13. The high-humidity gas or dust expelled by the pressurized air 18 is discharged out of the transfer space 11 from the supply portion 6 or an optional vent hole 19.

As shown in FIG. 8, each of the cylindrical member 2, the central shaft 4 and the helical vane 5 is constituted by a plurality of sections coupled, at a coupling portion 20, with one another in series. Namely, as shown in FIG. 10, the central shaft 4 is constituted by a plurality of shaft sections 21 coupled with each other in series. The annular injection hole 17 is formed at the coupling portion 20 of the shaft sections 21. The pressurized air 18 injected from this annular injection hole 17 prevents entry of dust or other particles into the coupling portion 20 of the shaft sections 21.

In the event that transfer device K1 is subjected to in-line rinsing without being disassembled, cleaning fluid is filled in the cylindrical member 2 and the pressurized air 18 is injected from the injection holes 17. As a result, since the pressurized air 18 is set to bubbling state, the so-called bubbling phenomenon occurs, so that turbulent flow is produced in the cleaning fluid in the transfer space 11 separating deposits from the peripheral surface of the central shaft 4 and a surface of the helical vane 5. Thus, the transfer device K1 can be rinsed easily. The helical vane 5 can then be rotated about the axis 3 of the cylindrical member 2. An outer peripheral edge of the helical vane 5, which confronts a circumferential position on the inner surface of the cylindrical member 2, is thus displaced vertically resulting in the complete rinsing of the inner surface of the cylindrical member 2.

When rinsing of the transfer device K1 has been completed, the cleaning fluid is discharged from the cylindrical member 2 and dry pressurized air 18 is injected from the injection holes 17 so as to expel high-humidity air from the transfer space 11. Thus, the peripheral surface of the central shaft 4, the surface of the helical vane 5, and the inner surface of the cylindrical member 2 are dried. The pressurized air 18 may be heated by a heating device 22 beforehand, thus resulting in a more rapid drying.

Figure 11:
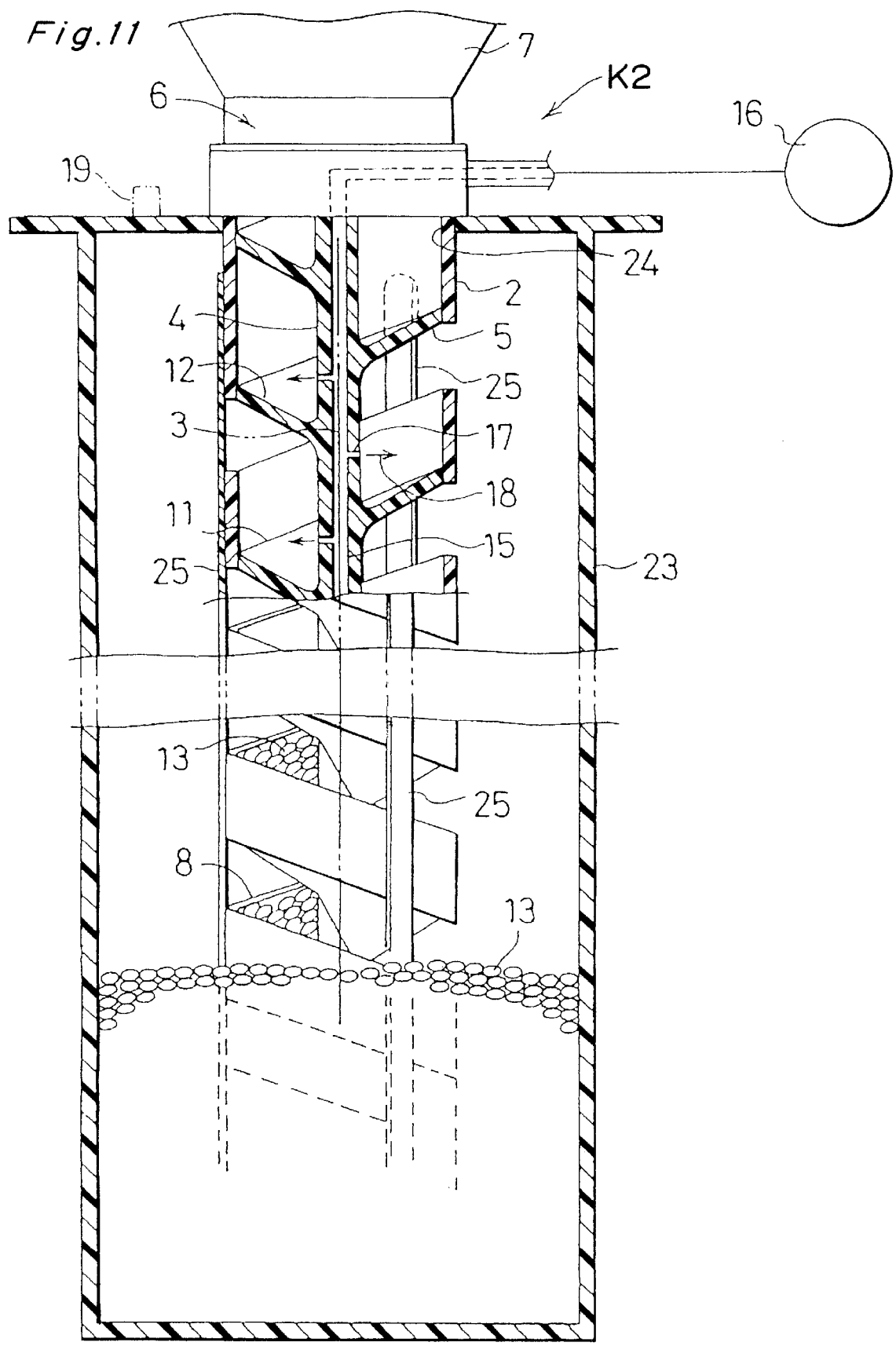
FIG. 11 is a partially broken front elevational view of a transfer device according to a second embodiment of the present invention.

FIG. 11 shows a transfer device K2 according to a second embodiment of the present invention. The transfer device K2 is suitable for supplying the tablets 13 into a storage container 23 such as a flow bin. In the second embodiment, the transfer device K2 is mounted on an opening 24 disposed at an upper end of the storage container 23 and includes the cylindrical member 2 disposed vertically, the central shaft 4 extending through the axis 3 of the cylindrical member 2 and the helical vane 5 integrally projecting radially outwardly from the peripheral surface of the central shaft 4.

In the same manner as the first embodiment, the central shaft 4 and the helical vane 5 of the transfer device K2 are non-rotatably fixed in the cylindrical member 2. Furthermore, the supply portion 6 is provided at the upper end portion of the cylindrical member 2 and the hopper 7 is mounted on the supply portion 6. In addition, helical discharge portions 8 are formed on a peripheral surface of the cylindrical member 2 along the helical vane 5 and upwardly of the transfer face 12. Reference numeral 25 denotes a fixing piece for maintaining the width of an opening of the helical discharge portion 8 at a predetermined dimension. The fixing pieces 25 are provided at three locations on the peripheral surface of the cylindrical member 2.

The tablets 13 supplied from the supply portion 6 fall without impact while being helically transferred on the transfer face 12. The tablets eventually reach a lower portion of the storage container 23 and are then discharged from the discharge portion 8. When the discharge portions 8 are clogged from below by the tablets 13 in the storage container 23, the falling tablets 13 are collected in the cylindrical member 2 and then overflow from a lower end of remaining unclogged discharge portions 8.

In the same manner as the first embodiment, the air passage 15 is formed in the central shaft 4 extending along the axis 3 of the cylindrical member 2. The upper end of the air passage 15 is connected with a compressor 16 which acts as the supply source of the pressurized air 18. Moreover, a plurality of the injection holes 17 communicating with the air passage 15 are formed on the peripheral surface of the central shaft 4 opening to the transfer space 11.

The pressurized air 18 injected into the transfer space 11 from the injection holes 17 flows into gaps among the tablets 13 and into gaps between the transfer face 12 and peripheries of the tablets 13 functioning in the same manner as the first embodiment. High-humidity air or dust expelled by this pressurized air 18 is discharged upwardly from the supply portion 6 or is discharged outwardly, through the helical discharge portions 8, from the optional vent hole 19 provided at the upper end of the storage container 23. Meanwhile, cleaning may occur with the transfer device K2 mounted on a closed vessel such as the storage container 23. The transfer device K2 is simply rinsed by introducing cleaning fluid into the cylindrical member 2 and then dried.

Figure 12:
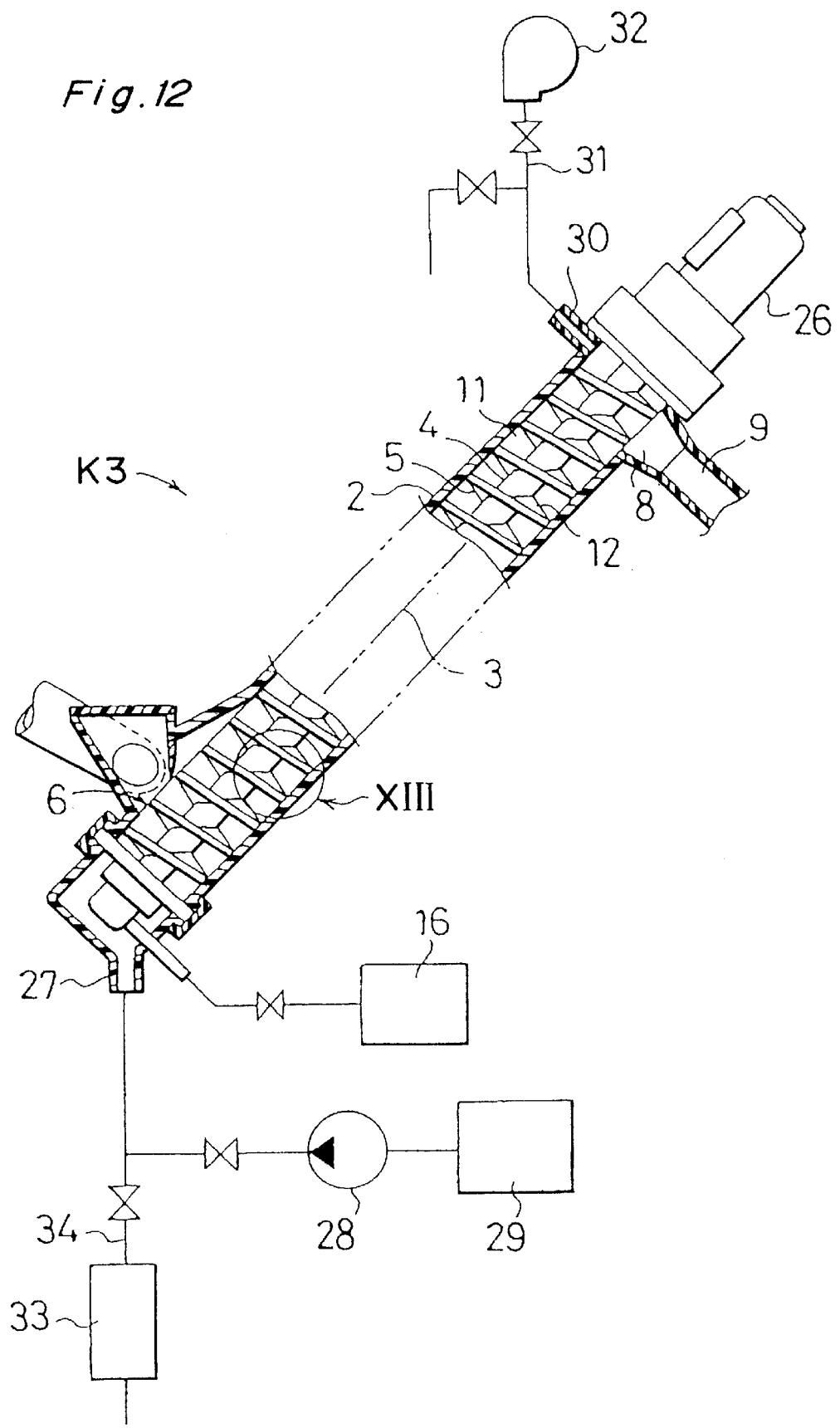
FIG. 12 is a partially broken front elevational view of a transfer device according to a third embodiment of the present invention.
Figure 13:
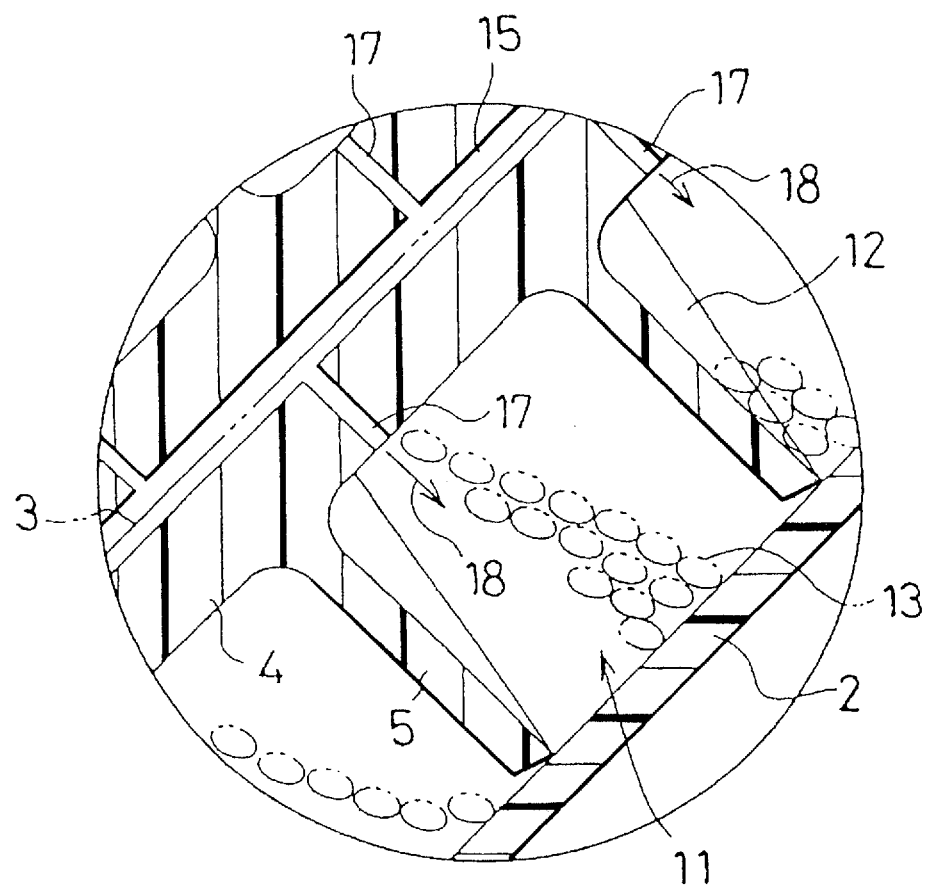
FIG. 13 is an enlarged sectional view of a portion XIII in FIG. 12.

FIGS. 12 and 13 show a transfer device K3 according to a third embodiment of the present invention. The transfer device K3 is suitable for transferring the tablets 13 upwardly. As shown in FIG. 12, the transfer device K3 includes the cylindrical member 2 having an inclined axis 3, the central shaft 4 extending through the axis 3 of the cylindrical member 2 and the helical vane 5 integrally projecting radially outwardly from the peripheral surface of the central shaft 4. The supply portion 6 is provided at the lower end portion of the cylindrical member 2, while the discharge portion 8 is provided at the upper end portion of the cylindrical member 2. In the third embodiment, the axis 3 of the cylindrical member 2 is inclined slopingly upwardly from the supply portion 6 to the discharge portion 8 but may be disposed horizontally or may be inclined downwardly from the supply portion 6 to the discharge portion 8.

A rotary drive means 26 such as an electric motor is coupled with an upper end of the central shaft 4. The rotary drive means 26 rotates the central shaft 4 and the helical vane 5 about the axis 3 transferring the tablets 13 supplied into the transfer space 11 from the supply portion 6 to the discharge portion 8. The tablets 13 are then discharged to the next process from the discharge pipe 9. A cleaning fluid inlet 27 is provided at the lower end portion of the cylindrical member 2 and is connected with a cleaning fluid tank 29 through a fluid pump 28. Meanwhile, a cleaning fluid outlet 30 is provided at the upper end portion of the cylindrical member 2.

A fan 32 is connected with the cleaning fluid outlet 30 by way of a feed pipe 31. An exhaust pipe 34 provided with a dust collector 33 is connected with the cleaning fluid inlet 27. Air flow directed from the upper end to the lower end of the cylindrical member 2 is produced in the cylindrical member 2 by a blast from the fan 32 and is apt to deviate to less resistant portions such as the periphery of the helical vane 5.

In the same manner as the first embodiment, the air passage 15 is formed in the central shaft 4 extending along the axis 3 of the cylindrical member 2 as shown in FIG. 13. A plurality of the injection holes 17 communicating with the air passage 15 are formed on the peripheral surface of the central shaft 4 opening to the transfer space 11. As shown in FIG. 12, the compressor 16 is connected with a lower end of the air passage 15. Therefore, the pressurized air 18 injected into the transfer space 11 from the injection holes 17 flows into gaps among the tablets 13 and gaps between the transfer face 12 and peripheries of the tablets 13 functioning in the same manner as the first embodiment. Meanwhile, high-humidity air or dust expelled by the pressurized air 18 is discharged from exhaust pipe 34 by the air flow produced from fan 32.

In the same manner as the first embodiment, the transfer device K3 is rinsed and dried by introducing cleaning fluid into the transfer space 11 and injecting the dry pressurized air 18 into the transfer space 11 from the injection holes 17. At this time by rotating the helical vane 5 through the rotary drive means 26, whirling flow of the cleaning fluid is produced in the cylindrical member 2. Thus, rinsing and drying of the transfer device K3 more efficient.

Similar to the first embodiment, the cylindrical member 2, the central shaft 4, and the helical vane 5, of the second and third embodiments, may be constituted by a plurality of the sections. Furthermore, although the first to third embodiments are illustrated as transferring tablets, it is needless to say that the transfer device of the present invention may also be used for transferring other solid articles. Moreover, in the first to third embodiments, the injection holes 17 are formed on the peripheral surface of the central shaft 4 but may also be formed on the helical vane 5. The number and interval of the injection holes 17 can be set arbitrarily in view of transfer efficiency and other considerations.

The transfer devices K1 to K3 of the present invention can achieve the following effects (1) to (7).

(1) Since the pressurized air injected into the transfer space from the injection holes flows into gaps among the solid articles and gaps between the transfer face and peripheries of the solid articles, the fluidity of the solid articles is raised. Therefore, since bridging phenomenon, in which the transfer space is clogged by the solid articles, can be prevented and since the frictional force applied to the solid articles can be reduced, the solid articles can be transferred efficiently without being damaged.

(2) High-humidity air around the solid articles is expelled from the transfer space by the pressurized gas injected into the transfer space from the injection holes. As a result, since ambient humidity of the solid articles is reduced, loss of gloss on the surfaces of the solid articles, deformation of the solid articles, and other problems due to low humidity are prevented.

(3) Dust and other foreign particles mixed into gaps among the solid articles can be expelled by the pressurized gas injected into the transfer space from the injection holes and thus, are easily separated from the solid articles.

(4) Upon the injection of pressurized gas into the cleaning fluid during the rinsing of the transfer device, the pressurized gas is set to bubbling state, so as to cause the bubbling phenomenon thus resulting in the turbulent flow of the cleaning fluid so as to separate deposits from the peripheral surface of the central shaft and the surface of the helical vane. Accordingly, the transfer device can be rinsed easily.

(5) Upon the injection of dry pressurized gas into the transfer space from the injection holes after rinsing of the transfer device to dry the transfer device, high-humidity gas is expelled from the transfer space by the pressurized gas. This allows the peripheral surface of the central shaft, the surface of the helical vane and other parts to be dried in a shorter period of time.

(6) Injection holes provided on the peripheral surface of the central shaft allow for the easy performance of machining for forming communication between the injection holes and the air passage. Furthermore, since the pressurized air can be supplied to corner portions of the helical vane in the vicinity of the central shaft, these portions can be rinsed and dried easily.

(7) In instances where the central shaft is constituted by a plurality of shaft sections coupled together in series and where the injection hole is formed at the coupling portion for coupling neighboring shaft sections, powdery solid articles or dust, which have entered the coupling portion, can be exhausted by injecting pressurized gas into the transfer space in a centrifugal direction from the injection hole at the coupling portion of the neighboring shaft sections. Inconveniences due to the entry of powdery solid articles or dust into the coupling portion therefore can be eliminated.

Figure 14:
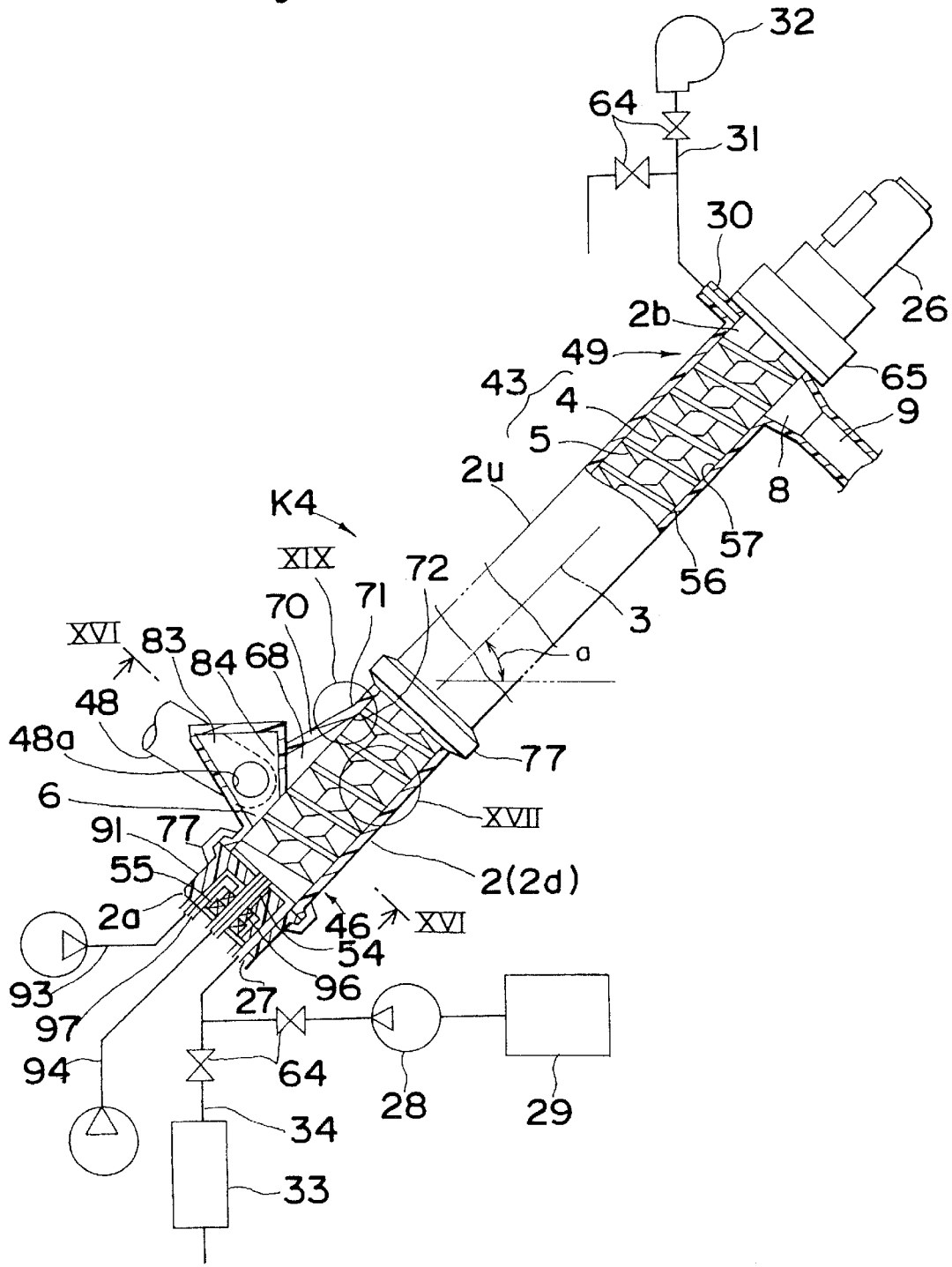
FIG. 14 is a partially broken front elevational view of a transfer device according to a fourth embodiment of the present invention.

FIGS. 14 to 20 show a transfer device K4 according to a fourth embodiment of the present invention. In production processes of the tablets 13, the transfer device K4 is used for transferring the tablets 13 upwardly between various machines, for example, from a tablet machine to a transfer vessel, from the transfer vessel to a coating machine and from these machines or the vessel to an inspection machine or a printing machine, or between neighboring production processes and in each of the production processes. As shown in FIG. 14, the transfer device K4 includes the cylindrical member 2 having a straight tubular shape and a smooth inner surface, a transfer member 43 provided rotatably in the cylindrical member 2 and the rotary drive means 26, such as an electric motor, which is mounted on an upper end of the cylindrical member 2 coupled with the transfer member 43.

The cylindrical member 2 is made of transparent polycarbonate and has an inside diameter of 105 mm. The cylindrical member 2 is supported by a support device (not shown). An angle formed between the axis 3 of the cylindrical member 2 and a horizontal plane, an angle a of inclination of the cylindrical member 2, is variably set. The angle a of inclination of the cylindrical member 2 is set at 45° during ordinary operation of the transfer device K4. The cylindrical member 2 has a lower portion 46 and an upper portion 49. The supply portion 6 opens to an upper face of the lower portion 46 of the cylindrical member 2 such that the tablets 13 can be supplied to the supply portion 6 from a preceding process through a supply path 48. Meanwhile, the discharge portion 8 opens to a lower face of the upper portion 49 of the cylindrical member 2 such that the tablets 13 can be discharged to the discharge pipe 9 leading to the subsequent process.

The cylindrical member 2 is separably supported by a flange retainer 77 at a location disposed above the supply portion 6 so as to be separated into a lower cylinder 2d and an upper cylinder 2u. A pair of lid members 91 are detachably mounted on a lower end 2a and an upper end 2b of the cylindrical member 2 by a pair of flange retainers 77, respectively. Opposite end portions of the central shaft 4 are rotatably supported by a pair of bearings 55 provided at the lid members 91, respectively. Reference numeral 96 denotes an oil seal.

The cleaning fluid inlet 27 and an air inlet 97 for supplying pressurized air for sealing are provided on an end face of the lid member 91 disposed at the lower end 2a of the cylindrical member 2. A passage 93 for supplying pressurized air for sealing is connected with the air inlet 97. Meanwhile, the cleaning fluid inlet 27 is not only connected with the cleaning fluid tank 29 through the fluid pump 28 but is also connected with the dust collector 33 via the exhaust pipe 34. Furthermore, the cleaning fluid outlet 30 opens to the upper end 2b of the cylindrical member 2 and is connected with the fan 32 by way of the feed pipe 31.

Meanwhile, the angle a of inclination of the cylindrical member 2 is properly set at a value not more than 75° in view of the sliding property of the tablets 13, transfer efficiency, installation space, and other factors. In the fourth embodiment, the supply portion 6 and the discharge portion 8 are sealed such that the transfer of the tablets 13 between the preceding process and the subsequent process can not only be converted to in-line application but can also be closed. However, the supply portion 6 and the discharge portion 8 may also open to the atmosphere in accordance with the kinds and uses of applications of solid articles to be transferred. Furthermore, in the fourth embodiment, the cylindrical member 2 has an inside diameter of 105 mm but, needless to say, the inside diameter of the cylindrical member 2 may be set at any other dimension. For example, if the inside diameter of the cylindrical member 2 is set within a range of 60 to 300 mm, not only can a large transfer amount of tablets 13 be secured but a commercially available inexpensive resinous pipe can also be used as the cylindrical member 2.

The transfer member 43 is constituted by the central shaft 4 extending through the axis 3 of the cylindrical member 2 and by the helical vane 5 projecting radially outwardly from the peripheral surface of the central shaft 4. The central shaft 4 and the helical vane 5 are integrally formed by ultra-high-density polyethylene such that an outer peripheral edge 56 of the helical vane 5 extends along the inner surface of the cylindrical member 2.

Figure 16:
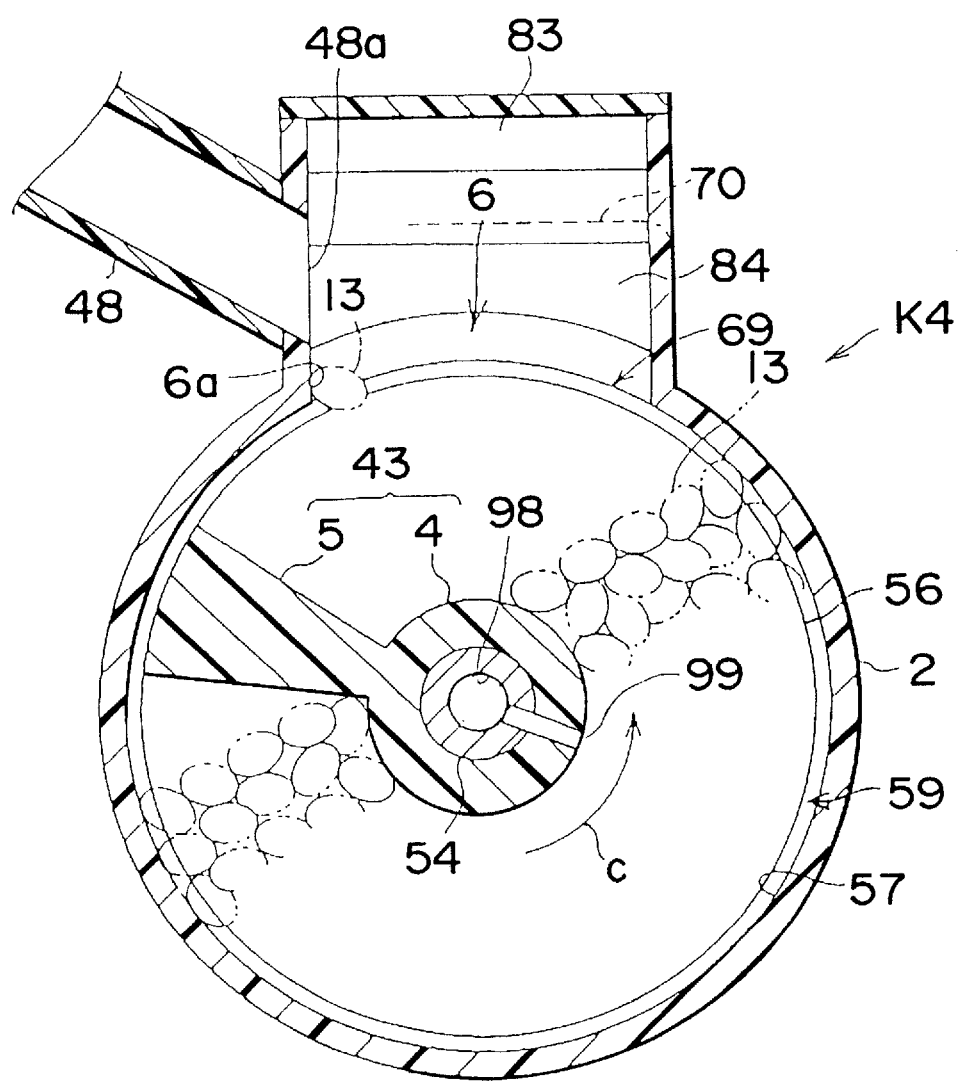
FIG. 16 is a sectional view taken along the line XVI—XVI in FIG. 14.
Figure 20:
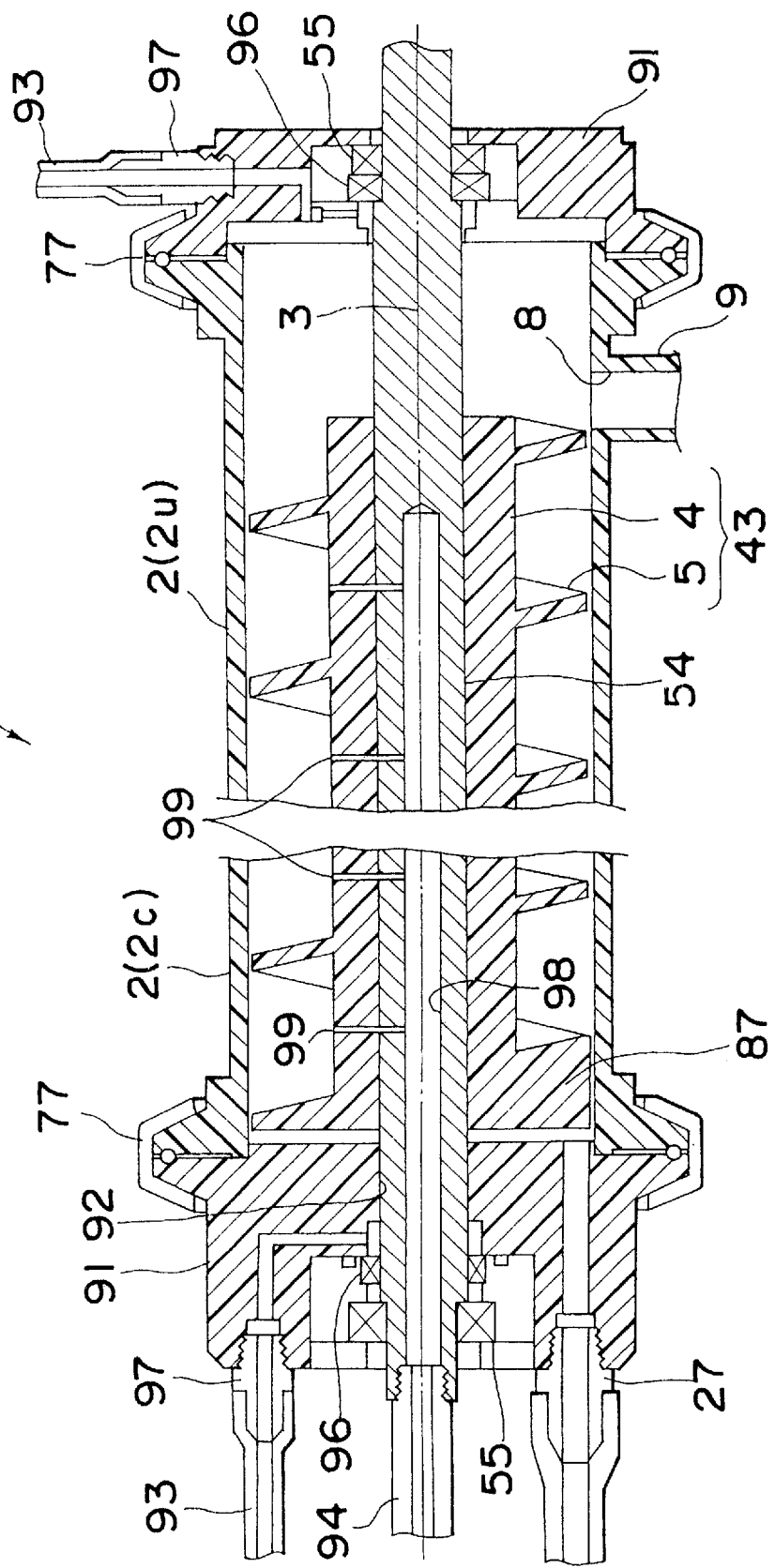
FIG. 20 is a longitudinal sectional view of the transfer device of FIG. 14 at the time of its rinsing.

As shown in FIGS. 16 and 20, a core 54 made of stainless steel is embedded in a hollow of the central shaft 4 along the axis 3 of the cylindrical member 2 to reinforce the central shaft 4. An air passage 98 is formed in the core 54 and a plurality of injection holes 99 are formed on the peripheral surface of the central shaft 4 at a proper interval communicating with the air passage 98. Meanwhile, as shown in FIG. 20, a passage 94 for supplying pressurized air is connected with a lower end of the core 54 of the central shaft 4 communicating with the air passage 98. Thus, pressurized air can be injected from the injection holes 99 into transfer space S defined between the cylindrical member 2 and the transfer member 43.

Figure 15:
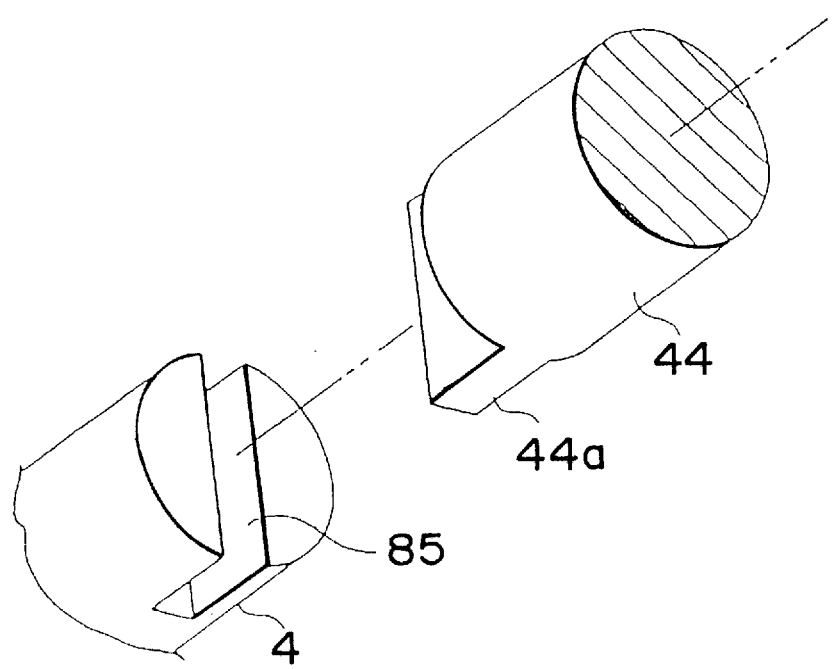
FIG. 15 is an exploded perspective view of a coupling mechanism at an upper end of a transfer member of the transfer device of FIG. 14.

The electric motor 26 is coupled with an upper shaft 4 by a coupling mechanism shown in FIG. 15. Namely, a slot 85 is formed on the upper end of the central shaft 4, while a boss 44a formed on an output shaft 44 from a gear box 65 is brought into engagement with the slot 85 of the central shaft 4. Hence the output shaft 44 is coupled with the central shaft 4. Therefore, by removing the lid member 91 from the lower end 2a of the cylindrical member 2 upon the unfixing of the flange retainer 77, the transfer member 43 can be drawn from below. Thus, the transfer device K4 can be disassembled easily.

The helical vane 5 normally has a helical pitch of approximately 30 to 60 mm but is shown with a helical pitch of 45 mm in the fourth embodiment. Therefore, a lead angle b of the helical vane 5 at the outer peripheral edge 56 is set at about 8°. This lead angle b of the helical vane 5 is properly set so as to fall within a range of 3° to 25° in accordance with the angle a of inclination of the cylindrical member 2, rotational speed of the central shaft 4, material of the transfer member 43, types of solid articles to be transferred, and other factors so as to keep transfer efficiency high.

As shown in FIGS. 14 and 20, the central shaft 4 has an outside diameter substantially equal to that of the helical vane 5 at a lower end portion of the helical vane 5. Thus, a closure 87 is formed for closing the space between the transfer member 43 and the cylindrical member 2. As a result, the tablets 13 supplied from the supply portion 6 do not flow, downwardly, along the helical vane 5 but are smoothly transferred to the discharge portion 8 without remaining at the lower portion 46 of the cylindrical member 2.

Figure 17:
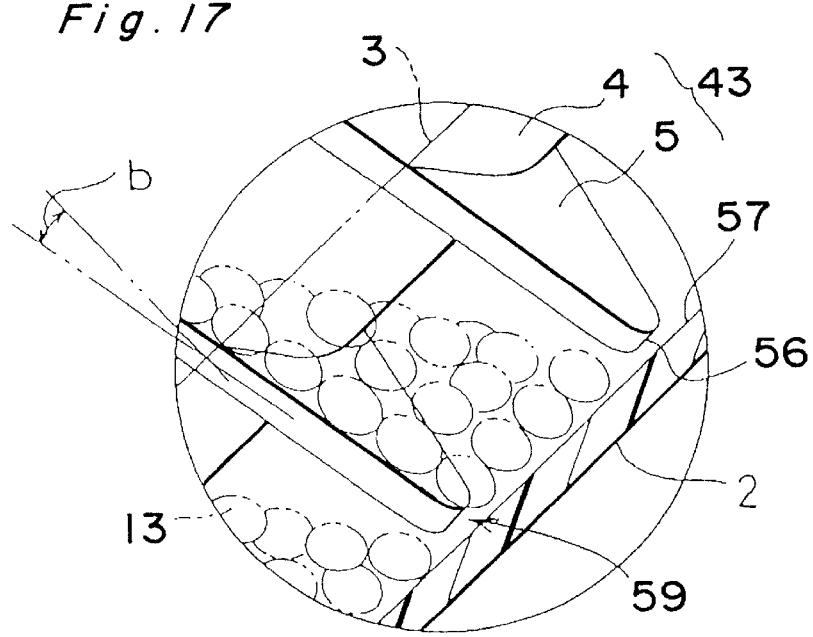
FIG. 17 is an enlarged view of a portion XVII in FIG. 14.

As shown in FIGS. 16 and 17, a gap 59, which is smaller than the external shape of each of the tablets 13 to be transferred, is defined between the outer peripheral edge 56 of the helical vane 5 and an inner surface 57 of the cylindrical member 2. Therefore, the transfer member 43 can be rotated smoothly without coming into contact with the inner surface 57 of the cylindrical member 2 and the tablets 13 will not penetrate into the gap 59.

Friction between the solid articles and the transfer device K4 is lessened. Such a phenomenon is least likely to happen where powder is produced from the solid articles. However, this phenomenon may occur due to separation of powder adhering to the solid articles, from the solid articles or production of powder from the solid articles according to the types of solid articles to be transferred or transfer conditions, for example, in the case where the tablets 13 are uncoated. In the transfer device K4, since the gap 59 is defined between the outer peripheral edge 56 of the helical vane 5 and the inner surface 57 of the cylindrical member 2, powder released from the tablets 13 during their transfer is apt to fall downwardly through the gap 59.

Furthermore, in order to separate the above mentioned powder and dust from the tablets 13 more effectively, the fan 32 is actuated during transfer of the tablets 13 delivering air into the cylindrical member 2. Thus, dust and other particles produced in the cylindrical member 2 are carried on this air flow to be discharged from the cleaning fluid inlet 27 and then, drawn to the dust collector 33 through the exhaust pipe 34. Meanwhile, in cases where pressurized air from the passage 94 is injected from the injection holes 99 through the air passage 98, the fan 32 may be eliminated.

The electric motor 26 is coupled with the central shaft 4 of the transfer member 43 via the gear box 65 and the coupling mechanism referred to above. The transfer member 43 is rotated at a speed of 200 r.p.m. By this rotation of the transfer member 43, the tablets 13 are rotated together with the helical vane 5 as shown in FIG. 16 by frictional resistance between the tablets 13 and the inner surface 57 of the cylindrical member 2 and by the action of gravity of the tablets 13. As a result, the tablets 13 are transferred upwardly on the upper face of the helical vane 5.

At this time, if the rotational speed of the central shaft 4 is high, the tablets 13 are rotated around the central shaft 4 together with the helical vane 5 and thus, cannot be transferred upwardly. Therefore, the rotational speed of the central shaft 4, determined by the electric motor 26, may be set at a proper value in accordance with the sliding property of the tablets 13 relative to the helical vane 5, the angle a of inclination of the cylindrical member 2, the lead angle b of the helical vane 5, and other factors. However, if the rotational speed of the central shaft 4 is set extremely high, a large external force will be applied to the tablets 13. Accordingly, the rotational speed of the transfer member 43 is set at not more than 500 r.p.m., preferably, not more than 200 r.p.m.

As shown in FIG. 14, a tablet supply space 83 is provided above the supply portion 6. One end 48a of the supply portion 48 opens to a lower portion of the tablet supply space 83. An opening 69 is formed on the cylindrical member 2 disposed downstream of the supply portion 6 in the transfer direction of the tablets 13. This opening 69 is covered by a cover 70. A tablet inflow space 68 communicating with the supply portion 6 is formed above the outer peripheral edge 56 of the helical vane 5.

A weir 84 made of elastic synthetic resin is provided between the supply portion 6 and the tablet inflow space 68 extending downwardly towards the outer peripheral edge 56 of the helical vane 5. A lower end of the weir 84 is spaced from the outer peripheral edge 56 of the helical vane 5 a distance larger than the external shape of each tablet 13. While the weir 84 shown in FIG. 14 is made of elastic synthetic resin, it may also be made of elastic rubber or plastic metal.

As tablets 13, fed into the tablet supply space 83 from the supply path 48, are unlikely to flow above an end portion 48a of the supply path 48, an excessively large amount of the tablets 13 will not remain in the supply portion 6. Since the tablets 13 supplied into the tablet supply space 83 are prevented by the weir 84 from flowing into the tablet inflow space 68, the tablet inflow space 68 is usually kept vacant. If a large amount of the tablets 13 are supplied into the supply portion 6 and are filled in the cylindrical member 2 so as to be forced out of the helical vane 5, the tablets 13 forced out of the helical vane 5 will strike a side edge portion 6a of the supply portion 6, as shown in FIG. 16. Thus, the tablets 13 will be smoothly depressed into the tablet inflow space 68 against the elasticity of the weir 84.

Figure 18:
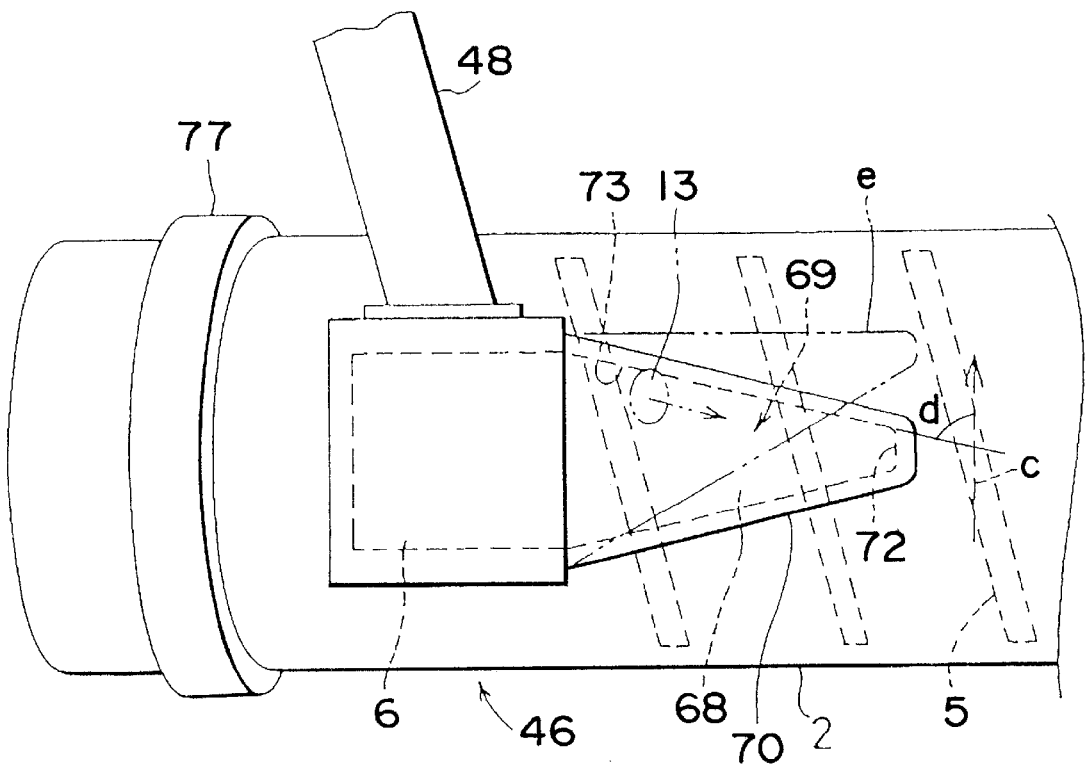
FIG. 18 is a top plan view of a supply opening of the transfer device of FIG. 14.

The cover 70 for covering the tablet inflow space 68 is brought gradually closer to the outer peripheral edge 56 of the helical vane 5 towards a downstream side in the transfer direction of the tablets 13 such that a distal edge 71 of the cover 70 is smoothly connected with the cylindrical member 2. Meanwhile, as shown in FIG. 18, a mouth 69 of the tablet inflow space 68 is gradually narrow towards the downstream side in the transfer direction of the tablets 13. An edge 73 of the mouth 69 disposed at a downstream side in a rotational direction c of the transfer member 43 intersects with the rotational direction c of the transfer member 43 at an angle d of about 75°.

Such a case may happen in which the tablets 13 are rotated together with the helical vane 5 so as to be fed into the tablet inflow space 68 by centrifugal force. However, since the tablets 13 fed into the tablet inflow space 68 strike the edge 73 of the mouth 69 and thus, are carried to the upper and lower faces of the helical vane 5, there is no risk that the tablets 13 will be gripped between the edge of the mouth 69 and the helical vane 5. Meanwhile, as shown by a two-dot chain line e in FIG. 18, it is most preferable that the angle d is set at 90°, namely, the edge 73 of the mouth 69 orthogonally intersects with the rotational direction c of the transfer member 43.

Figure 19:
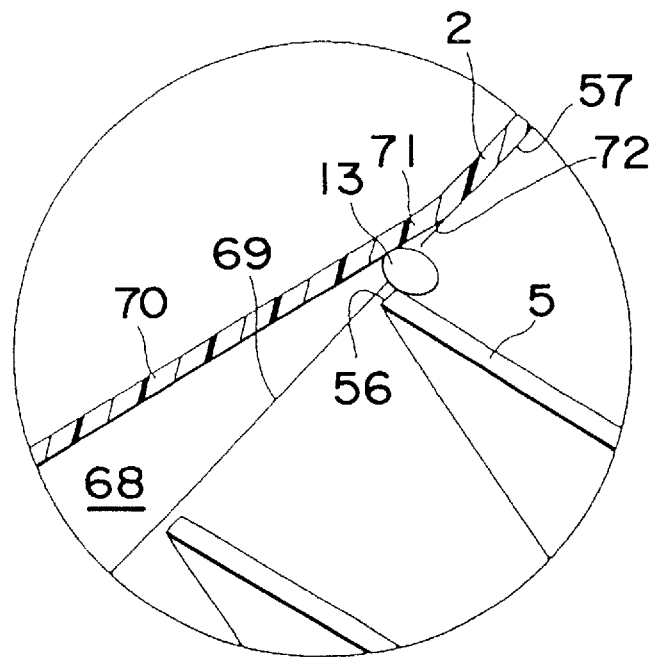
FIG. 19 is an enlarged view of a portion XIX in FIG. 14.

Meanwhile, since the tablets 13 fed into the tablets 13 fed into the 68 are downwardly drawn into the cylindrical member 2 by the cover 70 at a side downstream of the tablet inflow space 68 are shown in FIG. 19, the tablets 13 do not strike the edge 73 of the mouth 69 at a downstream end 72 of the tablet inflow space 68 in the transfer direction of the tablets 13. Thus, tablets 13 are not gripped between the edge 73 of the mouth 69 and the helical vane 5.

By merely drawing the transfer member 43 from the upper end of the cylindrical member 2, the transfer device K4 can be disassembled easily. Therefore, not only maintenance and service of the transfer device K4 can be performed easily but it is also possible to rinse the transfer device K4 in its disassembled state. Furthermore, when the types of tablets 13 are changed, the transfer device K4 can be subjected in-line rinsing eliminating the need for its disassembly or reassembly. Namely, when transfer of the tablets 13 has been completed, the cleaning fluid tank 29 is brought into communication with the cleaning fluid inlet 27 by operating an on-off valve 64. Therefore, the cleaning fluid is supplied by the fluid pump 28 filling the cylindrical member 2. The cleaning fluid is, in turn, discharged from the cleaning fluid outlet 30. Since only the transfer member 43, as constituted by the central shaft 4 and the helical vane 5, is provided in the cylindrical member 2, the interior of the cylindrical member 2 can be rinsed easily by the cleaning fluid.

However, since the shape of the supply portion 6 of the cylindrical member 2 is relatively complicated it is preferable that prior to supplying cleaning fluid, the lower cylinder 2d be removed from the transfer device K4 by unfixing the flange retainer 77 and substituting a lower cylinder 2c, having dimensions identical with those of the lower cylinder 2d, with the upper cylinder 2u as shown in FIG. 20. As a result, since the inner surface 57 of the cylindrical member 2 is made uniform, the transfer member 43 can be wholly rinsed. Furthermore, since the removed lower cylinder 2d is short, even the corners of the inner surface of the removed lower cylinder 2d are easily accessed. Thus, the removed lower cylinder 2d can be rinsed easily.

As shown in FIG. 20, an end portion of the central shaft 4 is inserted through a through-hole 92 formed in the lid member 91. Pressurized air for sealing is supplied from the air inlet 97 through passage 93, to a gap between a peripheral surface of the through-hole 92 and the peripheral surface of the central shaft 4.

Therefore, there is no risk that the cleaning fluid supplied into the cylindrical member 2 will leak from the through-hole 92.

The bubbling effect, caused by injection of pressurized air into the cleaning fluid from injection holes 99 through passage 94, can result in a more effective rinsing of the inner surface 57 of the cylindrical member 2 and the transfer member 43.

In addition, the effectiveness of rinsing may be increased if, at the time of rinsing of the transfer device K4, the angle a formed between the axis 3 of the cylindrical member 2 and the horizontal plane is changed from a vertical attitude, in which the lower portion 46 of the cylindrical member 2 is oriented vertically upwardly. Furthermore, if the helical vane 5 is reversibly rotated at not less than 150 r.p.m., preferably not less than 250 r.p.m., at the time of rinsing of the transfer device K4, the transfer device K4 can be rinsed efficiently by stirring the cleaning fluid in the cylindrical member 2.

When rinsing of the transfer device K4 has been completed, drying air is introduced into the cylindrical member 2 from the injection holes 99 via the passage 94 upon the actuation of each on-off valve drying the inner surface 57 of the cylindrical member 2 and the transfer member 43. At this time, drying air penetrates in between the outer peripheral edge 56 of the helical vane 5 and the inner surface 57 of the cylindrical member 2 completely drying the interior of the cylindrical member 2 by removing the cleaning fluid therefrom. By also rotating the helical vane 5 in this drying step, the cleaning fluid is expelled from the helical vane 5 by centrifugal force. Furthermore, by rotating the helical vane 5 at high speed in drying air, a large quantity of drying air is delivered onto the entire surface of the helical vane 5. Thus, the surface of the transfer member 43 and the inner surface 57 of the cylindrical member 2 can be dried rapidly.

In the transfer device K4, the cleaning fluid, and other fluids are introduced from the lower portion 46 of the cylindrical member 2 but may also be introduced from the upper portion 49 of the cylindrical member 2. Meanwhile, the cleaning fluid is passed through the cylindrical member 2 by using the cleaning fluid inlet 27 and the cleaning fluid outlet 30 provided on the cylindrical member 2. However, the cleaning fluid or drying air may also be passed through the cylindrical member 2 by using the supply portion 6 and the discharge portion 8.

Furthermore, the exhaust pipe 34 and the fan 32 may also be connected with the upper portion 49 and the lower portion 46 of the cylindrical member 2, respectively. However, if air is passed through the cylindrical member 2 in a direction opposite to the transfer direction of the solid articles as in this fourth embodiment, powder can be more efficiently separated from the solid articles so as to be discharged out of the cylindrical member 2.

In the fourth embodiment, tablets are normally transferred but powder can also be transferred. In this case, a small portion of the powder falls from the gap 59 between the outer peripheral edge 56 of the helical vane 5 and the inner surface 57 of the cylindrical member 2 but a majority of the powder is transferred upwardly by the upper face of the helical vane 5. Therefore, the amount of the powder that falls from the gap 59 can be lessened by reducing the size of the gap 59 hence increasing transfer efficiency.

Figure 21:
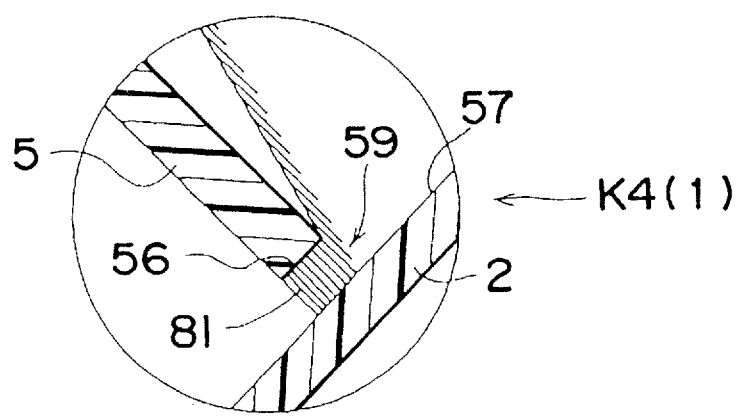
FIGS. 21, 22, 23 and 24 are enlarged views of outer peripheral edges of helical vanes of transfer devices which are first, second, third, fourth and fifth modifications of the transfer device of FIG. 14, respectively.

Gap 59 may be further sealed such that the fall of the solid articles from the gap 59 is prevented even more effectively. Namely, as shown in FIG. 21 illustrating a first modification K4(1) of the fourth embodiment, fiber 81 is attached to the outer peripheral edge 56 of the helical vane 5 so as to be directed in a brushlike shape towards the inner surface 57 of the cylindrical member 2. Thus, a distal end of the brushlike fiber 81 is held in contact with the inner surface 57 of the cylindrical member 2.

Figure 22:
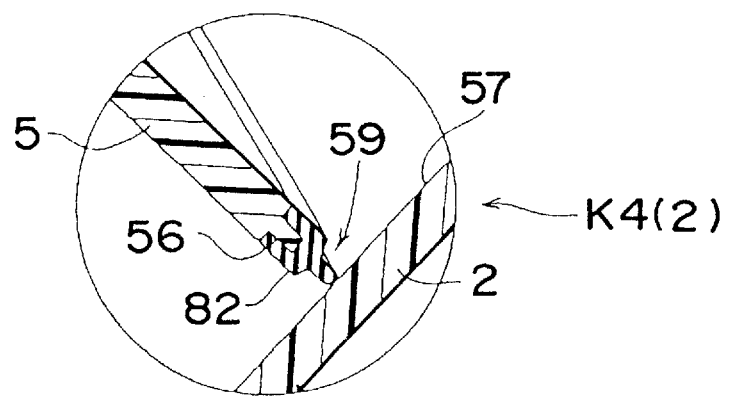

Meanwhile, in FIG. 22 showing a second modification K4(2) of the fourth embodiment, an elastic sealer 82 is attached to the outer peripheral edge 56 of the helical vane 5 directed towards the inner surface 57 of the cylindrical member 2. Thus, a distal end of the elastic sealer 82 is held in contact with the inner surface 57 of the cylindrical member 2. The brushlike fiber 81 and the elastic sealer 82 which are employed in the first and second modifications K4(1) and K4(2) of the fourth embodiment, respectively prevent the fall of solid articles from gap 59 quite effectively, thereby resulting in high transfer efficiency.

In the fourth embodiment, the helical vane 5 is of the single-start type but it may also be of the multiple-start type. Meanwhile, in the fourth embodiment, each of the cylindrical member 2 and the transfer member 43 is formed by a single member but may also be formed by a plurality of sections coupled together in series.

Figure 23:
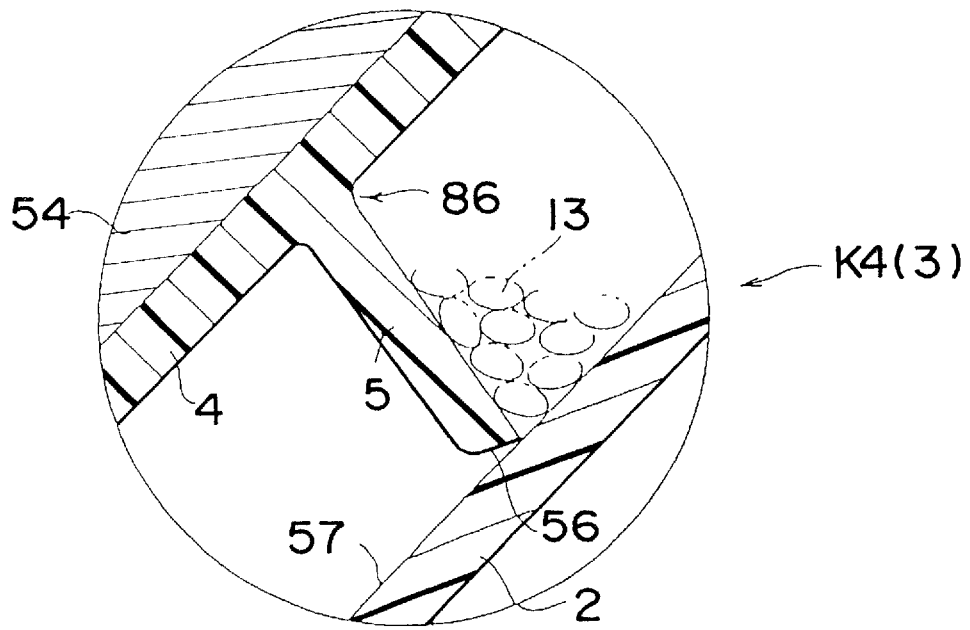

Furthermore, in the fourth embodiment, the helical vane 5 is projected orthogonally from the central shaft 4 but may also be projected obliquely from the central shaft 4. Namely, in FIG. 23 depicting a third modification K4(3) of the fourth embodiment, the outer peripheral edge 56 of the helical vane 5 deviates further towards an upstream side, in the transfer direction of the tablets 13, than a base portion 86 of the helical vane 5. Thus, the tablets 13 are depressed against the inner surface 57 of the cylindrical member 2 by the helical vane 5. As a result, the frictional force between the tablets 13 and the inner surface 57 of the cylindrical member 2 is increased. In turn, tablets 13 are prevented from being rotated together with the helical vane 5 and thus, are transferred effectively.

Figure 24:
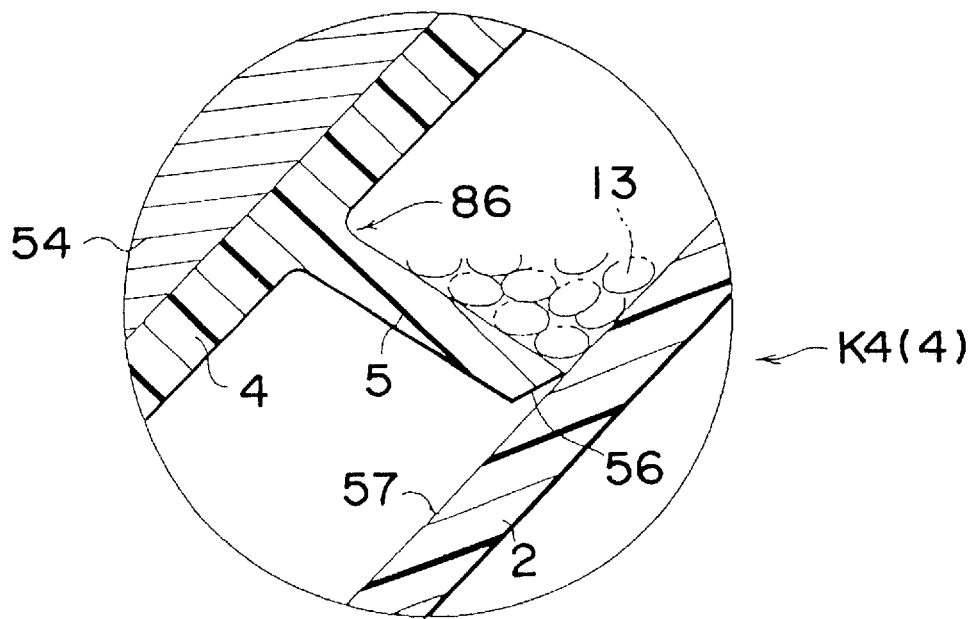

Meanwhile, in FIG. 24 showing a fourth modification K4(4) of the fourth embodiment, the outer peripheral edge 56 of the helical vane 5 deviates towards the downstream side in the transfer direction of the tablets 13. As a result, since the tablets 13 are transferred so as to be scooped up by the helical vane 5, force applied outwardly to the tablets 13 is lessened and thus, damage to the tablets 13 can be prevented. Therefore, the direction for projecting the helical vane 5 from the central shaft 4 is determined in accordance with the sliding property, the fragility, and other factors of the solid articles to be transferred.

Figure 25:
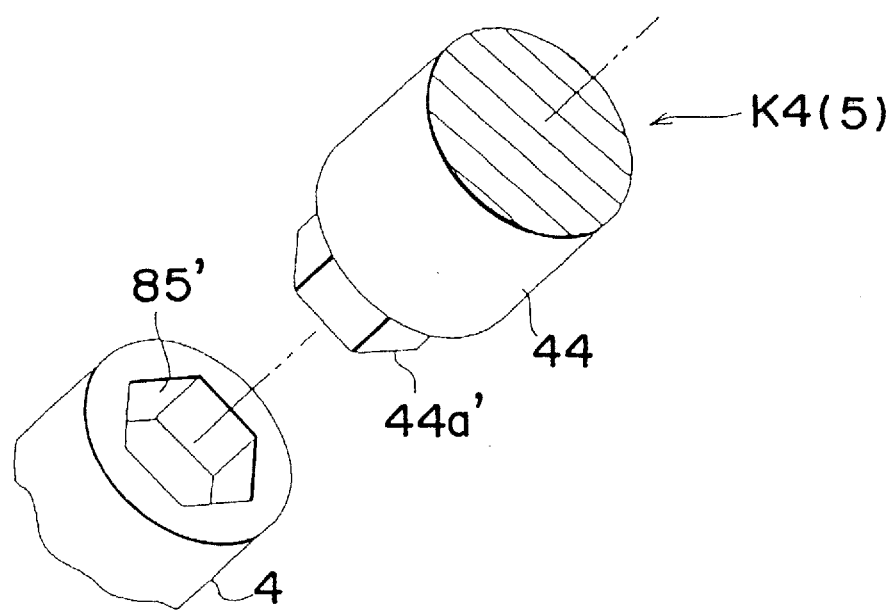
FIG. 25 is a view similar to FIG. 15, particularly showing a fifth modification of the transfer device of FIG. 14.

In the fourth embodiment, the electric motor 26 is mounted on the upper portion of the cylindrical member 2 but may also be mounted on the lower portion of the cylindrical member 2. Alternatively, the electric motor 26 may be coupled with the transfer member 43 through the coupling mechanism without being directly secured to the cylindrical member 2. Moreover, it goes without saying that the coupling mechanism for coupling the transfer member and the rotary drive means is not limited to the one shown in FIG. 15. For example, as shown in FIG. 25 illustrating a fifth modification K4(5) of the fourth embodiment, a hexagonal boss 44a' of the output shaft 44 may also be brought into engagement with a hexagonal slot 85' of the central shaft 4.

Figure 26:
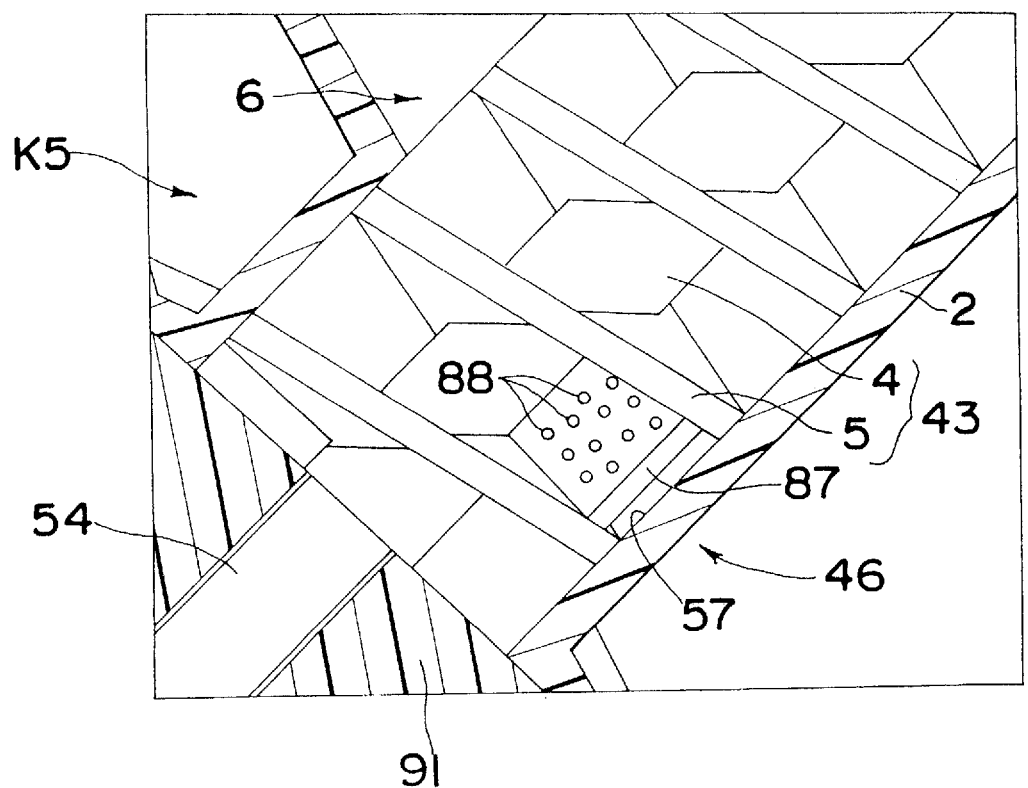
FIG. 26 is an enlarged fragmentary longitudinal sectional view of a transfer device according to a fifth embodiment of the present invention.

FIG. 26 shows the lower portion 46 of a transfer device K5 according to a fifth embodiment of the present invention. In the transfer device K5, a plate-like closure 87 is fixed to the periphery of the transfer member 43 at a location below the supply portion 6 in contrast with the transfer device K4 in which the outside diameter of the central shaft 4 is increased at the lower end portion of the helical vane 5. Namely, the plate-like closure 87 is provided between neighboring helical vanes 5 to close the space between the transfer member 43 and the cylindrical member 2. Furthermore, a number of through-holes 88 are formed on a whole face of the closure 87 to allow air or cleaning fluid to pass therethrough. The solid articles supplied into the cylindrical member 2 from the supply portion 6 are received by the plate-like closure 87 and therefore, are transferred to the discharge portion 8 without flowing towards the lower lid member 91.

Figure 27:
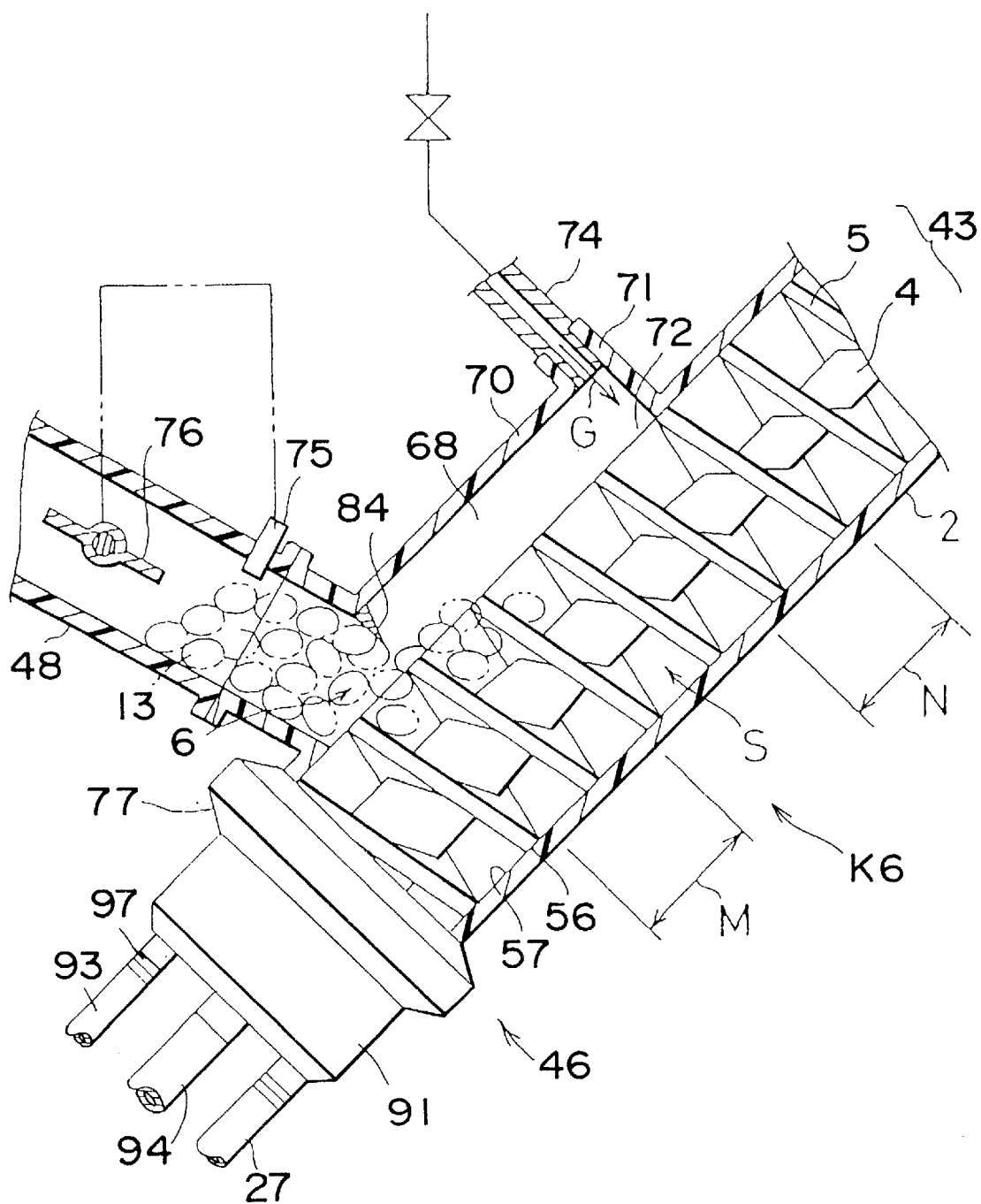
FIG. 27 is a fragmentary longitudinal sectional view of a transfer device according to a sixth embodiment of the present invention.

FIG. 27 shows the vicinity of the supply portion 6 of a transfer device K6 according to a sixth embodiment of the present invention. In the transfer device K6, the cover 70 for covering the tablet inflow space 68 is disposed substantially in parallel with the cylindrical member 2. In addition, an injection nozzle 74 for injecting gas G into the cylindrical member 2 is provided at the downstream end 72, of the tablet inflow space 68, in the transfer direction of the tablets 13. Meanwhile, a tablet sensor 75 for detecting the tablets 13 and a supply restriction member 76 for restricting the supply amount of the tablets 13 are provided in the supply path 48 communicating with the supply portion 6. When the tablet sensor 75 detects that the accumulated tablets 13 at the supply portion 6 has reached a predetermined level, the supply restriction member 76 is actuated to reduce the supply amount of tablets 13 or to stop the supply of the tablets 13.

In the transfer device K6, since the balance between the transfer amount and the supply amount of the tablets 13 is well maintained, an excessively large amount of tablets 13 will not accumulate at the supply portion 6 and hence, an extremely large stress is not applied to the tablets 13 at the supply portion 6. Furthermore, in a region M in the vicinity of the weir 84, disposed between the supply portion 6 and the tablet inflow space 68, as well as in a region N in the vicinity of the downstream end 72 of the tablet inflow space 68, the outside diameter of the central shaft 4 of the transfer member 43 gradually decreases towards the downstream side in the transfer direction of the tablets 13. Thus, the volume of transfer space S defined between the cylindrical member 2 and the transfer member 43, per pitch of the helical vane 5, gradually increases towards the downstream side in the transfer direction of the tablets 13.

As a result, the tablets 13 proceeding towards the tablet inflow space 68, upon their excessive supply, or the tablets 13 carried into the tablet inflow space 68 are smoothly displaced into the transfer space S, which increases gradually towards the downstream side in the transfer direction of the tablets 13. An extremely large stress is, therefore, not applied to the tablets 13 and thus, the tablet inflow space 68 is kept vacant. Meanwhile, even if the tablets 13 are carried into the tablet inflow space 68 by either centrifugal force or by some other means, during their transfer, the gas G injected from the injection nozzle 74 forces the tablets 13 gripped between the downstream end 72 and the helical vane 5 into transfer space 5, so that the tablets 13 are removed from the downstream end 72 of the tablet inflow space 68. The farther upstream, in the rotational direction of the transfer member 43, that injection nozzle 74 is provided the more effective the device becomes in preventing the tablets 13 from being carried into the tablet inflow space 68.

As mentioned above, in the transfer device K6, in the region M in the vicinity of the weir 84, disposed between the supply portion 6 and the tablet inflow space 68, as well as in the region N in the vicinity of the downstream end 72 of the tablet inflow space 68, the volume of the transfer space S per pitch of the helical vane 5 is gradually increased towards the downstream side in the transfer direction of the tablets 13. However, the volume of the transfer space S per pitch of the helical vane 5 may be gradually increased towards the downstream side in the transfer direction of the tablets 13 at only one of the regions M and N.

Meanwhile, in the transfer device K6, in order to gradually increase the volume of the transfer space S per pitch of the helical vane 5 towards the downstream side in the transfer direction of the tablets 13, the outside diameter of the central shaft 4 is gradually decreased towards the downstream side in the transfer direction of the tablets 13. Alternatively, the pitch of the helical vane 5 may be gradually decreased towards the downstream side in the transfer direction of the tablets 13. In addition, these three constructions may also be combined.

Figure 28:
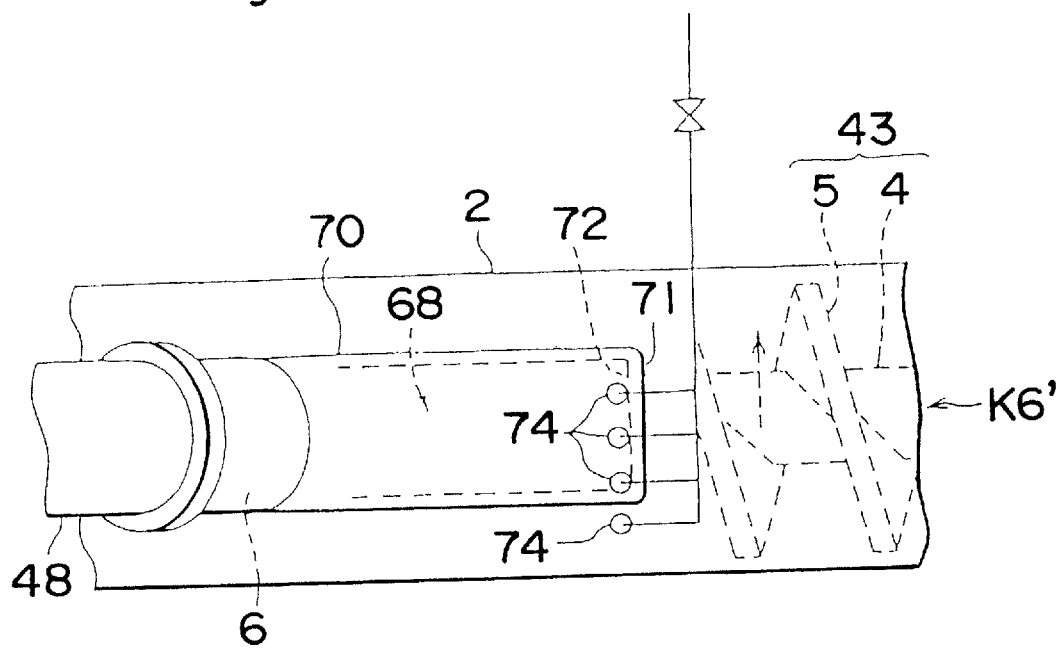
FIG. 28 is a top plan view of a supply opening, particularly showing a modification of the transfer device of FIG. 27.

In the transfer device K6, since the mouth 69 of the tablet inflow space 68 gradually narrow towards the downstream side in the transfer direction of the tablets 13, only a single injection nozzle 74 is provided. However, as shown in FIG. 28 illustrating a modification K6' of the sixth embodiment, where the downstream end 72 of the tablet inflow space 68 is relatively wide, a plurality of the injection nozzles 74 may be provided. Furthermore, in the transfer device K6, the cover 70 is projected stepwise from the cylindrical member 2 but may also be brought gradually closer to the outer peripheral edge 56 of the helical vane 5 so as to be smoothly connected with the cylindrical member 2 as in the transfer device K4.

Figure 29:
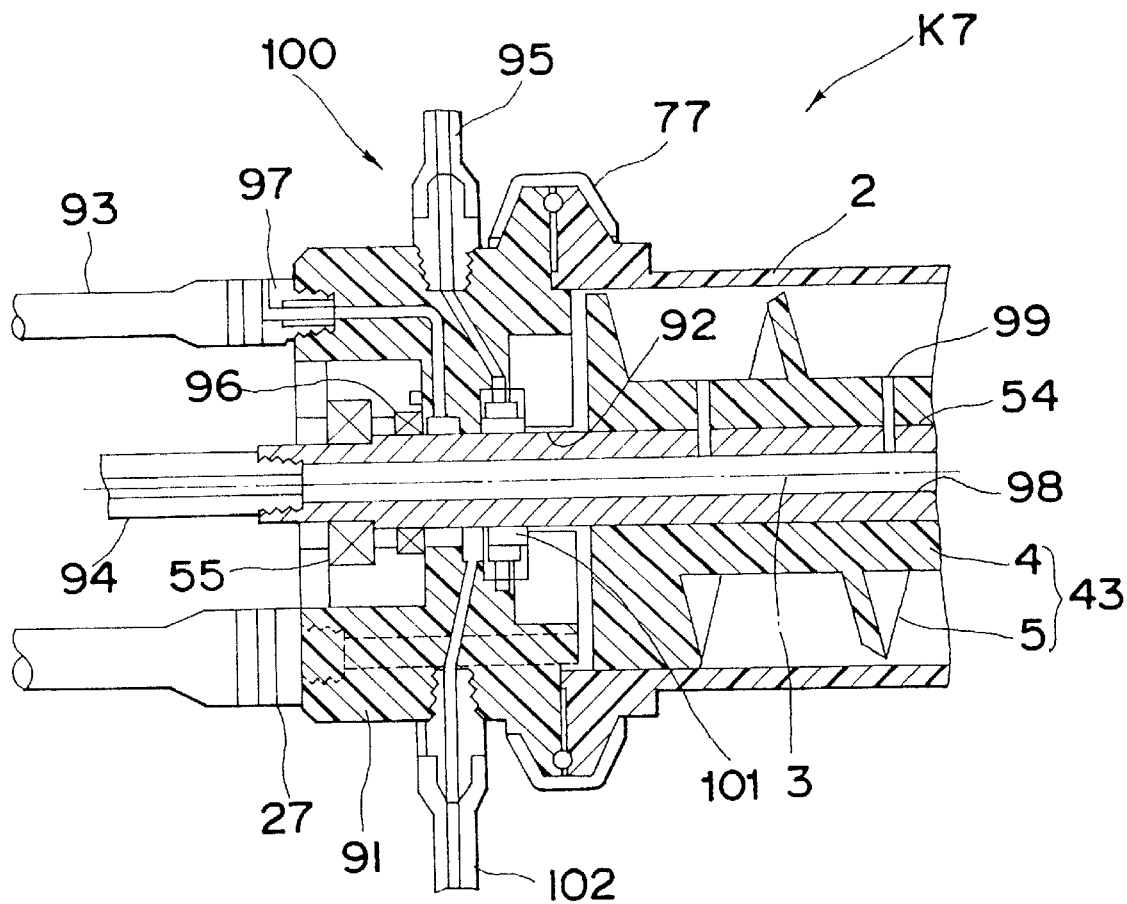
FIG. 29 is a fragmentary longitudinal sectional view of a transfer device according to a seventh embodiment of the present invention.
Figure 30:
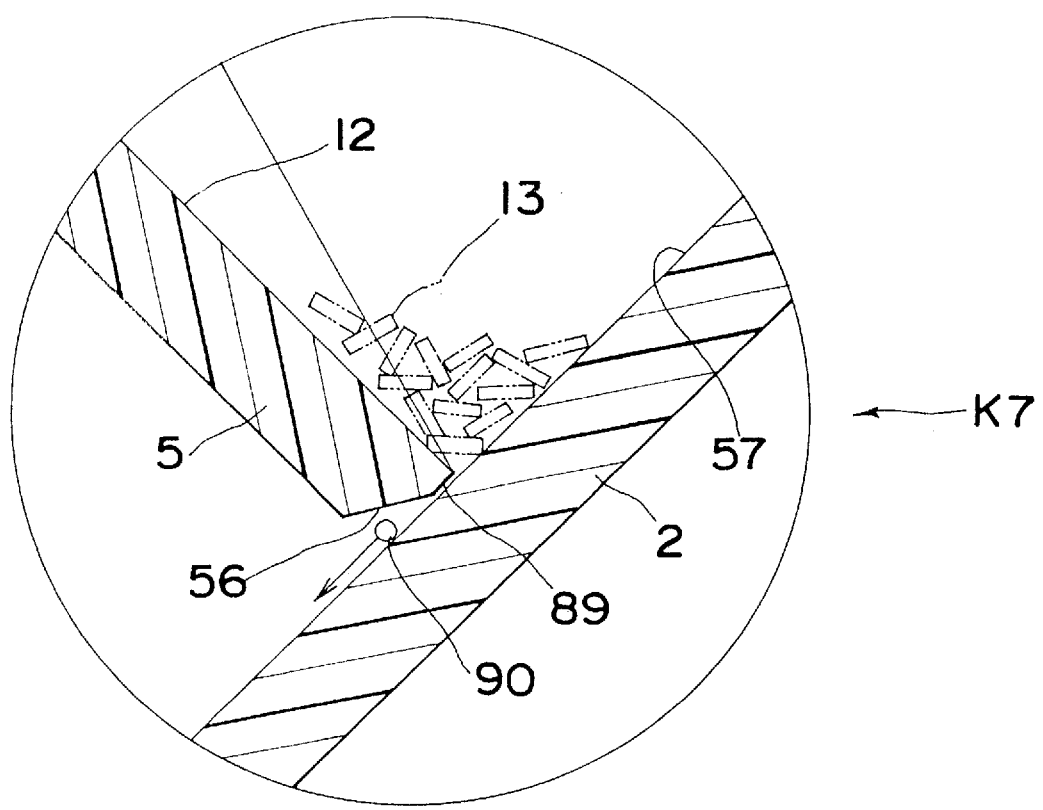
FIG. 30 is an enlarged view of an outer peripheral edge of a helical vane of the transfer device of FIG. 29, FIGS. 31 and 32 are views similar to FIG. 29, particularly showing first and second modifications thereof, respectively.

FIGS. 29 and 30 show a transfer device K7 for transferring pharmaceutical granules 13, according to a seventh embodiment of the present invention. FIG. 29 shows the vicinity to the lower portion 46 of the cylindrical member 2, while FIG. 30 shows the vicinity of the outer peripheral edge 56 of the helical vane 5. The granules 13 to be transferred by the transfer device K7 have a wide range of grain size and thus, may be fine powder. Generally, where the solid articles 13 to be transferred are granules including minute particles or powder, there is a risk that the oil seal 96 employed in the transfer device K4 cannot prevent these minute particles from penetrating into the bearing 55 from the periphery of the central shaft 4. Therefore, in the transfer device K7, a powdery sealing device 100 is provided at each of the lid members 91 fixed to the lower and upper ends 2a and 2b of the cylindrical member 2, respectively.

Namely, as shown in FIG. 29, the through-hole 92 for passing the end portion of the central shaft 4 therethrough is formed in the lid member 91. The sealing device 100 includes first and second vacuum suction paths 95 and 102 and a porous member 101 such that the first vacuum path 95 is in communication with an intermediate portion of the through-hole 92 via the porous member 101. Accordingly, the minute particles which have penetrated into the gap between the central shaft 4 and the through-hole 92 are adsorbed by the porous member 101 through pressure reduction from the first vacuum suction path 95 so as to be deposited on the porous member 101. When the deposited particles are filled into the gap between the central shaft 4 and the through-hole 92, the gap between the central shaft 4 and the through-hole 92 is effectively sealed. The second vacuum suction path 102 is in communication with an area outside of a particle deposit portion of the porous member 101. Accordingly, the minute particles having an inferior adsorption property and the particles leaking from the particle deposit portion of the porous member 101 are discharged outwardly by the second vacuum suction path 102 and thus, do not adversely affect the bearing 55 or other components.

In the transfer device K7, a shut-off portion 89 is formed on the outer peripheral edge 56 of the helical vane 5 at the downstream side in the transfer direction of the granules 13, i.e., at one of the opposite sides of the outer peripheral edge 56 adjacent to the transfer face 12. The outer peripheral edge 56 of the helical vane 5 is spaced gradually farther away from the inner surface 57 of the cylindrical member 2 in a direction further upstream of the shut-off portion 89 in the transfer direction of the granules 13.

Since the solid articles to be transferred by the transfer device K7 are granules 13 having a small external shape, the shut-off portion 89 formed on the outer peripheral edge 56 of the helical vane 5 is brought as close, to the inner surface 57 of the cylindrical member 2, as possible or even held in contact with the inner surface 57 of the cylindrical member 2. In this case, since the cylindrical member 2 and the helical vane 5 should be produced and assembled together at high precision, the cylindrical member 2 is made of metal and the inner surface 57 of the cylindrical member 2 is machined to have highly accurate roundness and evenness.

A problem may arise if the shut-off portion 89 of the helical vane 5 is partially or wholly spaced away from the inner surface 57 of the cylindrical member 2. Granules 13 or foreign matter 90 may penetrate in between the shut-off portion 89 and the inner surface 57 of the cylindrical member 2 damaging the inner surface 57 of the cylindrical member 2 and the outer peripheral edge 56 of the helical vane 5. Penetrated matter may also increase rotational load of the transfer member 43.

However, in the transfer device K7, the shut-off portion 89 is formed at one of the opposite sides of the outer peripheral edge 56 adjacent to the transfer face 12 and the outer peripheral edge 56 of the helical vane 5. Shut-off portion 89 is spaced gradually farther away from the inner surface 57 of the cylindrical member 2 in the direction further upstream of the shut-off portion 89 in the transfer direction of the granules 13. Therefore, since foreign matter 90 and granules 13 pass through the outside of the shut-off portion 89 in a short period of time, there is no risk that the inner surface 57 of the cylindrical member 2 and the outer peripheral edge 56 of the helical vane 5 will be damaged or that the rotational load of the transfer member 43 will be increased.

Figure 31:
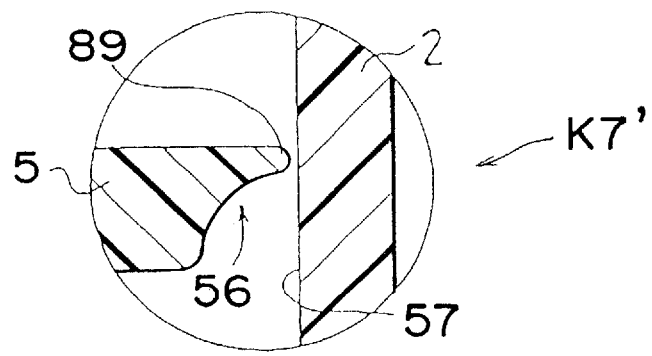

In the transfer device K7, a distal end of the shut-off portion 89 is not only formed flat in parallel with the inner surface 57 of the cylindrical member 2 but may also be formed acutely. Furthermore, as shown in FIG. 31 depicting a first modification K7' of the seventh embodiment, the shut-off portion 89 may have a round distal end. In addition, the outer peripheral edge 56 of the helical vane 5 is not only formed flat in the transfer device K7 but may also be curved as shown in FIG. 31.

Figure 32:
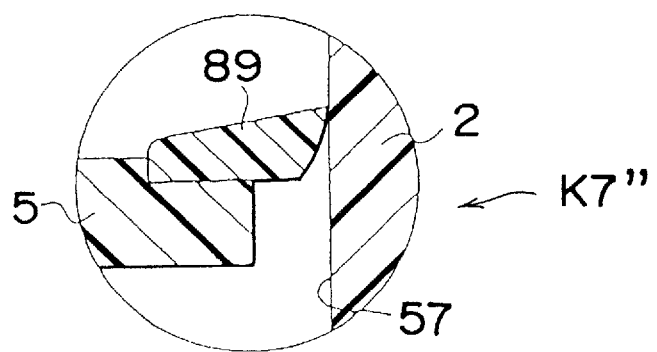

Meanwhile, in the transfer device K7, the shut-off portion 89 is formed by the outer peripheral edge 56 of the helical vane 5. However, as shown in FIG. 32 illustrating a second modification K7" of the seventh embodiment, the shut-off portion 89 may also be formed separately from the helical vane 5 so as to be attached to the helical vane 5.

The fourth to seventh embodiments are applied to the transfer of pharmaceuticals such as tablets and granules but may also be applied, needless to say, to the transfer of other solid articles. Meanwhile, the fourth to seventh embodiments are designed to transfer solid articles efficiently by obviating defects such as cracks and chips. In addition, the fourth to seventh embodiments, are not restricted to the above mentioned arrangements. Therefore, in the fourth to seventh embodiments, the material and the outside diameter of the cylindrical member and the transfer member, the pitch of the helical vane, the lead angle of the helical vane at its outer peripheral edge, the angle at which the helical vane projects from the central shaft, the rotational speed of the transfer member, and other components, specifications are properly set in combination in accordance with the kinds of solid articles to be transferred, the installation space, and other factors.

Meanwhile, the tablet inflow space 68 in communication with the supply portion may be eliminated in cases where there is no risk that the solid articles will be gripped between the side edge of the supply portion and the helical vane and thus, damaged, for example, as in the case where the amount of solid articles is small or where the solid articles are powdery or granular. However, if the tablet inflow space is provided, damage to the solid articles at the supply portion can still be prevented. In these cases, the shape of the mouth of the tablet inflow space, the shape of the cover, provision of an injection nozzle, the weir and the tablet sensor, the transfer space S whose volume increases gradually towards the downstream side in the transfer direction of the tablets, and other factors can be varied independently or in combination.

Furthermore, in the fourth to seventh embodiments, the tablets are transferred obliquely upwardly. However, the transfer devices according to the fourth to seventh embodiments can also be used for transferring the solid articles horizontally or obliquely downwardly without sacrificing any effectiveness.

Arrangement and function of the transfer devices K4 to K7 according to the fourth to seventh embodiments as described above, leads to the following beneficial effects.

[Effects of the transfer device K4]

(1) Since the angle formed between the axis of the cylindrical member and the horizontal plane is set at not more than 75° and since the lead angle of the helical vane is set at 3 to 25°, the solid articles can be upwardly transferred.

Furthermore, since the solid articles are upwardly moved by the transfer face of the helical vane, the solid articles can be transferred by using not only space in the vicinity of the inner surface of the cylindrical member but also by space in the vicinity of the central shaft. Thus, a large amount of the solid articles can be transferred continuously and efficiently.

(2) Since the inner surface of the cylindrical member is smooth, the rotational speed of the transfer member is set at not more than 500 r.p.m., and the solid articles are moved upwardly by the helical vane, the solid articles can be displaced smoothly on the helical vane without undergoing large pushing forces. Thus, they are subjected to neither flaws nor fractures.

(3) Since the solid articles supplied to the supply portion are transported in the cylindrical member and are discharged from the discharge portion, the transfer path is covered by the cylindrical member so as to be closed. Therefore, since both the entry of foreign matter into the solid articles from the outside and the scatter of the solid articles to the outside are eliminated, the solid articles can be transferred in an optimum state especially, in the production of pharmaceuticals.

(4) Since the transfer device is constituted by the cylindrical member, the transfer member, and the drive portion, the number of components of the transfer device is small. Furthermore, only the transfer member constituted by the central shaft and the helical vane is provided in the cylindrical member. As a result, by merely inserting the transfer member into the end portion of the cylindrical member or by drawing the transfer member therefrom, the transfer device can be assembled or disassembled, easily. Thus, the maintenance and service of the transfer device can be performed easily.

(5) Where the cleaning fluid inlet and the cleaning fluid outlet are provided at opposite ends of the cylindrical member and where the cleaning fluid supply source is connected with the cleaning fluid inlet, so as to supply the cleaning fluid into the cylindrical member, in-line rinsing and drying of the transfer device in its assembled state can be performed easily by introducing the cleaning fluid and the drying air into the cylindrical member from the end portion of the cylindrical member. Accordingly, items to be produced can be changed easily without contaminating each other, especially in the production of pharmaceuticals.

(6) In cases where the lid member is fixed to the end portion of the cylindrical member and pressurized air for sealing is fed to a gap between the peripheral surface of the through-hole formed in the lid member and the central shaft inserted through the through-hole, the gap can be effectively sealed by this pressurized air. Thus, it is possible to prevent the leakage of the cleaning fluid from the gap.

(7) Meanwhile, where the passage for supplying pressurized air is in communication with the transfer space defined between the cylindrical member and the transfer member, air bubbles can be produced in the cleaning fluid by introducing pressurized air into the cleaning fluid from the passage at the time of rinsing of the transfer device. Thus enhancing the rinsing effect by the bubbling.

(8) Furthermore, where the angle formed between the axis of the cylindrical member and the horizontal plane is set variably and where the central shaft is coupled with the drive portion so as to be forwardly and reversely rotated at not less than 250 r.p.m., the cleaning fluid can be stirred sufficiently by changing the attitude of the cylindrical member and by rotating the helical vane, hence subjecting the entire transfer device to an efficient rinsing. Meanwhile, if, at the time of drying of the transfer device, droplets of the cleaning fluid are expelled from the helical vane by the centrifugal force caused by rotating the helical vane, the transfer device can be dried rapidly by a large amount of drying air flowing along the entire surface of the helical vane.

(9) Where the supply portion is provided at one end of the cylindrical member and where a closure is provided on the periphery of the transfer member, at the end portion of the cylindrical member more adjacent to the end of the cylindrical member than the supply portion, so as to be rotated together with the transfer member, the solid articles are prevented, by the closure, from flowing into or remaining at the end of the cylindrical member or periphery of the bearing. As a result, damage to the bearing due to the entry of foreign matter can be avoided. Thus the solid articles supplied into the cylindrical member from the supply portion can be sequentially transferred to the discharge portion positively.

(10) As the gap between the inner surface of the cylindrical member and the outer peripheral edge of the helical vane has a dimension smaller than the external shape of each of the solid articles to be transferred, so as to lessen wear therebetween, the solid articles can be transferred by the helical vane without the risk that entry of foreign matter into the solid articles during their transfer. Furthermore, even if dust is produced from the solid articles during their transfer, this dust can be caused to fall through the gap. Hence, the dust can be easily removed from the solid articles to be transferred.

(11) Where the lid member, formed with the through-hole for inserting the central shaft therethrough, is detachably fixed to the end portion of the cylindrical member and where the end portion of the central shaft is rotatably supported by the lid member through a bearing such that a vacuum suction path is in communication with an intermediate portion of the through-hole via a porous member, the minute particles penetrating into the gap between the through-hole of the lid member and the central shaft are deposited on the porous member so as to fill this gap. As a result, since the gap between the through-hole of the cylindrical member and the central shaft can be sealed effectively, the deterioration of the bearing, and other related problems can be effectively eliminated.

[Effects of the transfer device K5]

(12) Since the tablet inflow space, which is in communication with the supply portion at the downstream side in the transfer direction, is defined outside the outer peripheral edge of the helical vane, the solid articles which have struck the side edge of the supply portion are carried into the tablet inflow space. Therefore, there is no risk that the solid articles will be gripped between the helical vane and the side edge of the supply portion. Thus, there is no risk that the solid articles will be damaged.

(13) Where the edge of the mouth of the tablet inflow space, which is disposed on the downstream side in the rotational direction of the transfer member, is set to intersect with the rotational direction of the transfer member at an angle of not less than 45°, the solid articles can be easily removed from between the edge of the mouth of the tablet inflow space and the helical vane, even if the solid articles rotating together with the helical vane strike the edge of the mouth of the tablet inflow space. Therefore, there is no risk that the solid articles will be gripped between the edge of the mouth of the tablet inflow space and the helical vane. Thus, there is no risk that the solid articles will be damaged.

(14) Where the injection nozzle is provided at the downstream side in the transfer direction of an end portion of the tablet inflow space so as to be directed towards the interior of the cylindrical member, solid articles can be exhausted from between the end portion of the tablet inflow space and the helical vane by gas injected from the injection nozzle. Hence, there is no risk that the solid articles will be gripped between the end portion of the tablet inflow space and the helical vane. Thus, there is no risk that the solid articles will be damaged.

(15) Where the cover for covering the tablet inflow space gradually slopes closer to the outer peripheral edge of the helical vane, towards the downstream side in the transfer direction, such that the distal edge of the cover is smoothly connected with the cylindrical member, the solid articles forced out of the outer peripheral edge of the helical vane will be thrust into the cylindrical member by the cover as the solid articles are transferred downstream. As a result, there is no risk that the solid articles will be gripped between the end portion of the tablet inflow space at the downstream side in the transfer direction and the helical vane. Thus, there is no risk that the solid articles will be damaged.

(16) Where the mouth of the tablet inflow space becomes gradually narrower towards the downstream side in the transfer direction, the width of the mouth of the tablet inflow space is smallest at the end portion of the tablet inflow space at the downstream side in the transfer direction. Hence, the solid articles can be easily removed from between the end portion of the tablet inflow space at the downstream side in the transfer direction and the helical vane by the injection nozzle or by the cover. Furthermore, since the area for expelling the solid articles by the gas injected from the injection nozzle is small, the number of injection nozzles can be reduced.

(17) Where a weir is provided between the supply portion and the tablet inflow space, so as to inwardly extend towards the outer peripheral edge of the helical vane, such that the solid articles pass between the weir and the outer peripheral edge of the helical vane, the solid articles supplied to the supply portion can be smoothly guided into the cylindrical member by the weir. Thus, the tablet inflow space can usually be kept vacant. As a result, when an extremely large stress would otherwise be applied to the solid articles at the supply portion, upon an increase of the amount of the solid articles supplied to the supply portion, the stress applied to the solid articles is reduced by carrying a portion of the solid articles from the supply portion to the tablet inflow space such that damage to the solid articles can be prevented.

(18) Where at least the distal end of the weir provided between the supply portion and the tablet inflow space is elastically deformed, stress applied to the solid article can be reduced by elastic deformation of the weir at the time the solid articles flow into the tablet inflow space from the supply portion, and through the weir thus, damage to the solid articles can be further prevented.

(19) Where a tablet sensor and a supply restriction member are provided in the supply path, communication with the supply portion and where the supply restriction member is actuated, upon the attainment of a predetermined level by the remaining solid articles, to restrict or to stop the supply of the solid articles into the supply portion, an excessively large amount of solid articles is prevented from remaining in the supply portion. Therefore, since an extremely large force is not applied to the solid articles in the supply portion from above, damage to the solid articles in the supply portion is prevented.

(20) If the tablet supply space is provided above the supply portion and if one end of the supply portion opens to the lower portion of the tablet supply space, the solid articles supplied from the supply path are less likely to be fed upwardly from the open end of the supply portion. Thus, an excessively large amount of the solid articles is prevented from remaining in the supply portion. Accordingly, since an extremely large force is not applied to the solid articles in the supply portion from above, damage to the solid articles in the supply portion is prevented.

(21) Where, in at least one of the regions in either the vicinity of the weir, disposed between the supply portion and the tablet inflow space, or in the vicinity of the downstream end of the tablet inflow space in the transfer direction, the volume of the transfer space defined between the cylindrical member and the transfer member, per pitch of the helical vane, is gradually increased towards the downstream side in the transfer direction, the solid articles, which flow from the supply portion into the tablet inflow space upon an excessively large supply of the solid articles, or which have regularly flowed into the tablet inflow space, can be smoothly displaced into the transfer space between the cylindrical member and the transfer member, whose volume is gradually increased towards the downstream side in the transfer direction. As a result, stress applied to the solid articles can be reduced. Thus, damage to the solid articles can be prevented. Meanwhile, since the tablet inflow space can be kept vacant at all times, even if the tablet inflow space is small, an excessively large amount of solid articles from the supply portion can be smoothly carried into the cylindrical member.

[Effects of the transfer device K6]

(22) Since the solid articles supplied from the supply portion are smoothly transferred without being gripped between the supply portion and the helical vane, the solid articles can be efficiently and upwardly transferred without being damaged. Furthermore, since the transfer device as a whole is closed and since in-line rinsing of the transfer device can be performed, maintenance and service of the transfer device can be performed easily. Thus, the transfer device is especially suitable for transferring pharmaceuticals such as tablets or capsules.

Figure 33:
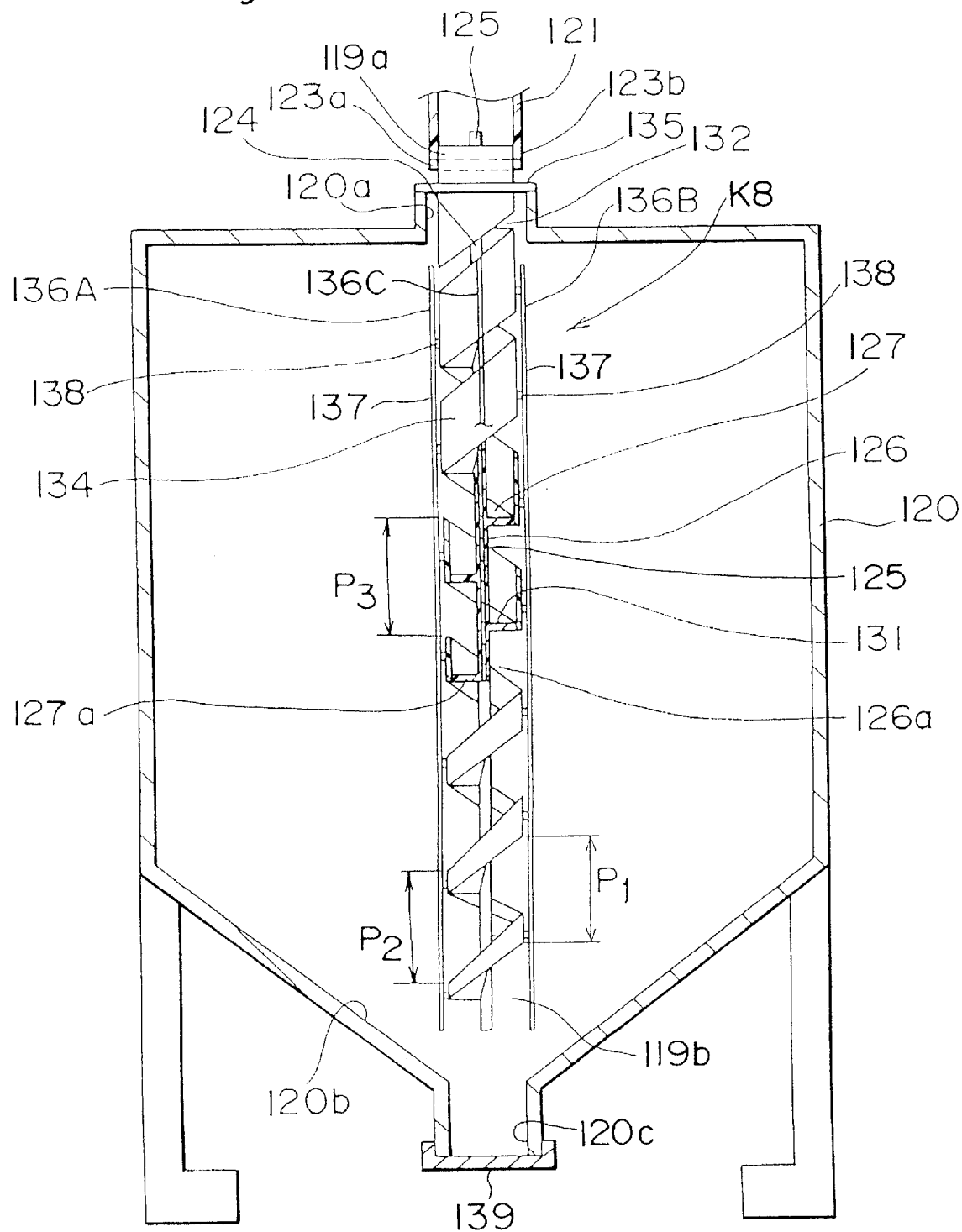
FIG. 33 is a partly sectional front elevational view of a transfer device acting as a supply device for supplying solid articles into a vessel, according to an eighth embodiment of the present invention.
Figure 34:
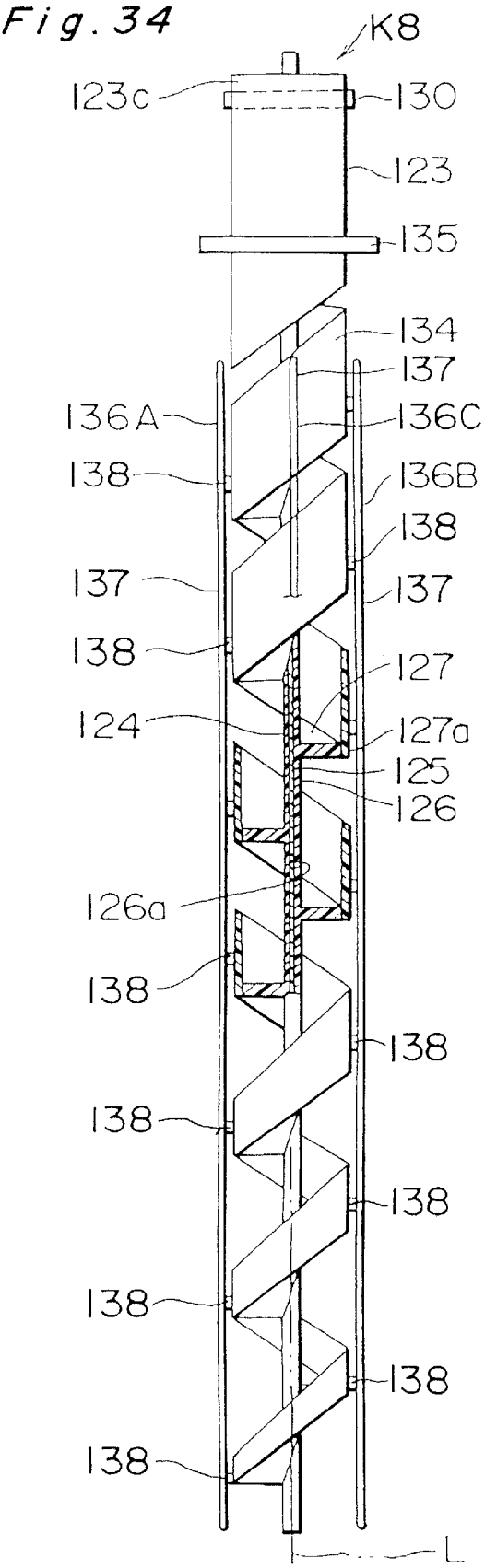
FIG. 34 is a partly sectional front elevational view of the transfer device of FIG. 33.
Figure 35:
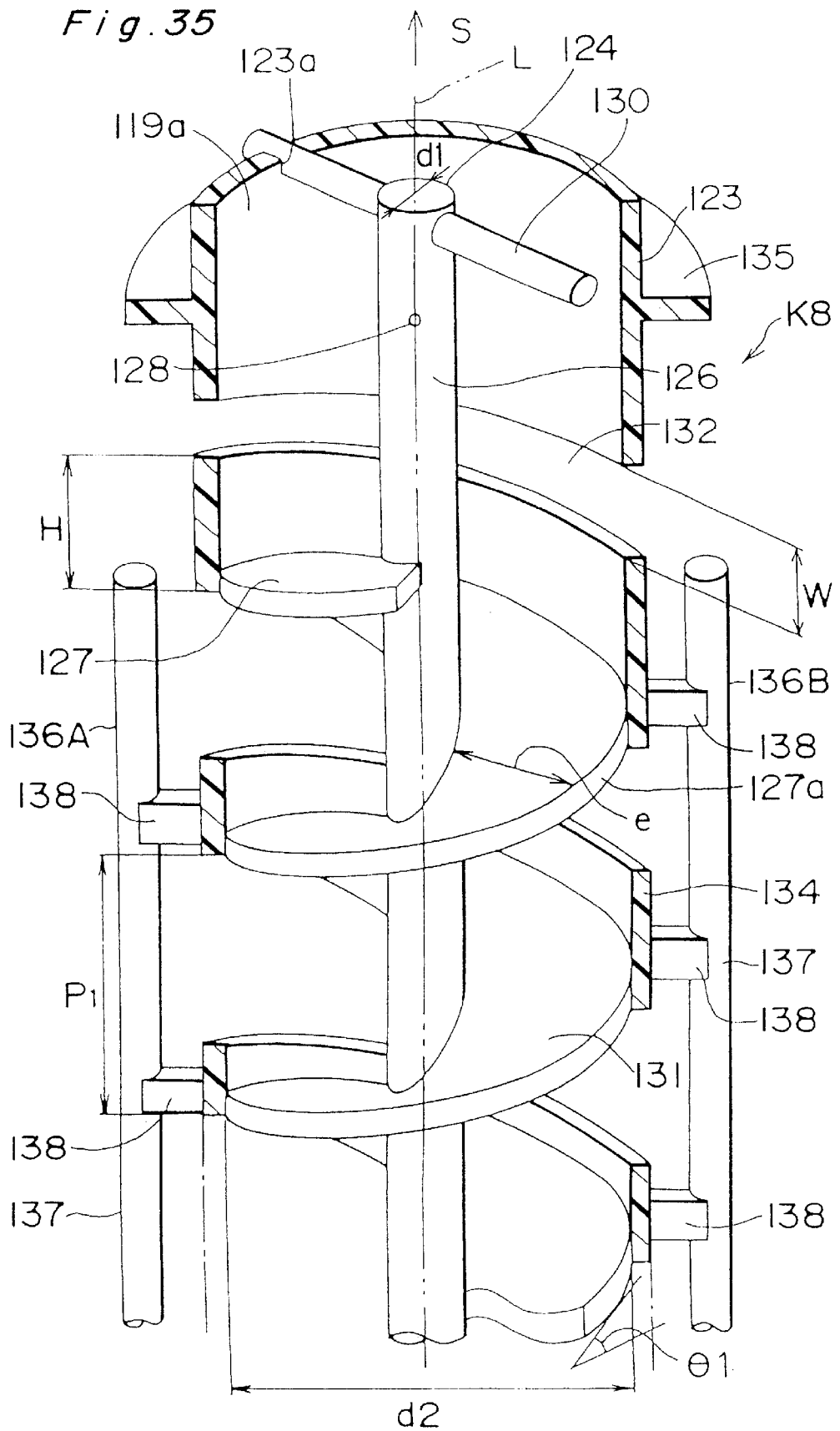
FIG. 35 is a partially broken fragmentary perspective view of a guide member and a side wall member of the transfer device of FIG. 33.

FIGS. 33 to 35 show a transfer device K8 according to an eighth embodiment of the present invention, which acts as a supply device for supplying the tablets 13 into a transfer vessel 120 in production processes of the tablets 13. The transfer vessel 120 is formed by a flow bin. A lower main portion of the transfer device K8 is inserted into the transfer vessel 120, while an upper end portion of the transfer device K8 is secured to an upper opening of the transfer vessel 120 and connected with a supply pipe 121 of a transfer device (not shown) for transferring the tablets 13 from the preceding process.

The transfer device K8 includes a helical guide member 124 and a tubular side wall member 134. The guide member 124 includes a central shaft 126 made of ultra-high-density polyethylene and a helical vane 127 formed integrally on an outer peripheral surface of the central shaft 126 by, for example, cutting and engraving. The central shaft 126 has a core 125 made of metal such as iron, steel, aluminum, titanium, nickel, or any other suitable materials. The side wall member 134 is provided on an outer peripheral edge 127*a* of the helical vane 127. Since the upper and the lower ends of the transfer device K8 are open, an opening at the upper end of the transfer device K8 forms a supply opening 119*a* for the tablets 13 and an opening at the lower end of the transfer device K8 forms a discharge opening 119*b* for the tablets 13.

The central shaft 126 is formed by a straight circular shaft having an outside diameter d1 of 20 mm. As shown in FIGS. 33 and 34, the core 125 is inserted into a bore 126*a* of the central shaft 126, which extends along an axis L of the guide member 124. As shown in FIG. 35, the core 125 is fixed to the central shaft 126 by a pin 128. Since the core 125 is inserted into the central shaft 126 as described above, the strength of the guide member 124 is high. However, core 125 need not be made with the material of guide member 124. As shown in FIG. 35, when the guide member 124 has been inserted into the side wall member 134, a rod 130 is orthogonally mounted on an upper end portion of the core 125. Rod 130 is detachably brought into engagement with a pair of slots 123*a* and 123*b* formed on an upper end of a tubular mounting portion 123 of the side wall member 134 such that the guide member 124 is secured to the side wall member 134.

The helical vane 127, formed integrally with the central shaft 126, has an outside diameter d2 of 104.5 mm. A guide face 131, formed on an upper face of the helical vane 127, covers a space between the outer peripheral surface of the central shaft 126 and an inner peripheral surface of the side wall member 134 when the transfer device K8 is viewed from 5 above. As shown in FIG. 33, the guide face 131 of the helical vane 127 is formed orthogonally to the central shaft 126 extending horizontally. Meanwhile, a helical pitch $P_1$ of the helical vane 127 is properly set within a range of about 100 to 300 mm. Meanwhile, in this embodiment, the helical vane 127 is formed such that the guide face 131 extends orthogonally to the axis L of the central shaft 126, i.e., the horizontal helix.

In this embodiment, the outside diameter d1 of the central shaft 126 is set at 20 mm and the outside diameter d2 of the helical vane 127 is set at 104.5 mm as described above. It is preferable that the outside diameters d1, of the central shaft 126, and d2, of the helical vane 127, are set such that a distance e, of the helical vane 127 projecting from the central shaft 126, is larger than the outer diameter d1, of the central shaft 126 of the guide member 124. If the outside diameters d1 and d2 are set as described above, the area of the guide face 131 of the helical vane 127 is increased. Thus, the amount of tablets 13 capable of being supplied per unit time can be increased.

The helical pitch $P_1$ of the helical vane 127 is set based on the desired rate of slide or on the extent of accumulation, or piling, of tablets on guide face 131. Namely, since an angle 61 of the slope of the guide face 131 at the outer peripheral edge varies depending on several factors, such as sugar-coated tablets, uncoated tablets and film coated tablets, surface roughness, shape, size and weight of the tablets 13, the helical pitch $P_1$ of the helical vane 127 should be determined such that angle θ1 is set to provide an adequate amount of tablets 13.

In this embodiment, since the outside diameter d1 of the helical vane 127 is set at 104.5 mm and the helical pitch $P_1$ of the helical vane 127 is set at 100 to 300 mm, the angle θ1, of the slope the guide face 131 at the outer peripheral edge 127*a*, is set at 17° to 43°. Generally, it is preferable that the angle θ1, of slope of the guide face 131 at the outer peripheral edge 127*a*, be set at approximately 10° to 60°. Ultra-high-density polyethylene is used for the central shaft 126 and the helical vane 127 of the guide member 124 because the sliding property of the tablets 13 displaced on the helical vane 127 tends to be excellent, and because of its low coefficient of friction, and its tendency to safely supply pharmaceutical solid articles. Furthermore, ultra-high-density polyethylene is unlikely to fracture due to its high strength and therefore, is also suitable for the guide member 124, in this respect. However, the central shaft 126 and the helical vane 127 need not be restricted to ultra-high-density polyethylene. Thus, the central shaft 126 and the helical vane 127 may also be made of other resinous materials having excellent sliding property, low coefficient of friction, great safety, high strength, etc., for example, polypropylene, acrylonitrile-butadiene-styrene resin, polyamide nylon 6, monomer casting nylon, polyacetal, ethylene fluoride, vinyl chloride, polyphenylene oxide and polyurethane.

The side wall member 134 for receiving the guide member 124 forms a side wall along helical vane 127, throughout its outer peripheral edge 127*a*, and projects, upwardly, from the upper face, or, in other words, the guide face 131 of the helical vane 127. In this embodiment, a height H is measured from the guide face 131 to an upper end of the side wall member 134. Height H is continuously increased from a lower end portion of the guide member 124 towards an upper end portion of the guide member 124. Namely, the height H of the side wall member 134 is set not less than about 20 to 30 mm, the thickness of one solid article to be supplied, at a lowermost position of the helical vane 127 and is continuously increased at a fixed rate as side wall member 134 approaches an upper end portion of guide member 124.

In this embodiment, the side wall member 134 is made of transparent polycarbonate and is formed by a cylinder having an inside diameter of about 105 mm and a length of 1 m, with open opposite ends. The side wall member 134 is formed with an opening 132 extending helically continuously from its upper end to its lower end. The side wall member 134 is constituted by the non-opening helical portion of the cylinder. A lower pitch $P_2$ of the opening 132 is identical with the helical pitch $P_1$ of the helical vane 127 while an upper pitch $P_3$ of the opening 132 is larger than the lower pitch $P_2$ Meanwhile, a width W of the opening 132 is increased continuously from the upper end portion of the guide member 124 towards the lower end portion of the guide member 124 such that the height H of the side wall member 134 is increased continuously from the lower end portion of the guide member 124 towards the upper end portion of the guide member 124.

A short tubular mounting portion 123, for detachably fixing the side wall member 134 to the guide member 124 is provided at an uppermost portion of side wall member 134. A pair of the slots 123*a* and 123*b*, for detachably receiving the rod 130, are formed on the upper end of the tubular mounting portion 123. Meanwhile, a flange 135, for detachably mounting the transfer device K8 onto the transfer vessel 120, is provided on an outer periphery of a lower end of the tubular mounting portion 123. When the flange 135 of the side wall member 134 is retained by an edge of the supply opening 120*a* of the transfer vessel 120, the transfer device K8 is fixed to the transfer vessel 120 such that the lower end portion of the guide member 124 is disposed adjacent to a bottom portion 120*b* of the transfer vessel 120. In this embodiment, a distance between a lower end of the guide member 124 and the bottom portion 120*b* of the transfer vessel 120 is set at not more than 70 mm, preferably, not more than 50 mm. This distance reduces the impact of the tablets 13 falling from the discharge opening 119b of the transfer device K8 to the bottom portion 120b. Damage to the tablets 13 is therefore prevented.

Polycarbonate is used for the side wall member 134 because of its excellent sliding property, its low coefficient of friction, and its tendency to safely transfer pharmaceutical solid articles. Additionally, a polycarbonate side wall member 134, due to its high strength, is unlikely to fracture. Furthermore, since polycarbonate is transparent, the flow of the tablets 13 on the guide face 131 of the helical vane 127 can be visually inspected. However, the material of the side wall member 134 need not be restricted to polycarbonate. Thus, the side wall member 134 may be made of other resinous materials having excellent sliding property, low coefficient of friction, great safety and high strength, etc. To this end, methacrylate and polystyrene are suitable for the side wall member 134 due to their transparency.

Reference numerals 136A, 136B, and 136C denote frame members. Each of the frame members 136A, 136B, and 136C includes a resinous rod 137 which is provided outside the side wall member 134 in parallel with the central shaft 126. Each frame member further includes a plurality of coupling portions 138 for coupling the rod 137 with the side wall member 134. By providing the frame members 136A, 136B, and 136C, the strength of the side wall member 134 having the helical opening 132 is increased. The shape of side wall member 134 is thus retained without being collapsed in the direction of the axis L of the central shaft 126. In addition, in this embodiment, three frame members 136A, 136B and 136C are provided, but the existence of a single frame member may suffice. Meanwhile, the rod 137 may also be made of metal.

The operation of transfer device K8 to supply tablets 13 into the transfer vessel 120 is now described. When the transfer device K8 is used, the lower end portion of the transfer device K8 is inserted into the transfer vessel 120 through the supply opening 120a of the transfer vessel 120. The flange 135 is placed on a brim of the supply opening 120a of the transfer vessel 120. Meanwhile, the supply pipe 121 of the tablets 13 is connected with the upper end of the tubular mounting portion 123. In this state, the tablets 13 are supplied into the supply opening 119a from the supply pipe 121 of the transfer device.

Figure 36:
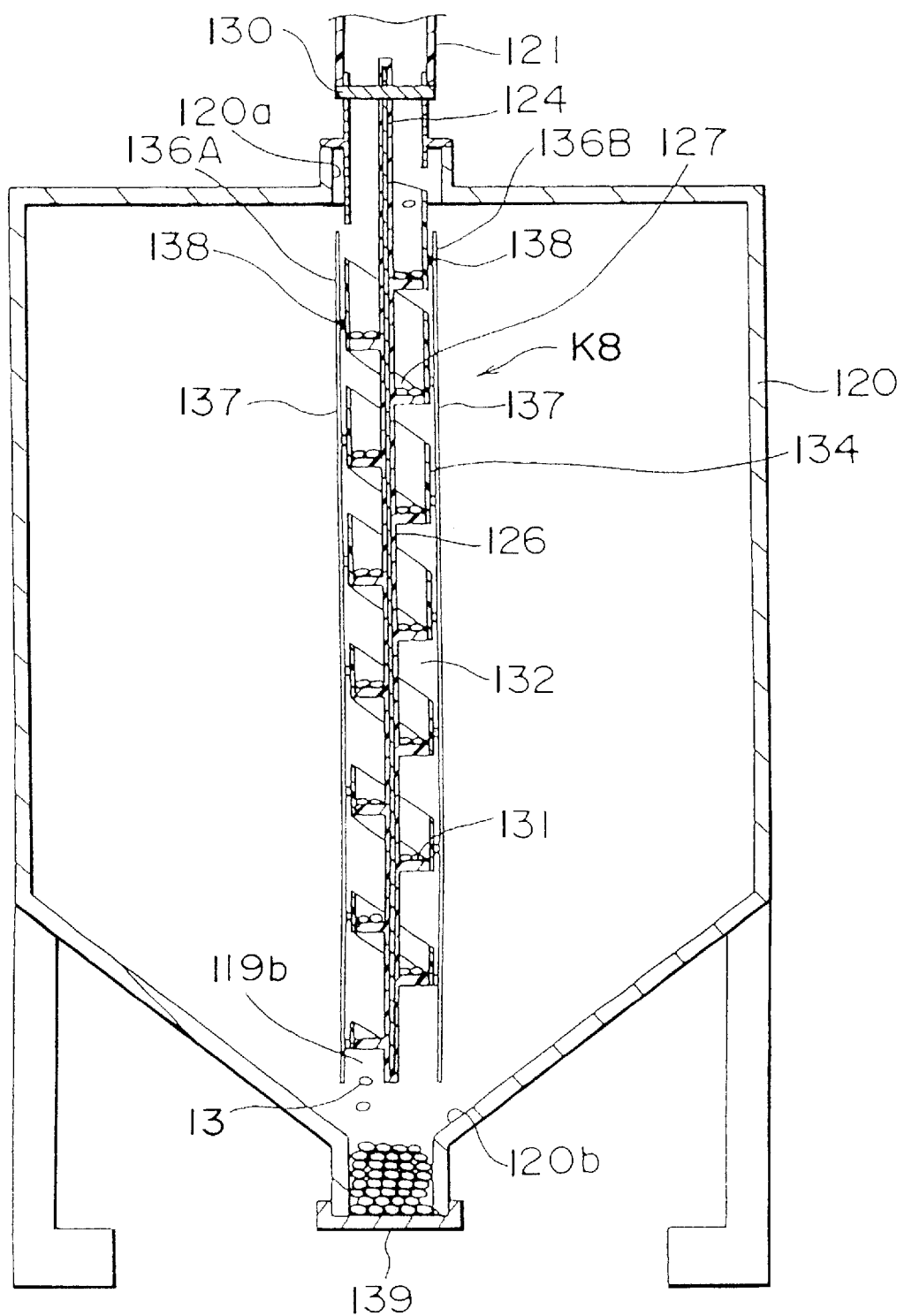
FIG. 36 is a view similar to FIG. 33, prior to the closing of a discharge opening of the transfer device of FIG. 33 by tablets, during the supply of tablets into the vessel by the transfer device of FIG. 33.

As shown in FIG. 36, the supplied tablets 13 are delivered to the guide face 131 of the helical vane 127 by their own weight. Subsequently, the tablets 13 fall in the transfer device K8 through discharge opening 119b to the bottom portion 120a of the transfer vessel 120. The path of descent can be described as turning helically about the central shaft 126. At this time, the tablets 13 fall slidingly on the guide face 131 but may also roll as they slide on the guide face 131 depending on their shape, surface conditions, and other factors. Meanwhile, the tablets 13 fall in layers according to the supply amount of the tablets 13 per unit time. Since the tablets 13 fall while turning helically and since the lower end portion of the guide member 124 is disposed adjacent to the bottom portion 120b of the transfer vessel 120, the falling distance of the tablets 13 is small. Therefore, the tablets 13 supplied to the transfer vessel 120 are not subjected to cracks and chips. Thus the deterioration of the tablets 13 can be prevented.

As the central shaft 126 and the helical vane 127 of the guide member 124 are formed integrally as described above, the connecting portions between the central shaft 126 and the helical vane 127 are smooth. Thus, the tablets 13 are not damaged by the connecting portions between the central shaft 126 and the helical vane 127.

Furthermore, since the guide member 124 is made of ultra-high-density polyethylene, the coefficient of friction between the tablets 13 and the helical vane 127 is small. Thus, wear of the tablets 13, from the sliding fall, can be prevented. In addition, in cases where the tablets 13 are displaced while rolling on the guide face 131 of the helical vane 127, the impact of the tablets 13 striking the guide face 131 is small. Thus, damage to the tablets 13 can be prevented.

Figure 37:
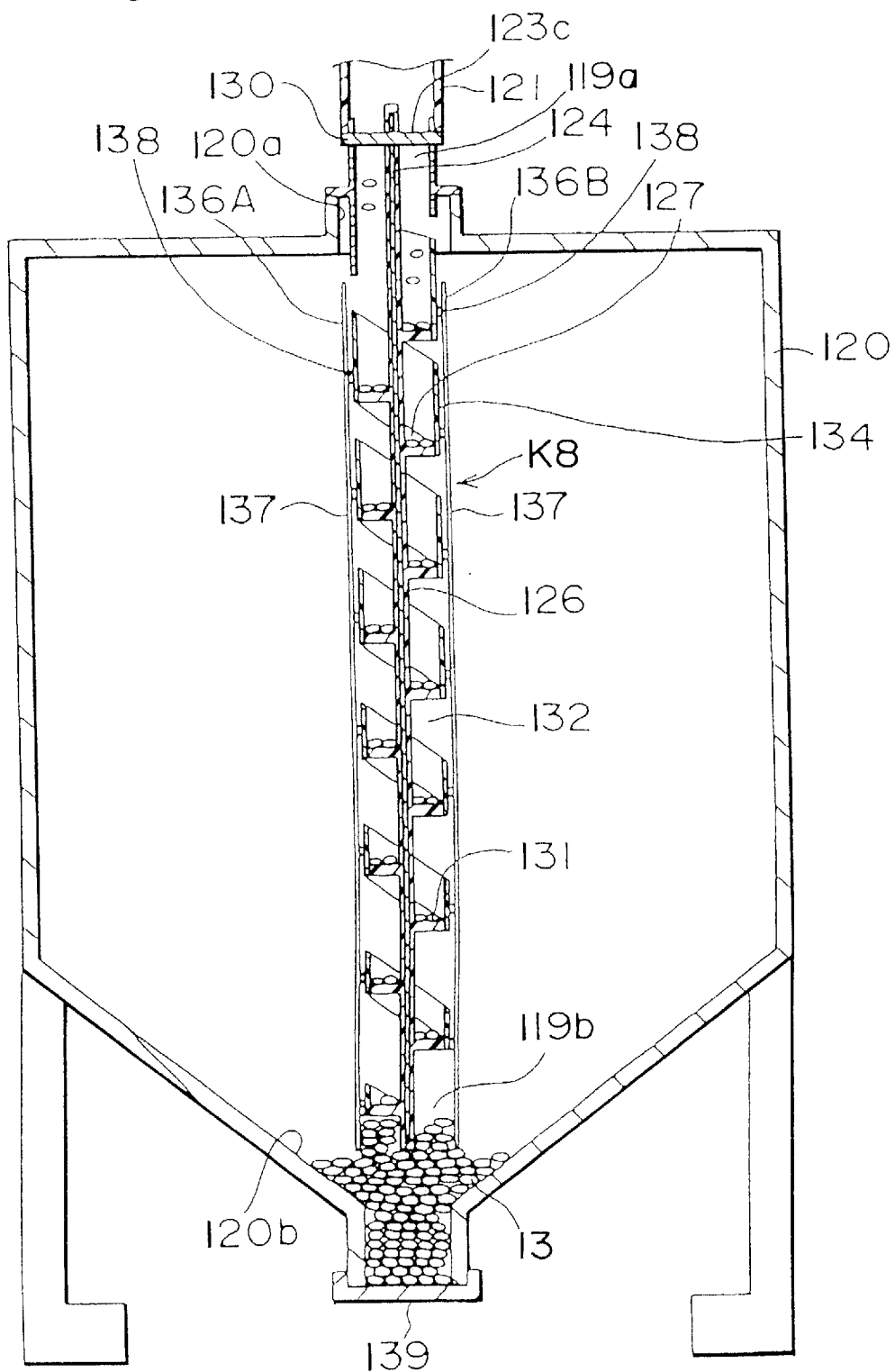
FIG. 37 is a view similar to FIG. 36, showing a state of closing of the discharge opening of the transfer device of FIG. 33 by the tablets.
Figure 38:
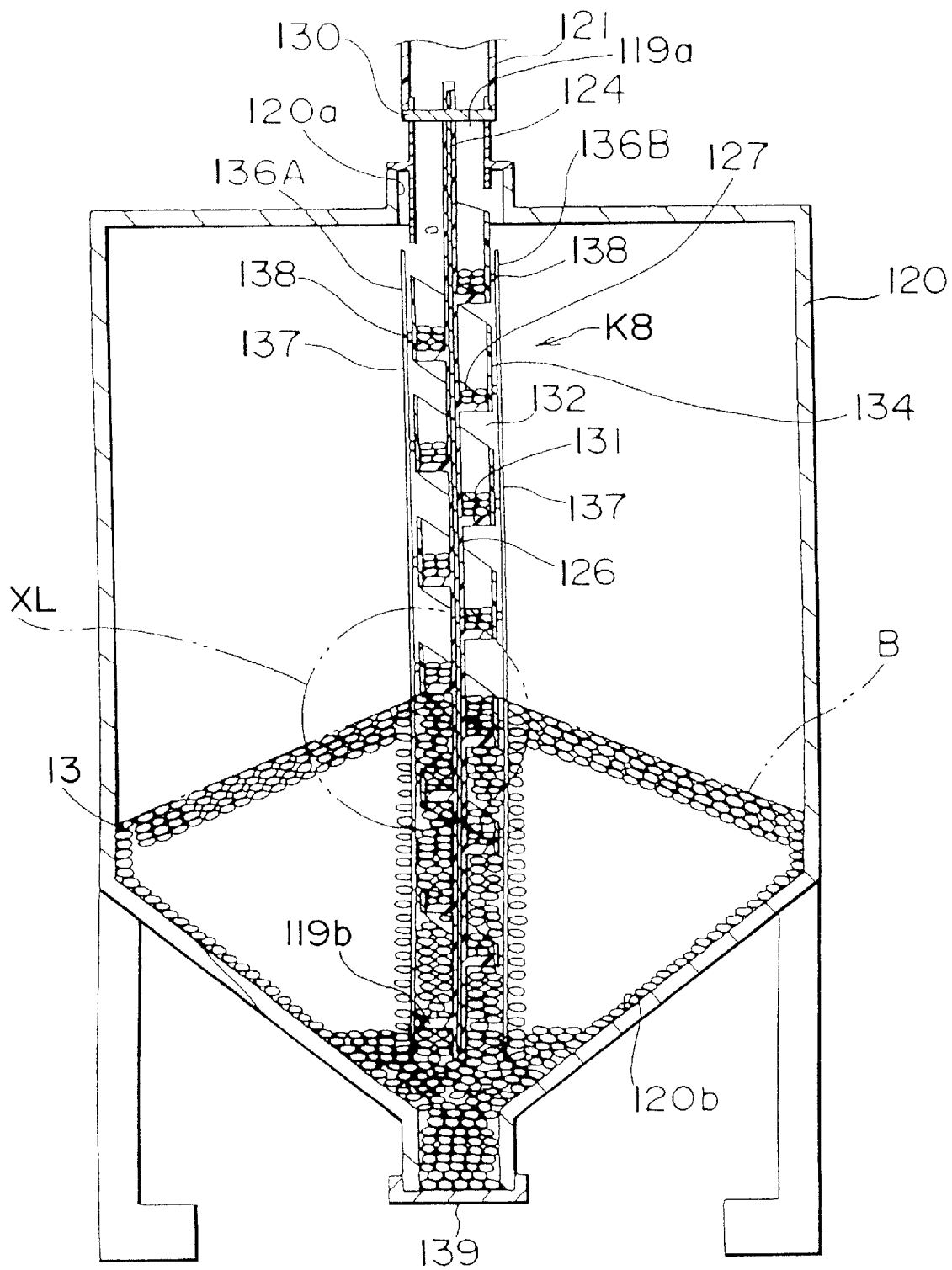
FIG. 38 is a view similar to FIG. 37, showing a state of overflow of tablets beyond the side wall member in the vicinity of the discharge opening of the transfer device of FIG. 33.

After a certain amount of the tablets 13 have accumulated in the bottom portion 120b of the transfer vessel 120 as shown in FIG. 37, the discharge opening 119b is closed by the tablets 13. Hence the tablets 13 are not discharged from the discharge opening 119b. Thus, layers of the tablets 13 are formed on the guide face 131 by the tablets 13 supplied from the supply opening 119a. If the tablets 13 are further supplied from the supply opening 119a, the newly supplied tablets 13 slide or roll on the layers of the tablets 13 so as to reach the vicinity of the lower end portion of the guide member 124. When the newly supplied tablets 13 are piled on the accumulated tablets 131 in the vicinity of the discharge opening 119b or when the tablets 13 accumulated in the vicinity of the discharge opening 119b are pushed by the newly supplied tablets 13, the tablets 13 ride over the side wall member 134 flowing out of the opening 132 into the transfer vessel 120. When the tablets 13 are further supplied from the supply opening 119a, the opening 132 is closed by the tablets 13 sequentially upwardly from its lower end. Namely, as shown in FIGS. 38 and 40, the newly supplied tablets 13 ride over the side wall member 134 sequentially upwardly from a portion of the side wall member 134 immediately above the opening 132 closed by the tablets 13 flowing out of the opening 132 into the transfer vessel 120. As a result, as shown in FIG. 39, the tablets 13 are filled in the transfer vessel 120 up to its upper end portion.

Figure 39:
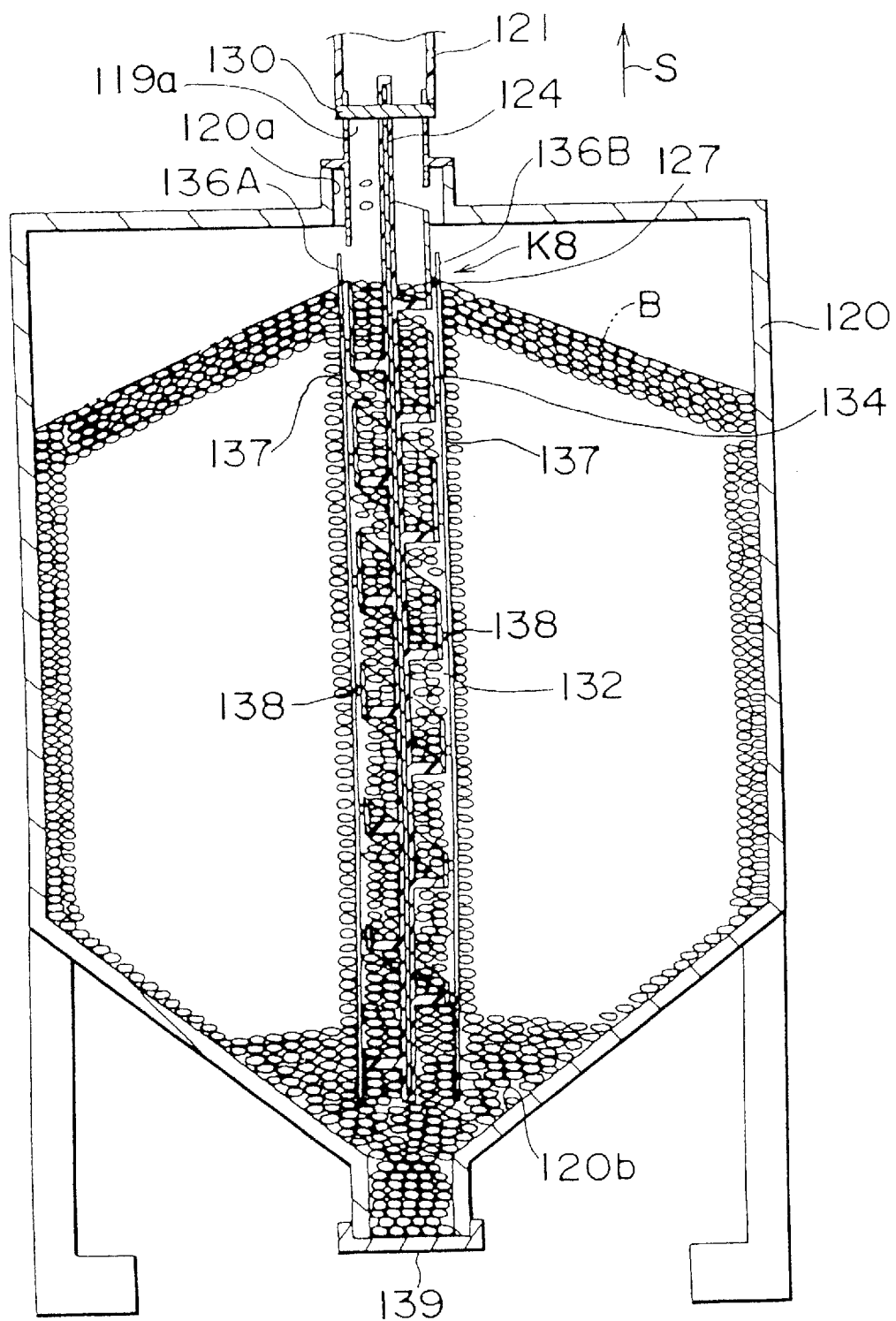
FIG. 39 is a view similar to FIG. 38, showing a state of overflow of tablets beyond the side wall member at an upper end of the transfer device of FIG. 33.
Figure 40:
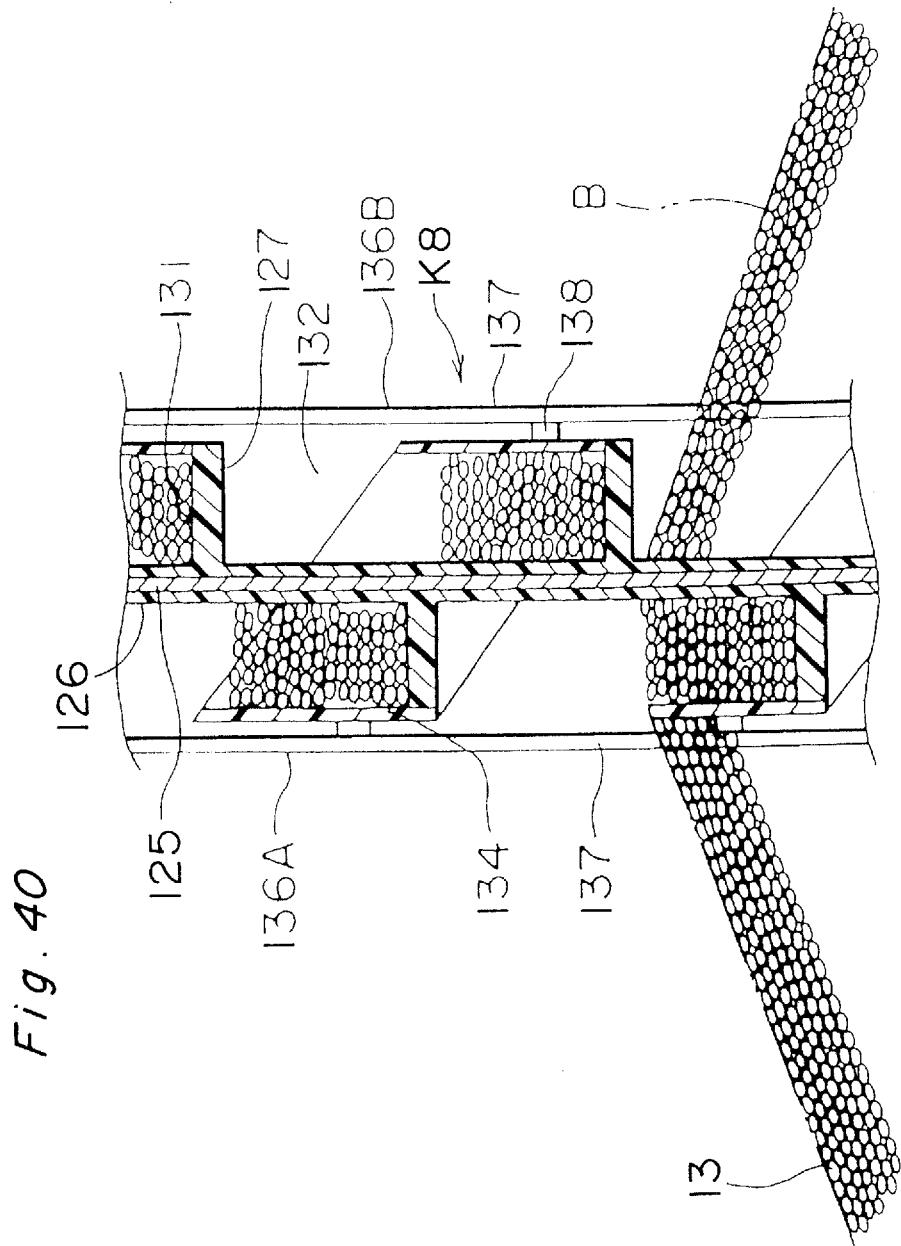
FIG. 40 is an enlarged view of a portion XL in FIG. 38.

In the transfer device K8, when a surface B of the tablets 13 stored in the transfer vessel 120 rises in response to the increase of tablets 13 filled in the transfer vessel 120 as shown in FIG. 39, the position on the transfer device K8, at which the tablets 13 flow out of the transfer device K8, also rises continuously. Thus, the falling distance of the tablets 13 is kept at substantially zero. Therefore, since the tablets 13 are not subjected to flaws, cracks, and chips, the tablets 13 can be supplied into the transfer vessel 120 without deterioration.

Meanwhile, in the transfer device K8, after the discharge opening 119b has been closed by the tablets 13, the tablets 13 ride over the helical side wall member 134 sequentially upwardly from the lower end portion of the guide member 124 so as to be discharged into the transfer vessel 120. Therefore, the direction of discharge of the tablets 13 into the transfer vessel 120 is rotated about the axis L of the central shaft 126. Accordingly, the tablets 13 are supplied uniformly into the transfer vessel 120.

Furthermore, in the transfer device K8, since the tablets 13 can be supplied into the transfer vessel 120 continuously, the supply rate of the tablets 13 is high.

Figure 1:
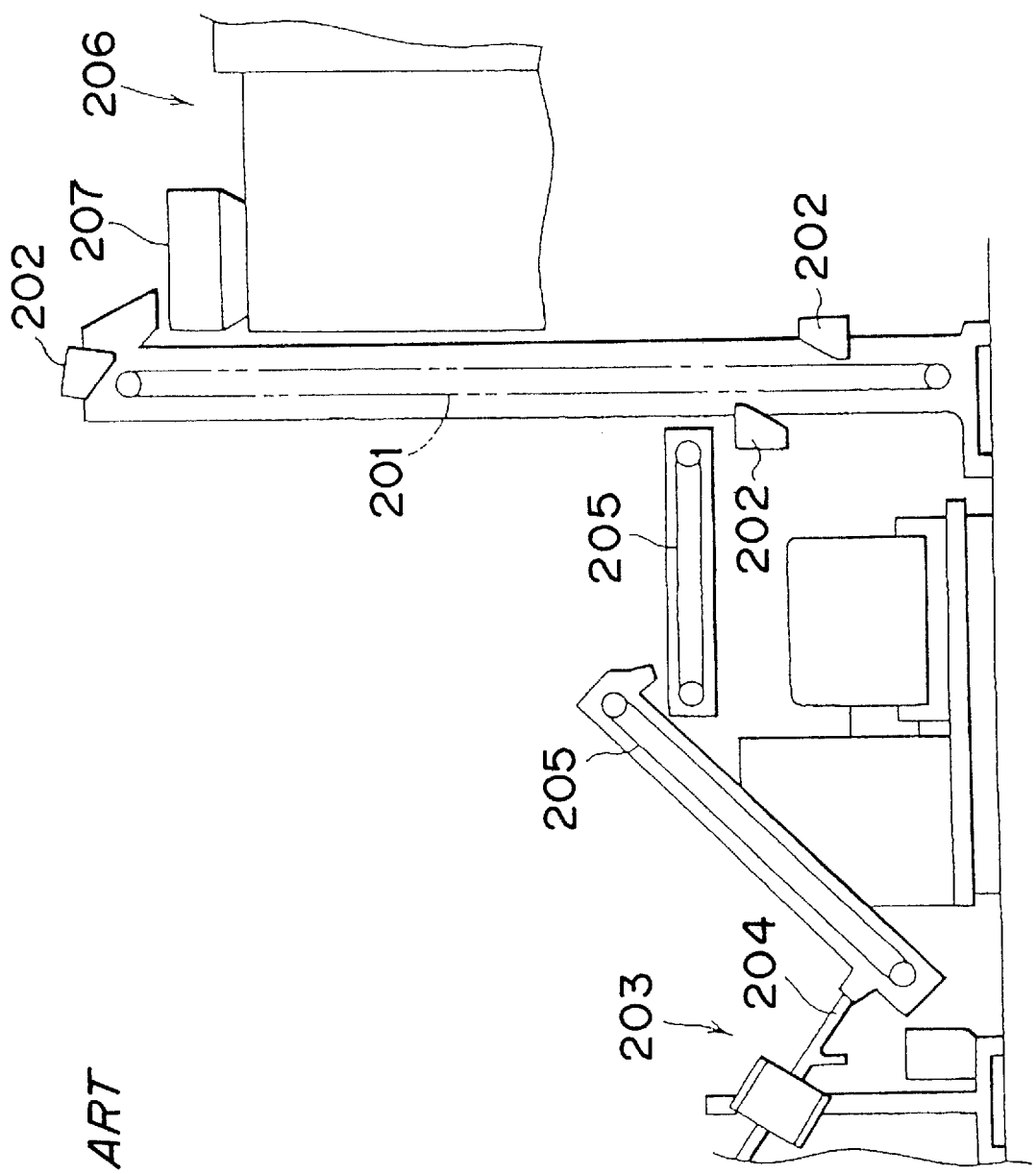
FIG. 1 is a schematic view of a prior art bucket conveyor.
Figure 2:
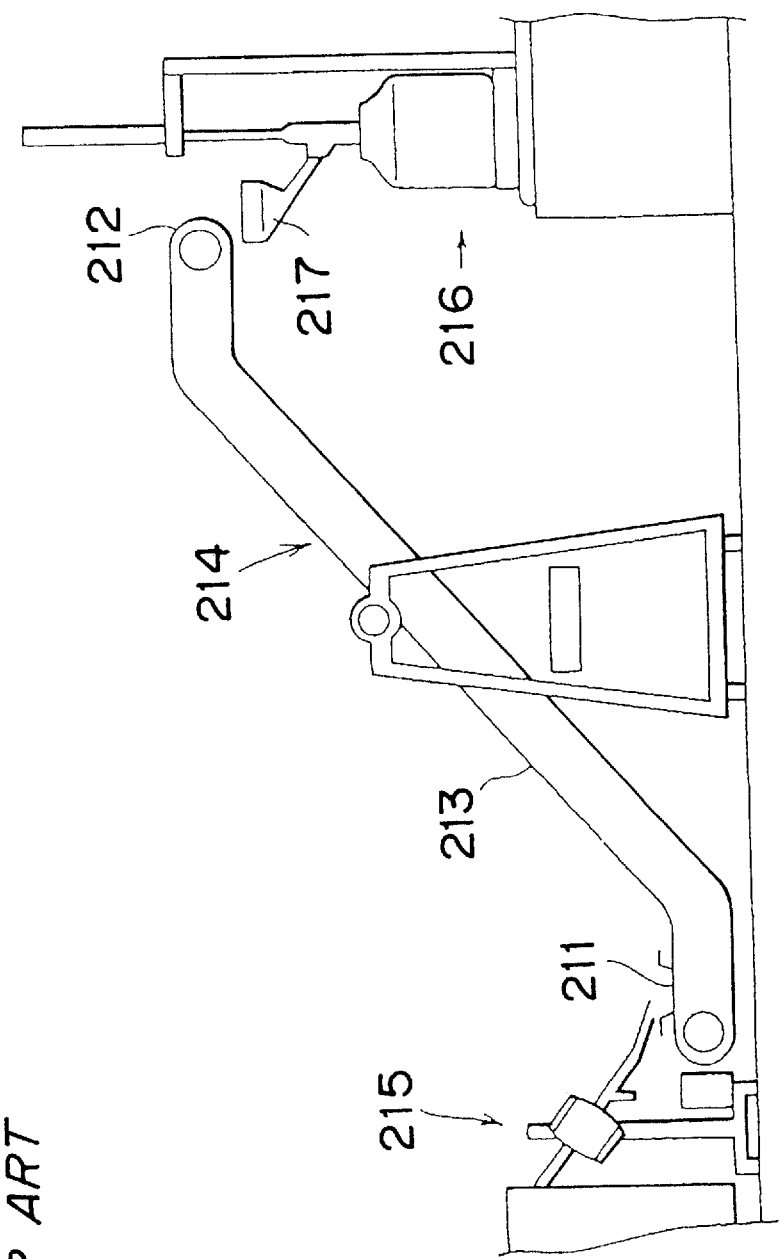
FIG. 2 is a schematic view of a prior art inclined belt conveyor.
Figure 3:
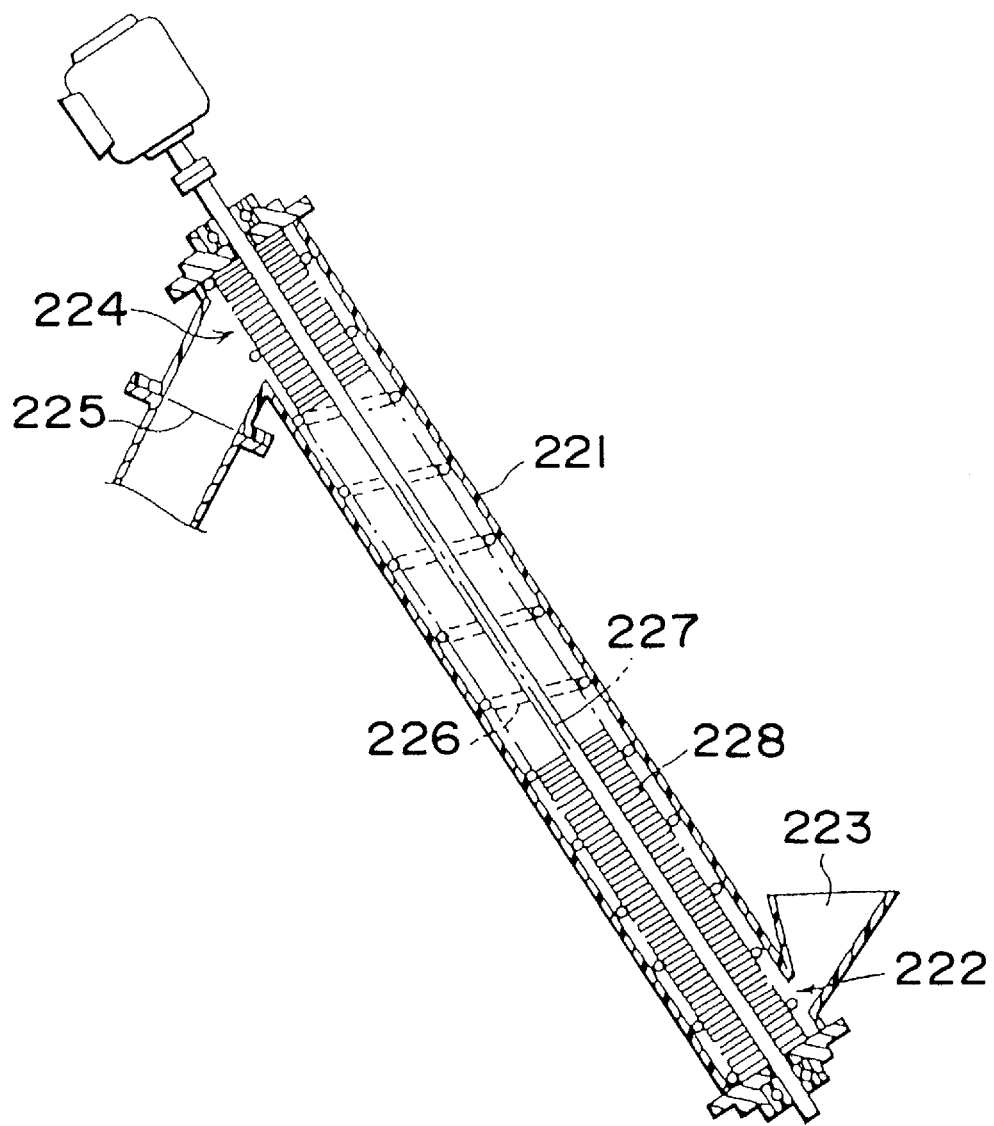
FIG. 3 is a longitudinal sectional view of a prior art brush conveyor.
Figure 4:
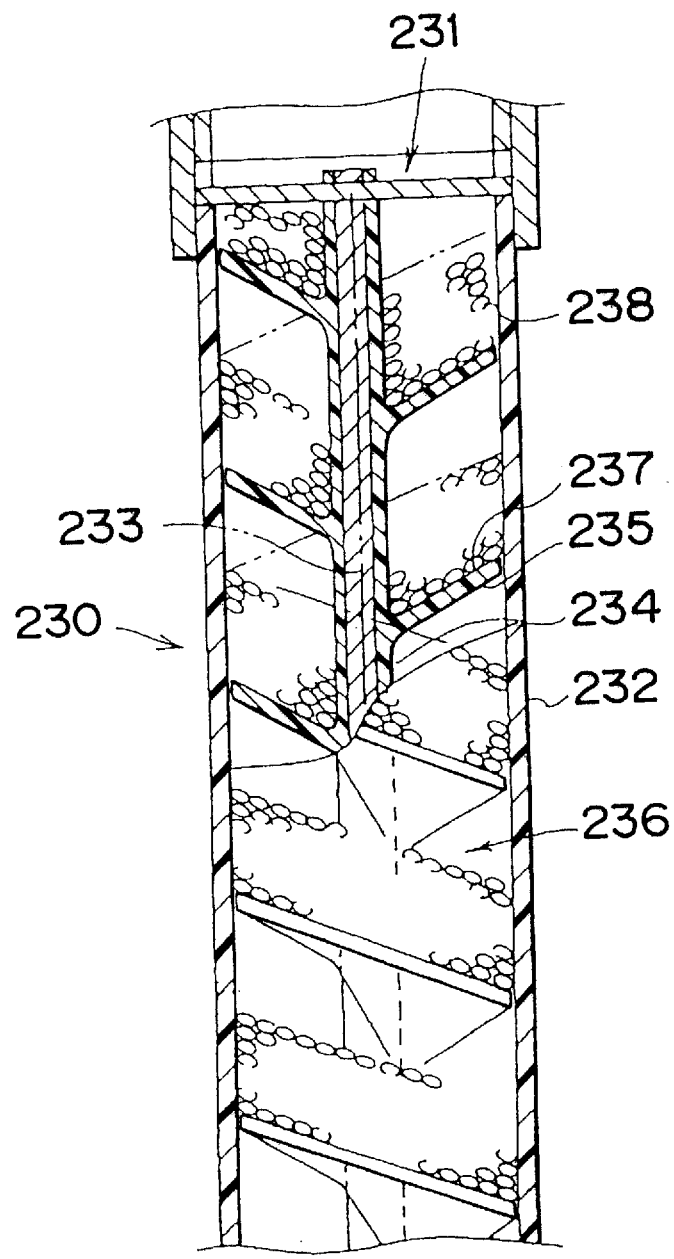
FIG. 4 is a fragmentary longitudinal sectional view of a prior art transfer device.
Figure 5:
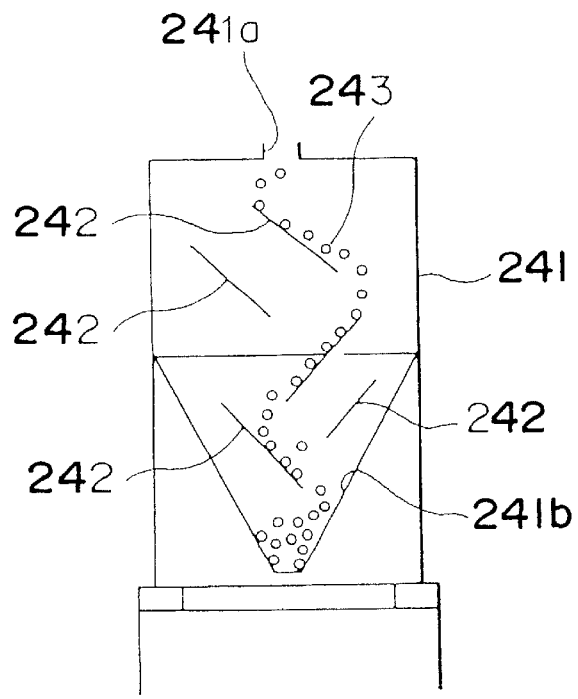
FIG. 5 is a schematic view of a prior art flow bin.
Figure 6:
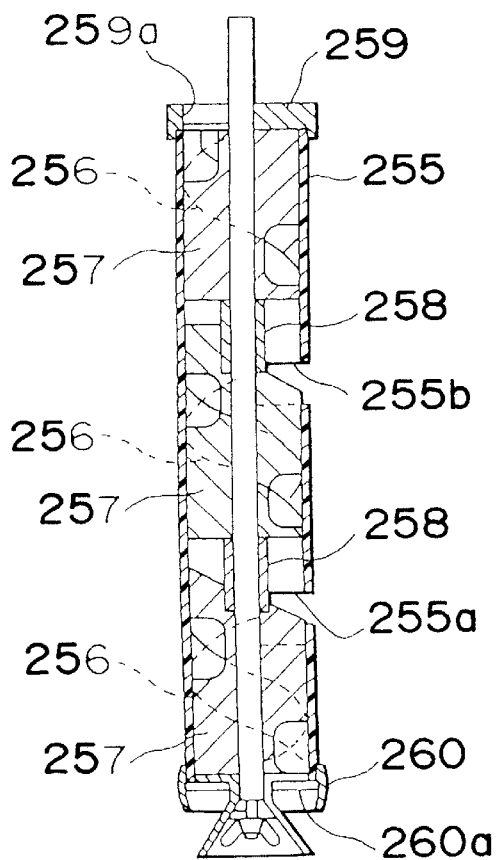
FIG. 6 is a longitudinal sectional view of a prior art supply device.
Figure 7:
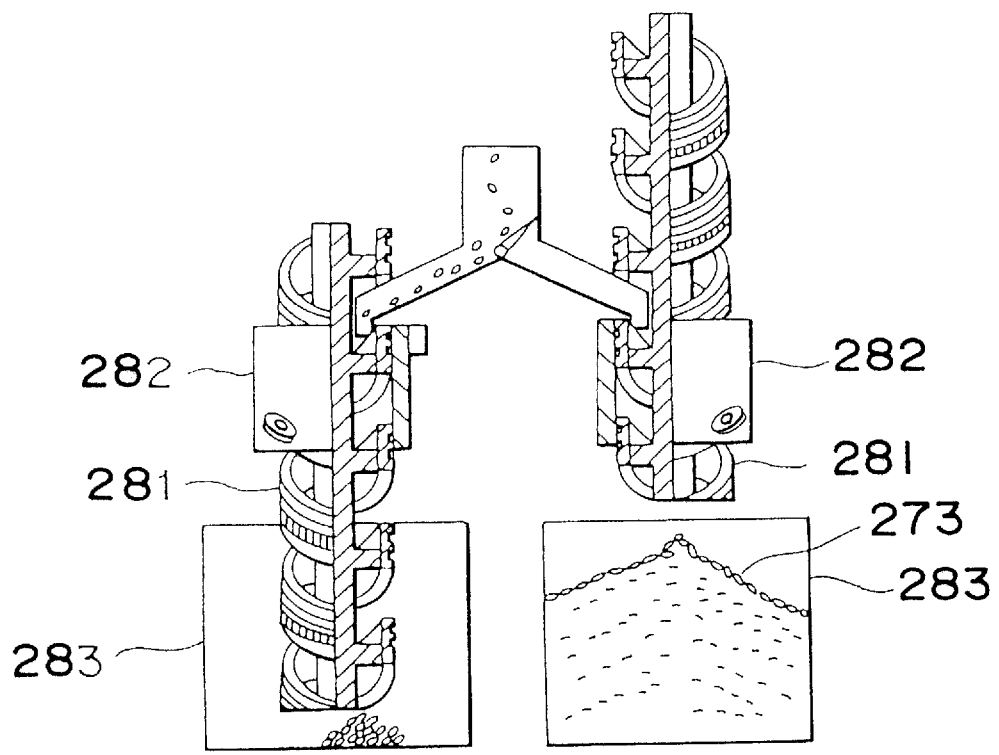
FIG. 7 is a longitudinal sectional view of another prior art supply device.

In addition, since a drive mechanism and a control mechanism employed by the prior art supply device shown in FIG. 7 are not required the transfer device K8 is simple in structure and compact in size thus, resulting in a low production cost.

In the transfer device K8, the height H of the side wall member 134 is continuously increased from the lower end portion of the guide member 124 towards the upper end portion of the guide member 124. Therefore, as the surface B of the tablets 13 stored in the transfer vessel 120 rises in response to increase of tablets 13 filled in the transfer vessel 120, the position on the transfer device K8, at which the tablets 13 are discharged from the transfer device K8, is raised accordingly. Namely, the height H of the side wall member 134 is small at the lower end portion of the guide member 124. Therefore, once the discharge opening 119b is closed by the tablets 13, the newly supplied tablets 13 ride over the side wall member 134 so as to flow into the transfer vessel 120.

In cases where the tablets 13 become lodged at the upper end portion of the guide member 124 or become accumulated temporarily at a location of the guide device K8 disposed upwardly of the opening 132 closed by the tablets 13, for instance, when the tablets 13 have large surface roughness as in the case of uncoated tablets, the larger height, at the upper end portion of the guide member prevents the tablets 13 from riding over the side wall member 134 and falling into the transfer vessel 120 from a location above the surface B of the tablets 13 stored in the transfer vessel 120. Accordingly, if the transfer device K8 is used, the tablets 13 flow smoothly on the guide face 131 without falling from a high location. Deterioration of the tablets 13, due to cracks and chips can therefore be prevented. Thus, even solid articles having a lesser strength can be supplied by the transfer device K8. Accordingly, when the supply amount of tablets 13 per unit time has been set at a predetermined value, the height H of the side wall member 134 should be set according to the kinds of the tablets 13 to be supplied, the angle of slope of the guide face 131 at the outer peripheral edge 127a, and other factors such that the tablets 13 ride over the side wall member 134 sequentially upwardly from the lower end portion of the guide member 124 as described above.

The height H of side wall member 134 should be set to not less than height of the layers of the tablets 13 formed on the helical vane 127. In addition, height H should be set according to the supply amount of tablets 13 per unit time at the time the discharge opening 119b has been closed by the tablets 13. If the height H of the side wall member 134 is set as described above, the tablets 13 will not ride over an upper portion of the side wall member 134. Thus, riding over the side wall member 134, by tablets 13 will occur only from the vicinity of the discharge opening 119b after the discharge opening 119b has been closed by the tablets 13.

When a plug member 139 is detached from a lower end of the transfer vessel 120, as shown in FIG. 39, tablets 13 will be discharged from a discharge opening 120c provided at the lower end of the transfer vessel 120. As a result, the tablets 13 remaining on the helical vane 127 of the transfer device K8 will also be sequentially discharged from the discharge opening 119b into the transfer vessel 120, so as to be discharged out of the transfer vessel 120 from the discharge opening 120c. After all the tablets 13 in the transfer vessel 120 have been discharged from the discharge opening 120c, the transfer device K8 may be removed from the transfer vessel 120 through the supply opening 120a as shown by the arrow S in FIG. 39. As described above, the transfer device K8 can be easily removed from the transfer vessel 120 upon the completion of the supply operation of the transfer device K8.

Meanwhile, if the transfer device K8 is drawn from the supply opening 120a of the transfer vessel 120 as shown by the arrow S in FIG. 39 when the tablets 13 are filled in the transfer vessel 120, the tablets 13 remaining on an upper portion of the guide face 131 of the helical vane 127 will proceed to a lower portion of the guide face 131 in response to the rise of transfer device K8. Thus, tablets 13 will fall into the transfer vessel 120 by riding over the side wall member 134 or be discharged from the discharge opening 119b into the transfer vessel 120. Therefore, when the transfer device K8 has been drawn from the transfer vessel 120, no tablets 13 will remain on the helical vane 127 of the transfer device K8. Accordingly, where the tablets 13 are filled into a plurality of transfer vessels 120 by using a single transfer device K8, the transfer device K8 is drawn from one transfer vessel 120, after the completion of filling. The transfer device K8 can then be mounted on the next transfer vessel 120. Furthermore, after removal of the transfer device K8 from the transfer vessel 120, the transfer device K8 can be easily disassembled and rinsed.

In the transfer device K8, the guide member 124 is inserted into the side wall member 134 and is fixed to the side wall member 134 through engagement of the rod 130 with the slots 123a and 123b of the transfer vessel 120. Therefore, the guide member 124 can be drawn from the side wall member 134 by upwardly pulling the central shaft 126 of the guide member 124 as shown by the arrow S in FIG. 35. Accordingly, in the transfer device K8, since the guide member 124 and the side wall member 134 can be detached easily from each other, maintenance such as rinsing and inspection of the guide member 124 and the side wall member 134 can be performed easily.

Furthermore, in the transfer device K8, the side wall member 134 is made of polycarbonate. Therefore, if the tablets 13 are supplied from the supply opening 119a tentatively without mounting the transfer device K8 on the transfer vessel 120, it is possible to visually inspect the tablets 13 flowing on the guide face 131 of the helical vane 127. Accordingly, in transfer device K8, the formation of layers of various types of tablets 13 flowing on the helical vane 127, the transfer rate of the tablets 13, and other operations can be easily inspected.

Figure 41:
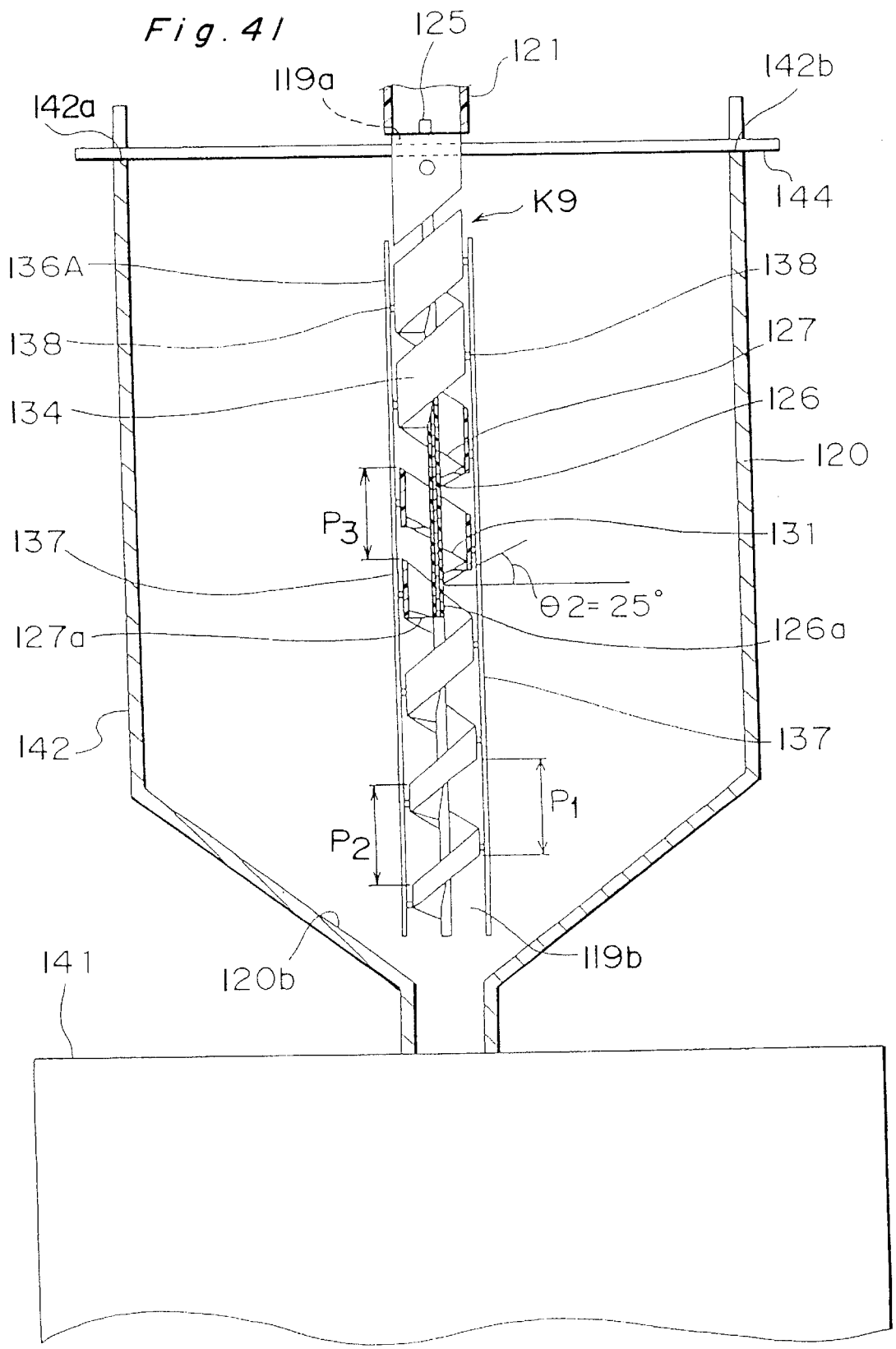
FIG. 41 is a partly sectional front elevational view of a transfer device acting as a supply device, according to a ninth embodiment of the present invention.
Figure 42:
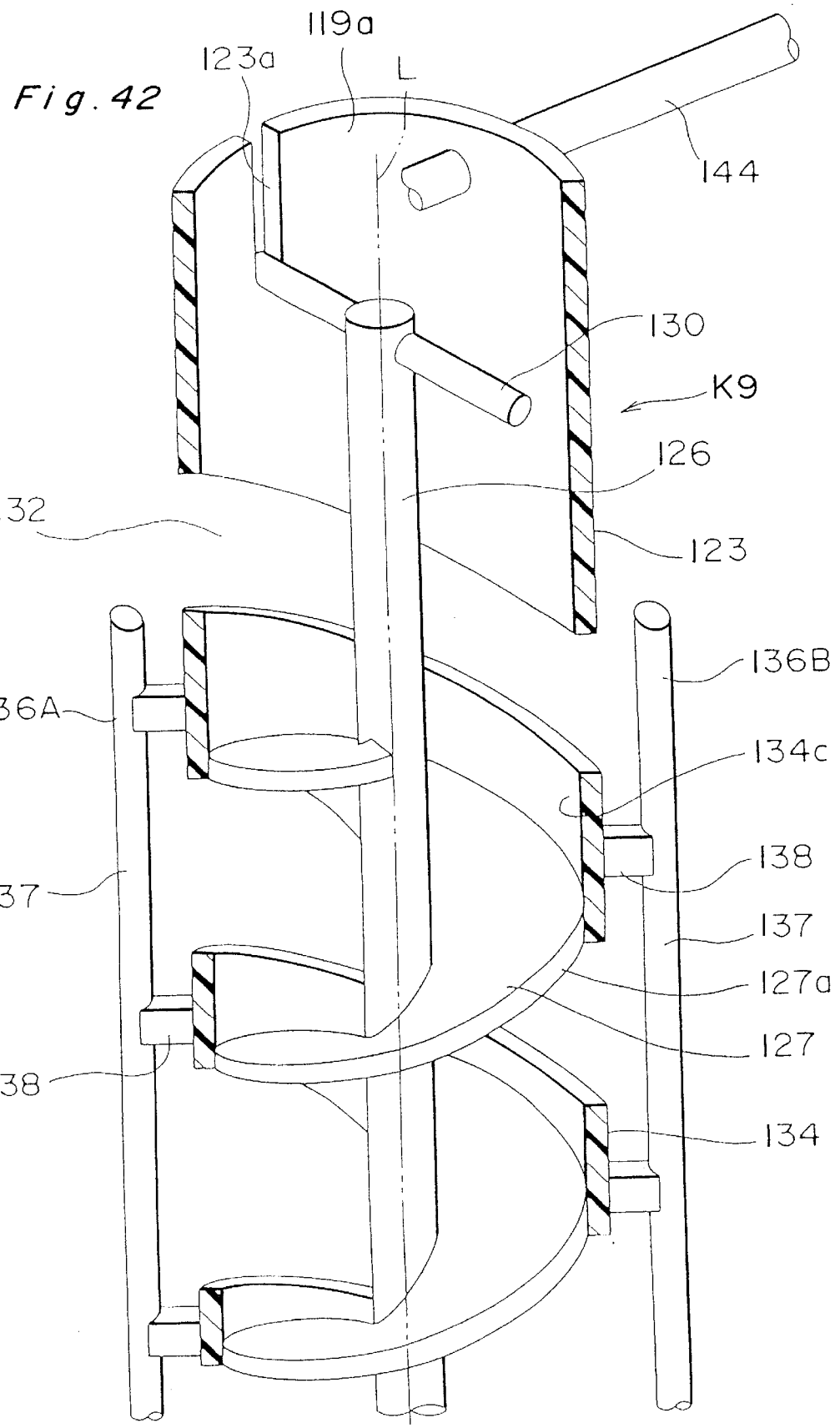
FIG. 42 is a partially broken fragmentary perspective view of a guide member and a side wall member of the transfer device of FIG. 41.
Figure 43:
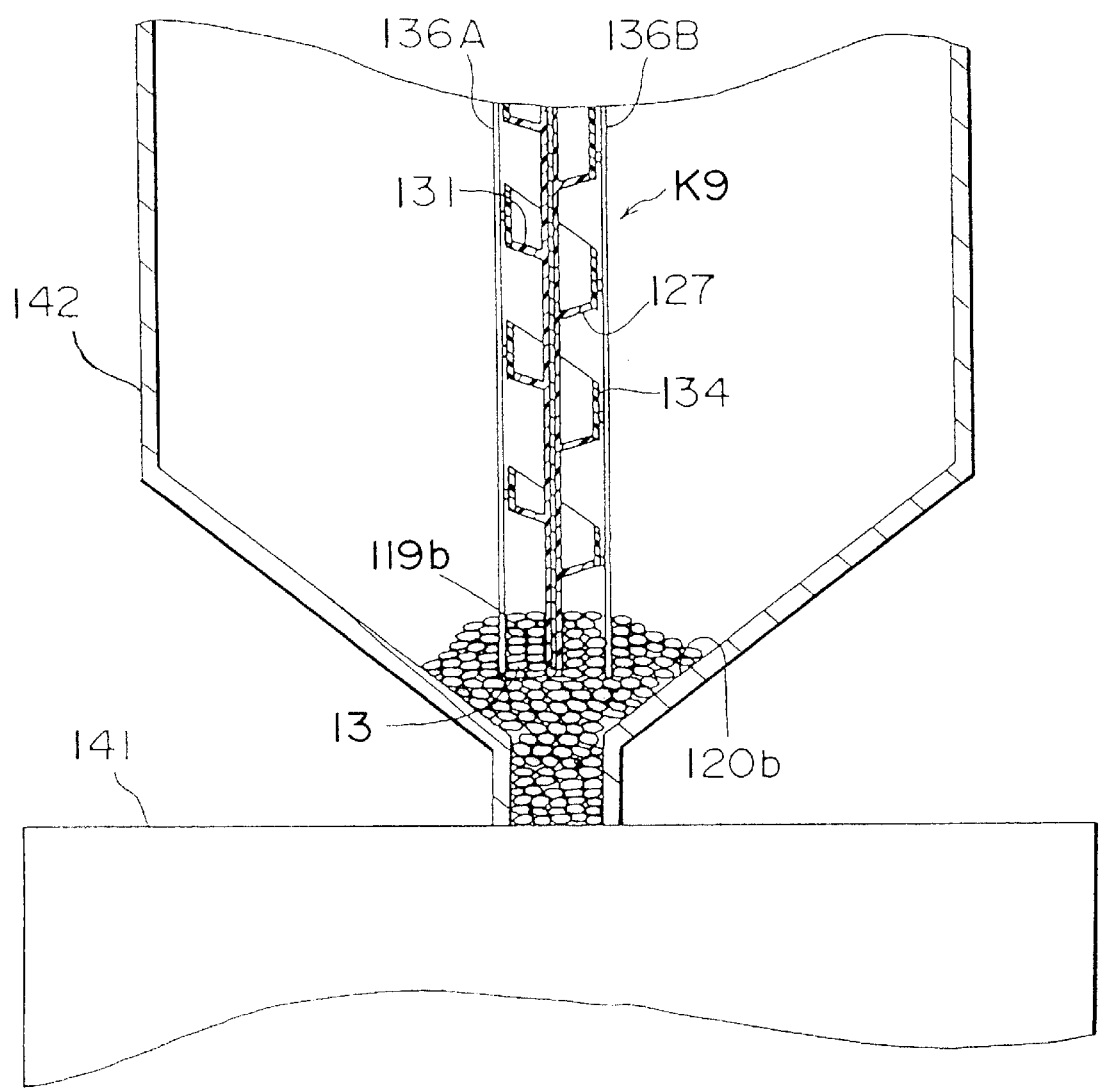
FIG. 43 is a partly sectional side elevational view showing a state of fall of tablets in the transfer device of FIG. 41.

FIGS. 41 to 43 show a transfer device K9 according to a ninth embodiment of the present invention, which acts as a supply device. The transfer device K9 is detachably mounted on a hopper 142 and machine assembly 141 such as a printing machine and an inspection machine. In the transfer device K9, the guide face 131 of the helical vane 127 is inclined upwardly from the central shaft 126 towards an inner peripheral surface of the side wall member 134 at an angle of 25°. In other words, an angle $\theta 2$ of inclination of the guide face 131 is set at 25° as shown in FIG. 41. Meanwhile, the angle $\theta 2$ of inclination of the guide face 131 is not restricted to 25° but may range, approximately, from 20° to 30° in accordance with the sliding property, the rolling property, and other properties of the solid articles to be transferred.

Meanwhile, in the transfer device K9, a long rod member 144 extends through the tubular mounting portion 123 disposed at the upper end portion of guide member 124. Opposite end portions of the rod member 144 are detachably brought into engagement with slots 142a and 142b formed on an upper end of the hopper 142. The transfer device K9 is, thus, detachably mounted on the hopper 142. The supply pipe 121 for the tablets 13 is, in turn, connected with the tubular mounting portion 123.

As tablets 13 are supplied into the hopper 142 by the transfer device K9, a component of force directed towards the axis L of the central shaft 126 acts on the tablets 13 on the guide face 131 of the helical vane 127 thus, urging the tablets 13 to fall slidingly towards the axis L of the central shaft 126 eliminating pressure and centrifugal force applied from the tablets 13 to an inner peripheral surface 134c of the side wall member 134. In contrast, in the transfer device K8 in which the helical vane 127 extends horizontally, after the discharge opening 119b has been closed by the tablets 13, layers of the tablets 13 are formed on the guide face 131. On the other hand, in the transfer device K9 in which the helical vane 127 extends slopingly, layers of the tablets 13 are least likely to form on the guide face 131 as shown in FIG. 43 after the discharge opening 119b has been closed by the tablets 13. Accordingly, tablets 13 will not fall from an upper portion of the opening 132, even if a far larger amount of tablets 13, than that of the transfer device K8 having the horizontal helical vane 127, are supplied for a short period by the transfer device K9. Hence, the supply amount of tablets 13 per unit time can be increased in the transfer device K9, thereby resulting in a sharp rise of supply efficiency. Meanwhile, even when a large amount of tablets 13 are supplied by the transfer device K9, the tablets 13 will not remain on the guide face 131 of the helical vane 127. The remaining features and elements of transfer device K9 are similar to those of the transfer device K8 and are not described again.

Figure 44:
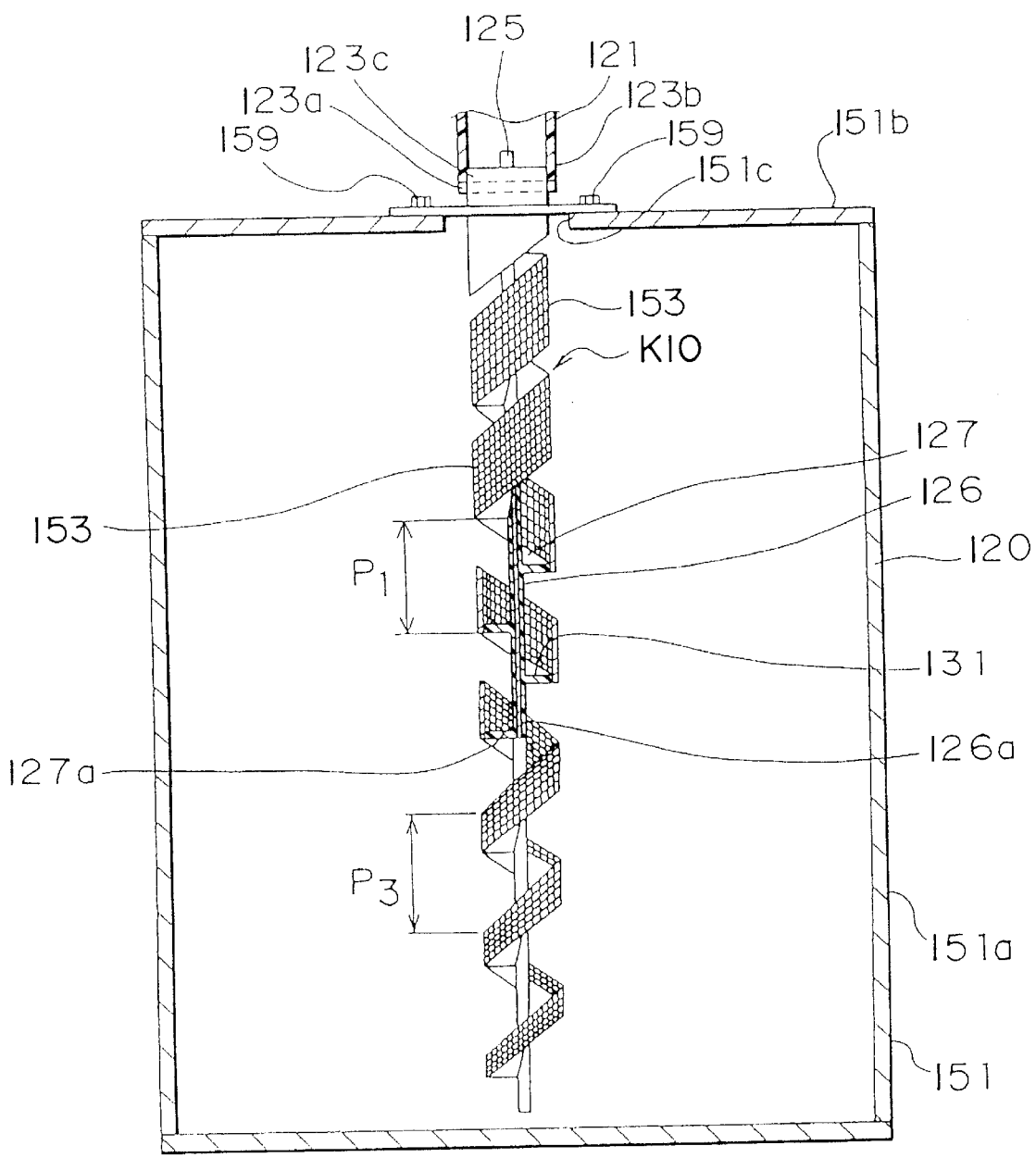
FIG. 44 is a partly sectional view front elevational view of a transfer device acting as a supply device, according to a tenth embodiment of the present invention.
Figure 45:
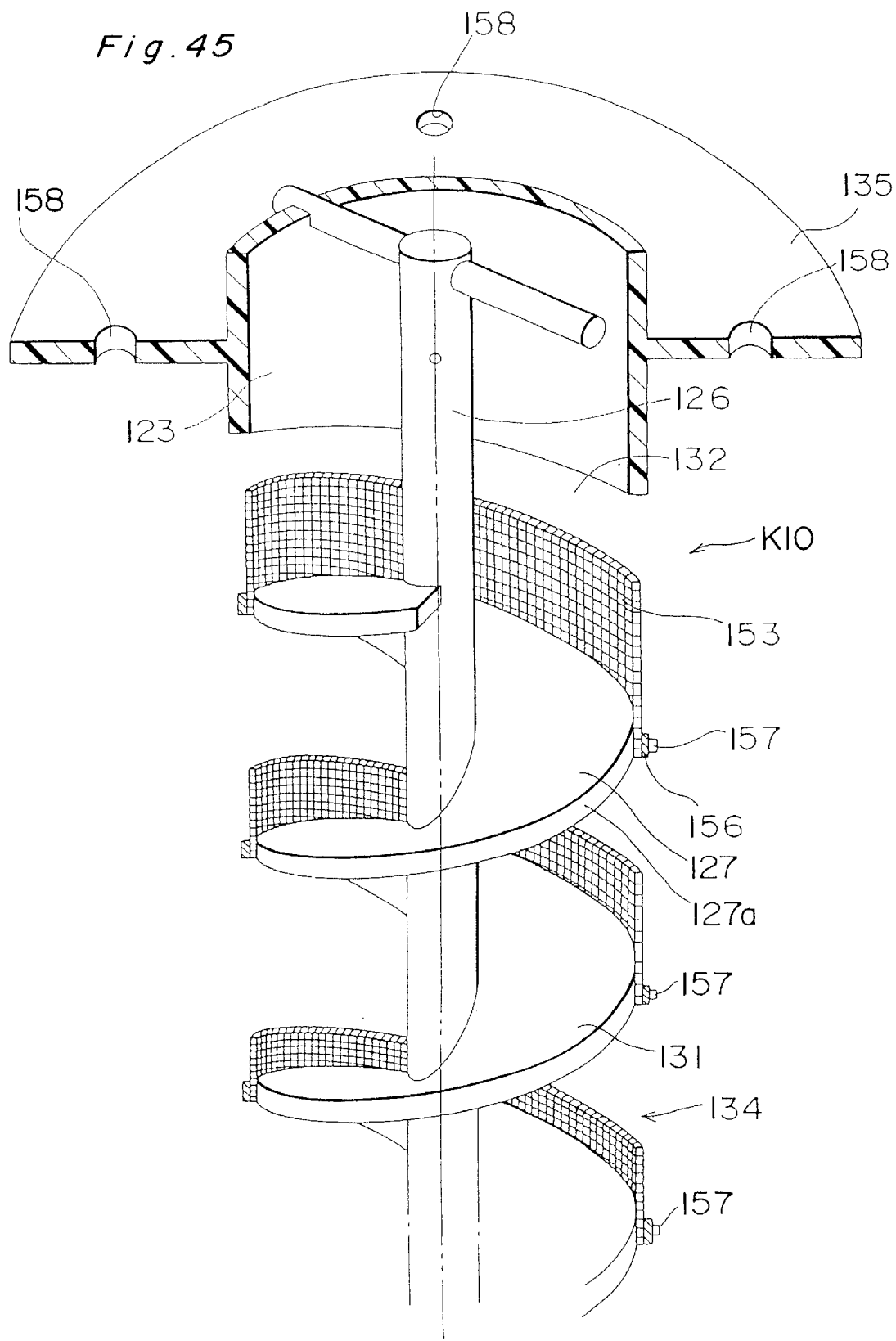
FIG. 45 is a partially broken fragmentary perspective view of a guide member and a side wall member of the transfer device of FIG. 44.
Figure 46:
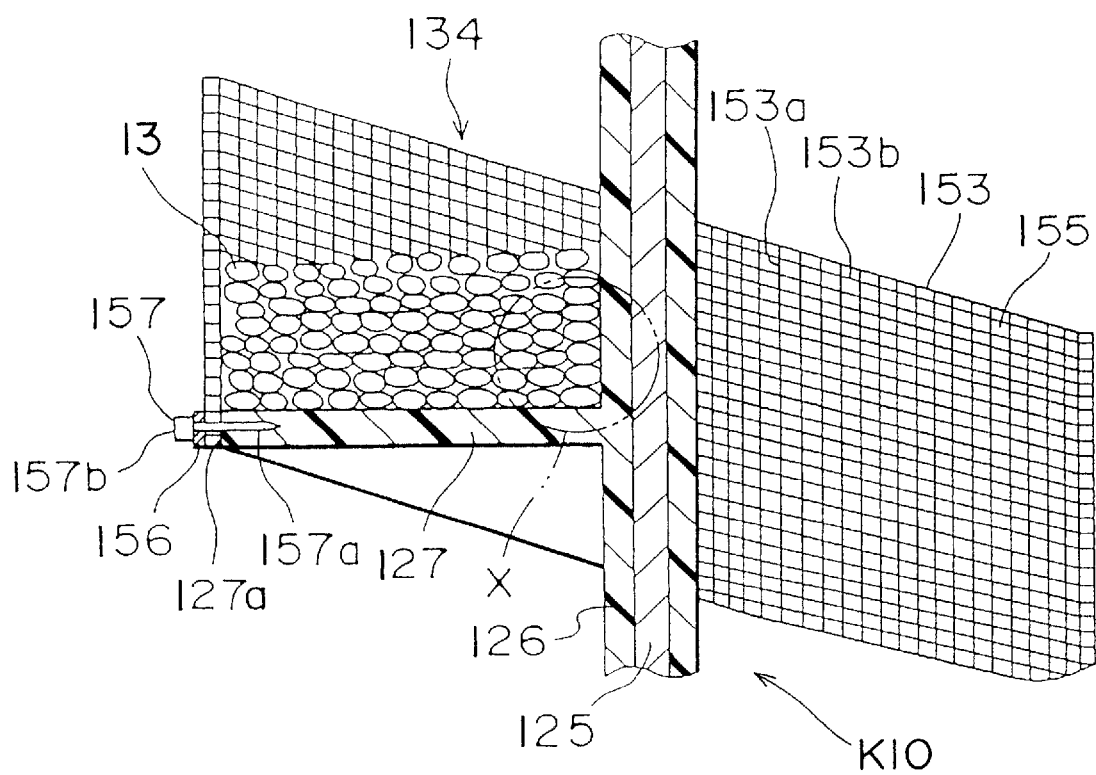
FIG. 46 is a sectional view showing a state of fall of tablets in the transfer device of FIG. 44.

FIGS. 44 to 46 show a transfer device K10 according to a tenth embodiment of the present invention, which acts as a supply device. The transfer device K10 is detachably mounted on a drum 151 which is comprised of a main body 151a and a cover 151b. In the transfer device K10, the side wall member 134 of the transfer device K8 is replaced by a long belt-like net member 153. The net member 153 is fixed to the outer peripheral edge 127a of the helical vane 127 by a helical tape 156 and pins 157. The net member 153 is made of resin and is obtained by knitting warps 153a and wefts 153b so as to form a number of venting holes 155 as shown in FIG. 46. The helical tape 156 is formed by a helical band made of flexible resin and is wound around the net member 153 on the outer peripheral edge 127a of the helical vane 127. The pins 157 are provided on the outer peripheral edge 127a of the helical vane 127 at predetermined intervals. Each of the pins 157 includes a rod 157a and a head 157b. The rod 157a is pierced through both the helical tape 156 and the net member 153 into the outer peripheral edge 127a of the helical vane 127. The helical tape 156 and the net member 153 are, thus, gripped between the head 157b of the pin 157 and the outer peripheral edge 127a of the helical vane 127.

Meanwhile, in the transfer device K10, the flange 135 provided at the tubular mounting portion 123 has a large diameter and a plurality of bolt holes 158. The cover 151b of the drum 151 has an opening 151c for receiving the transfer device K10. After the flange 135 of the transfer device K10 has been placed on a portion of the cover 151b surrounding the opening 151c, bolts 159 are inserted through the bolt holes 158 of the flange 135. The bolts are, thus, brought into threaded engagement with the cover 151b such that the transfer device K10 is secured to the drum 151.

Tablets 13 are supplied to the transfer device K10 in the same manner as the transfer device K8. Tablets 13, from the supply pipe 121, flow on the guide face 131 of the helical vane 127 and are then supplied into the main body 151a of the drum 151 from the discharge opening 119b. After the discharge opening 119b has been closed by the accumulated tablets 13, the tablets 13 are discharged into the main body 151a by riding over the net member 153 acting as the side wall member 134. The position where the tablets 13 ride over the net member 153 rises continuously in response to the rise of a surface of the tablets 13 stored in the drum 151.

Excellent air permeability exists, not only in the layers of the tablets 13 formed on the guide face 131 of the helical vane 127, but also in the tablets 13 which are disposed in a portion X of FIG. 46 which are enclosed by the helical vane 127, the central shaft 126, and the net member 153. The excellent air permeability exists because of air flowing to these tablets 13 through the venting holes 155 formed on the net member 134 acting as the side wall member 134. As a result, tablets 13 are not damped.

Of particular importance, if sugar-coated tablets are damped, water content is condensed on the coated surfaces of the tablets 13, thereby resulting in a loss of gloss on the surfaces of the tablets 13. However, since air is supplied into the transfer device K10 from the venting holes 155, deterioration of the sugar-coated tablets due to dampness can be prevented. Meanwhile, if the tablets 13 are damped after material has been printed on their surfaces, the printed portion tablets 13 supplied from the transfer device K10 into the main body 151a, may impinge upon a nonprinted portion of another tablet 13. Thus, a printed portion may be transferred to the nonprinted portion of another tablet 13, thereby staining the nonprinted portion of another tablet 13. However, in the transfer device K10, since the side wall member 134 is formed by the net member 153 so as to have excellent air permeability, dampness is not produced in the transfer device K10. Thus, the above mentioned stain of the nonprinted portion of one tablet 13 by the printed portion of another tablet 13 can be prevented.

Figure 47:
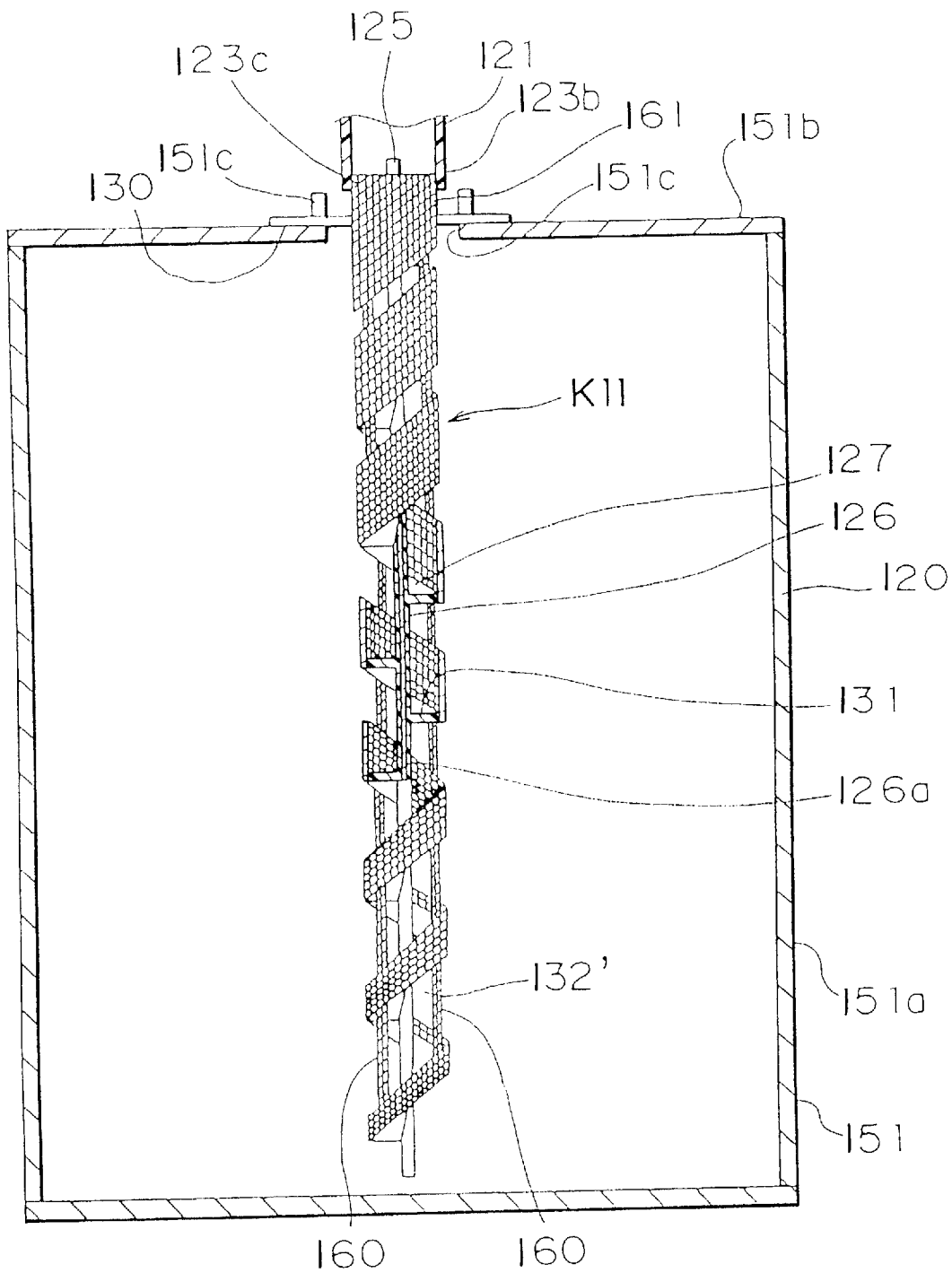
FIG. 47 is a partly sectional front elevational view of a transfer device acting as a supply device, according to an eleventh embodiment of the present invention.
Figure 48:
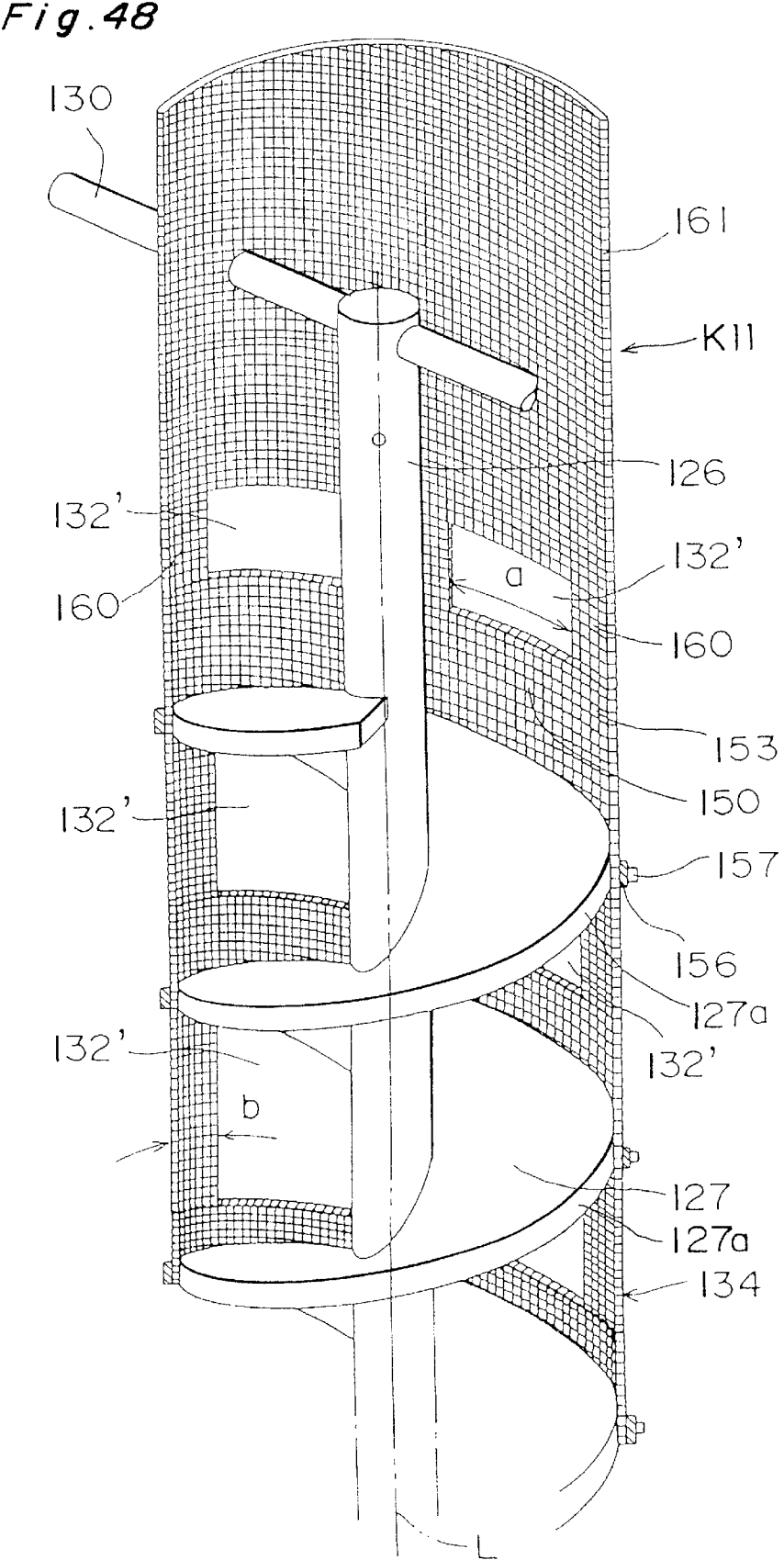
FIG. 48 is a partially broken fragmentary perspective view of a guide member and a side wall member of the transfer device of FIG. 47.

FIGS. 47 and 48 show a transfer device K11 according to an eleventh embodiment of the present invention, which acts as a supply device. In the transfer device K11, the side wall member 134 is formed by the net member 153 in the same manner as the transfer device K10. However, in the transfer device K10, the long belt-like net member 153 is attached to the outer peripheral edge 127a of the helical vane 127 of the guide member 124. Whereas, in the transfer device K11, the side wall member 134 is formed by a sheet-like cylindrical net member 153. To elaborate, a number of openings 132', each having a predetermined length a, are helically provided at an interval b on the cylindrical net member 153. A reinforced portion 160 is also formed between neighboring openings 132'.

In this embodiment, the length a and the interval b of the openings 132' are set such that three openings 132' are provided at a round angle of 120°. In the same manner as the transfer devices K8 to K10, the width W of the openings 132' is made gradually smaller from the lower end portion of the guide member 124 to the upper end portion of the guide member 124. Thus, the height H of the side wall member 134 is continuously increased from the lower end portion of the guide member 124 to the upper end portion of the guide member 124.

An uppermost portion of the net member 153 does not have the openings 132' hence forming a tubular mounting portion 161. The rod 130 provided at the upper end of the guide member 124 is pierced through the tubular mounting portion 161 retaining the tubular mounting portion 161. By inserting opposite ends of the rod 130 into a pair of slots 151c formed on the cover 151b of the drum 151, the guide member 124 which is inserted into the net member 153 is fixed to the main body 151a of the drum 151. Meanwhile, the net member 153 is secured to the outer peripheral edge 127a of the helical vane 127 by the helical tape 156 and the pins 157.

As in the transfer device K10, the side wall member 134 in the transfer device K11 is formed by the net member 153. Thus, air is supplied into the transfer device K11 from the venting holes 155. Hence, the deterioration of sugar-coated tablets, due to dampness, and the stain of a nonprinted portion of one tablet 13 by a printed portion of another tablet 13, at the time of supply of the tablets 13 into the main body 151a from the transfer device K11, can be prevented. In addition, in the transfer device K11, since portions other than the guide member 124 are formed wholly by the net member 153, air permeability is more efficient than in transfer device K10.

Meanwhile, in the transfer device K11, the reinforced portion 160 formed by the net member 153 is provided between neighboring openings 132', each having the predetermined length a. Therefore, net member 153 maintains its cylindrical shape without collapsing in the direction of the axis L of the central shaft 126 even if the guide member 124 is drawn out of the net member 153. Therefore, maintenance such as rinsing and inspection of the transfer device K11, can be performed easily.

Figure 49:
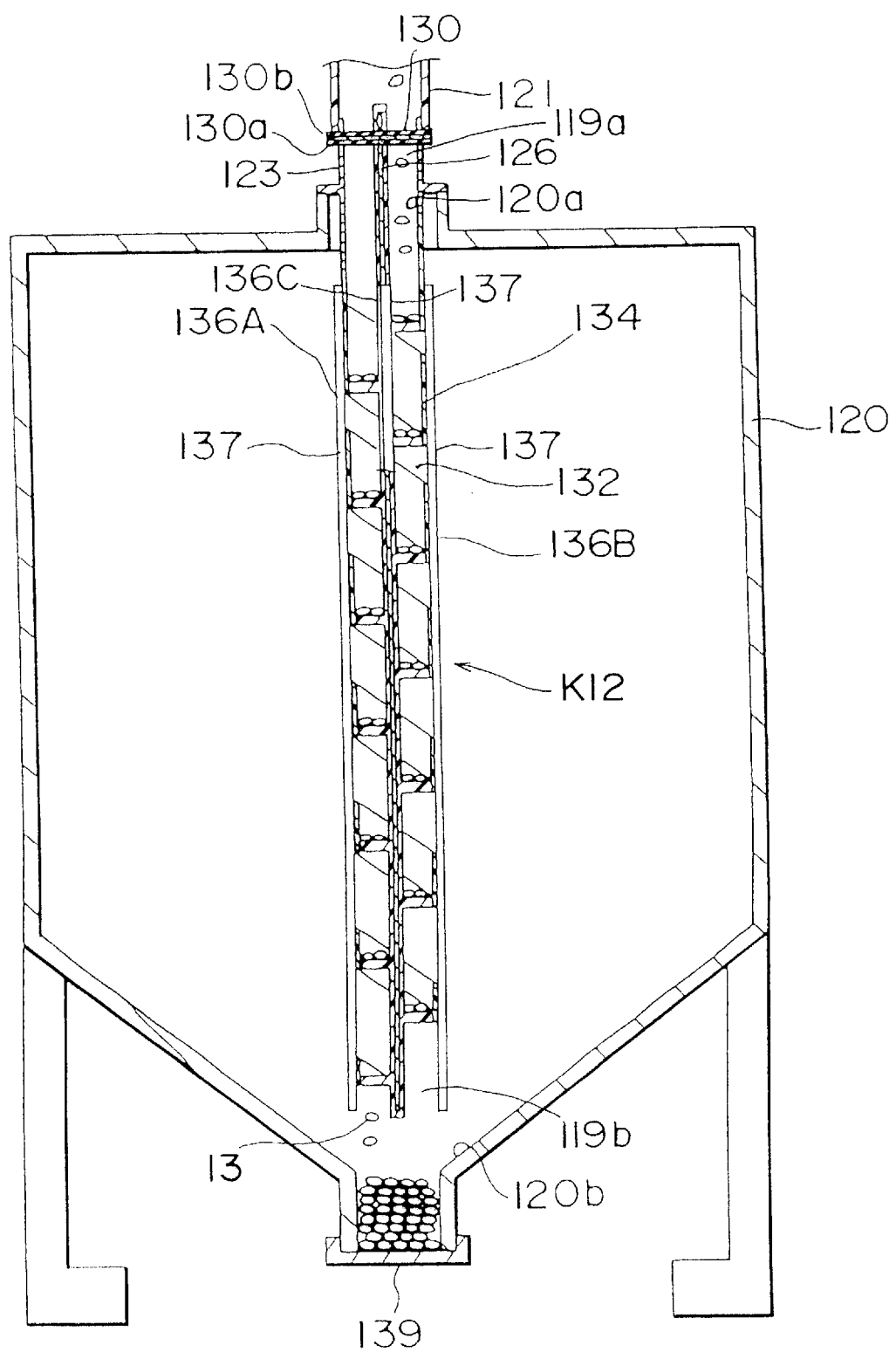
FIG. 49 is a partly sectional front elevational view of a transfer device acting as a supply device, according to a twelfth embodiment of the present invention.
Figure 50:
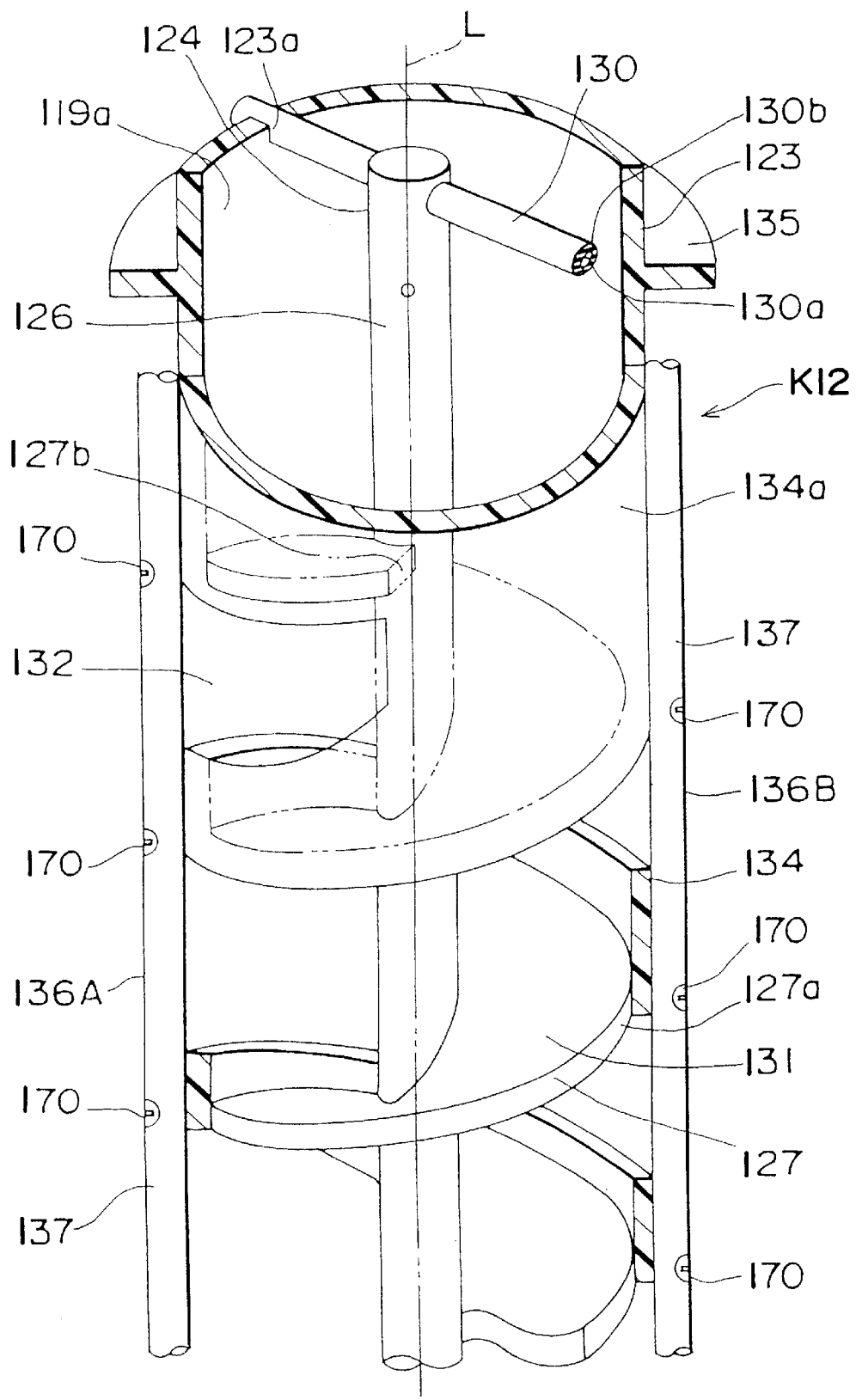
FIG. 50 is a partially broken fragmentary perspective view of a guide member and a side wall member at an upper end portion of the transfer device of FIG. 49.
Figure 51:
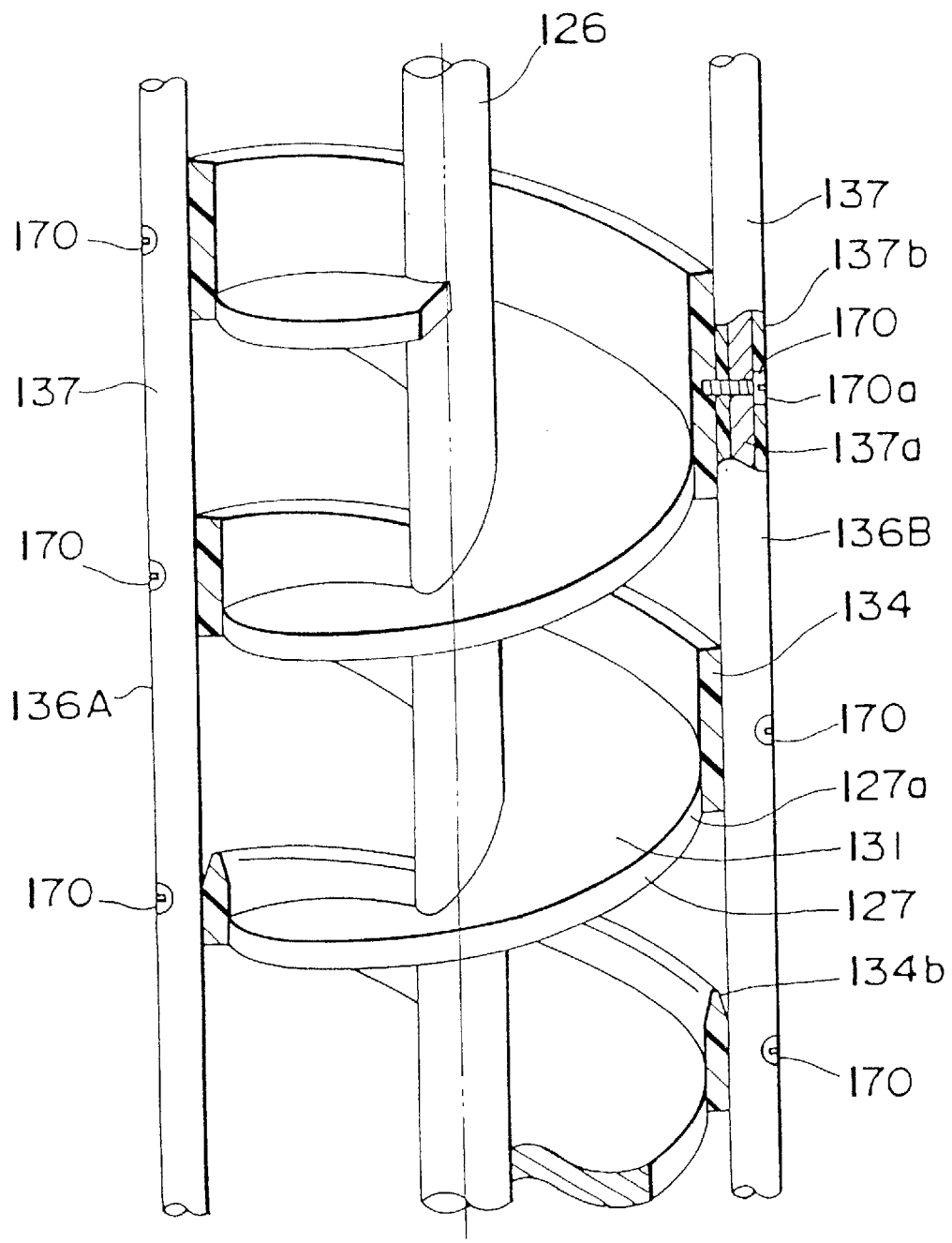
FIG. 51 is a partially broken fragmentary perspective view of the guide member and the side wall member at a lower end portion of the transfer device of FIG. 49.

FIGS. 49 to 51 show a transfer device K12 according to a twelfth embodiment of the present invention, which acts as a supply device. In the same manner as the transfer device K8, the transfer device K12 is used for supplying tablets 13 into the transfer vessel 120. The opposite ends of the rod 130, mounted on the upper end portion of the central shaft 126, are detachably brought into engagement with the opposite slots 123a and 123b, formed on the tubular mounting portion 123 disposed at the upper end of the side wall member 134. Thus, guide member 124 is fixed in the side wall member 134.

In the transfer device K12, the rod 130 includes a metallic core 130a and an outer peripheral portion 130b provided around the metallic core 130a as shown in FIG. 50. Since the metallic core 130a is provided in the rod 130, the strength of the rod 130 is high. Meanwhile, the outer peripheral portion 130b of the rod 130 is made of silicone rubber and therefore, is soft. Accordingly, tablets 13, supplied from the supply pipe 121 to the supply opening 119a, that collide with the rod 130, will not be subjected to flaws, cracks, and chips.

As shown in FIG. 50, the side wall member 134, corresponding to one pitch of the helical vane 127, from an uppermost portion 127b of the helical vane 127 is formed as a blind wall 134a. Thus, the opening 132 between two neighboring vane portions, at an uppermost portion 127b, of the helical vane 127 is closed. Since the blind wall 134a is formed at the upper end portion of the guide member 124 as described above, the tablets 13 supplied from the supply pipe 121 will not flow out of the side wall member 134, even if the tablets 13 become lodged on the guide face 131 of the uppermost portion 127b of the helical vane 127. Meanwhile, the blind wall region 134a in the side wall member 134 is not restricted to one pitch of the helical vane 127 from the uppermost portion 127b of the helical vane 127. For example, when the blind wall 134a is formed at a region of the side wall member 134 corresponding to a half pitch from the uppermost portion 127b of the helical vane 127, the fall of the tablets 13 at the upper end of the guide member 124 will, likewise, be prevented.

As shown in FIG. 51, at the lower end portion of the guide member 124, the side wall member 134 corresponding to one pitch from a lowermost portion of the helical vane 127 has a tapered distal end 134b whose tip is curved arcuately. If the tip of the tapered distal end 134b of the side wall member 134 is curved arcuately at the lower end portion of the guide member 124 as described above, the tablets 13 can ride over the side wall member 134 without being caught by the tapered distal end 134b. Therefore, when the tablets 13 are supplied after the discharge opening 119b has been closed, the tablets 13 ride over the side wall member 134 at the lower end portion of the guide member 124 flowing into the transfer vessel 120.

Meanwhile, in the transfer device K12, the coupling portions 138 of the transfer device K8 are eliminated from each of the frame members 136A to 136C. Namely, as shown in FIG. 51, each of the frame members 136A to 136C is formed only by the rod 137, provided outside the side wall member 134 parallel with the central shaft 126 of the guide member 124. Rod 137 and the side wall member 134 are coupled together by screws 170. Where the rod 137 is directly coupled with the side wall member 134 as described above, the number of components of the frame members 136A to 136C is reduced by eliminating the coupling portions 138. Thus, the transfer device K12 is structurally simplified in comparison with the transfer device K8, thereby resulting in the reduction of production costs.

The rod 137 of each of the frame members 136A to 136C includes a metallic core 137a and a resinous outer peripheral portion 137b provided around the metallic core 137a. A head 170a of the screw 170 does not project out of the resinous outer peripheral portion 137b. Head 170a is, thus, sunk into the outer peripheral portion 137b. Alternatively, in place of the screws 170, the rod 137 may be attached to the side wall member 134 by adhesive.

After the discharge opening 119b has been closed by the tablets 13 during the supply of the tablets 13, the tablets 13 ride over the side wall member 134 sequentially upwardly from the lower end portion of the guide member 124. At this time, the tablets 13 supplied into the transfer vessel 120, after riding over the side wall member 134, may collide with the rods 137. However, in the transfer device K12, since the rod 137 has the resinous outer peripheral portion 137b, tablets 13 will not be subjected to flaws, cracks and chip.

Figure 52:
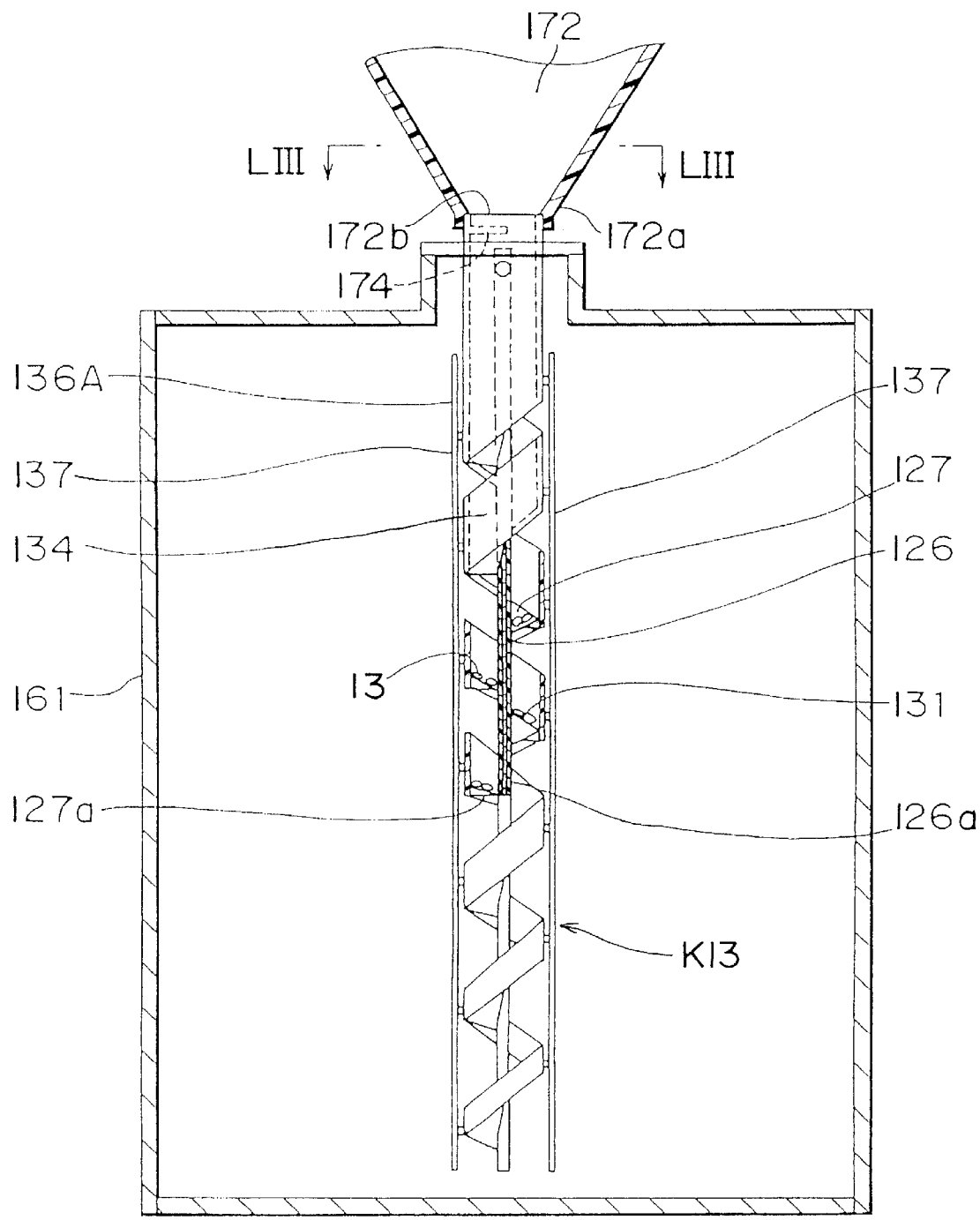
FIG. 52 is a partly sectional fragmentary front elevational view of a transfer device acting as a supply device, according to a thirteenth embodiment of the present invention.
Figure 53:
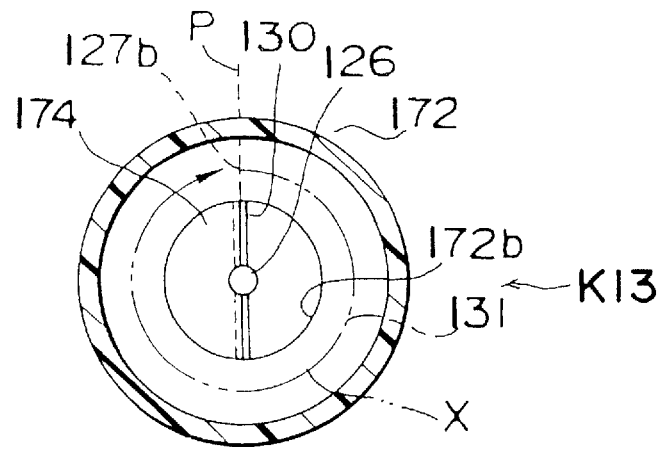
FIG. 53 is a sectional view taken along the line LIII—LIII in FIG. 52.

FIGS. 52 and 53 show a transfer device K13 according to a thirteenth embodiment of the present invention, which acts as a supply device. In the transfer device K13, a lower end portion 172a of a hopper 172 for supplying solid articles is coupled with the tubular mounting portion 123 of the side wall member 134. In addition, a closure 174 for closing a half of a lower opening 172b of the hopper 172 is provided at the upper end of the side wall member 134.

The uppermost portion 127b of the helical vane 127 is disposed at a location indicated by P in FIG. 53. The guide face 131 of the helical vane 127 descends downwardly from the uppermost portion 127b while turning about the central shaft 126 as shown by the arrow X. The closure 174 is provided at a location corresponding to a lower half of one pitch of the uppermost portion 127b of the helical vane 127. Therefore, the tablets 13 fall on the helical vane 127 from only a small portion of the lower opening 172b of the hopper 172, in other words, only that portion which is disposed above an upper half of one pitch of the upper most portion 127b. Thus, the tablets 13 do not fall on the helical vane 127 from the portion of the lower opening 172b, which is disposed above the lower half of one pitch of the uppermost portion 127b of the helical vane 127.

Therefore, in the transfer device K13, since the solid articles supplied from the lower opening 172b of the hopper 172 to the guide member 124 are carried to the vicinity of the uppermost portion 127b of the helical vane 127, the falling distance of the tablets 13 from the lower opening 172b of the hopper 172 to the helical vane 127 is short. Accordingly, at the time of supply of the tablets 13 to the transfer device K13, it is possible to prevent the tablets 13 from being subjected to flaws, cracks and chips.

Figure 55:
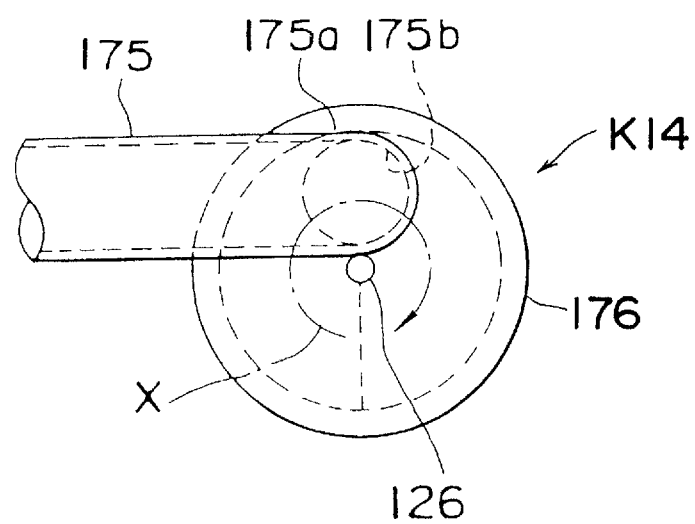
FIG. 55 is a view in the direction of the arrow LV in FIG. 54.
Figure 54:
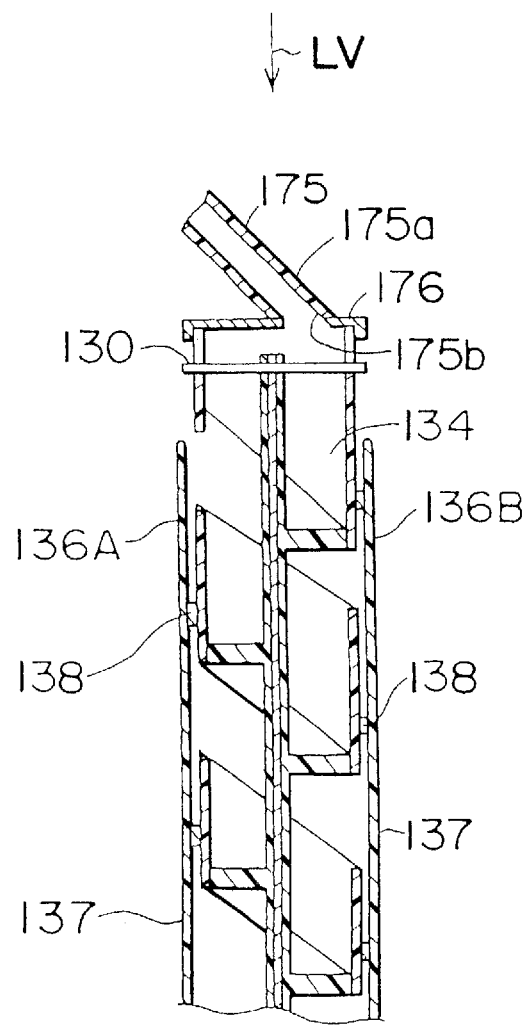
FIG. 54 is a fragmentary sectional view of a transfer device acting as a supply device, according to a fourteenth embodiment of the present invention.

FIGS. 54 and 55 show a transfer device K14 according to a fourteenth embodiment of the present invention, which acts as a supply device. In the transfer device K14, a plug member 176 is mounted on the upper end of the tubular mounting portion 123 of the side wall member 134. In addition, a lower end portion 175a of a chute 175 for supplying solid articles is coupled with the plug member 176.

The chute 175 is inclined at a predetermined angle relative to the plug member 176 so as to be coupled with the plug member 176. Meanwhile, as shown in FIG. 55, when a lower end opening 175b of the chute 175 is viewed from above, i.e., in the direction of the arrow LV in FIG. 54, the chute 175 radially deviates from the central shaft 126 of the guide member 124.

As shown in FIG. 55, the guide face 131 of the helical vane 127 descends downwardly from the uppermost portion 127b of the helical vane 127 while turning about the central shaft 126 as illustrated by the arrow X. The lower end opening 175b of the chute 175 is provided at a location corresponding to a half pitch at the uppermost portion 127b of the helical vane 127.

Thus, in the transfer device K14, since the lower end opening 175b of the chute 175 deviates radially from 126 so as to be disposed adjacent to the uppermost portion 127b of the helical vane 127, the falling distance of the tablets 13 from the chute 175 to the helical vane 127 is short. Thus, it is possible to prevent the tablets 13 from being subjected to flaws, cracks and chips.

Figure 56:
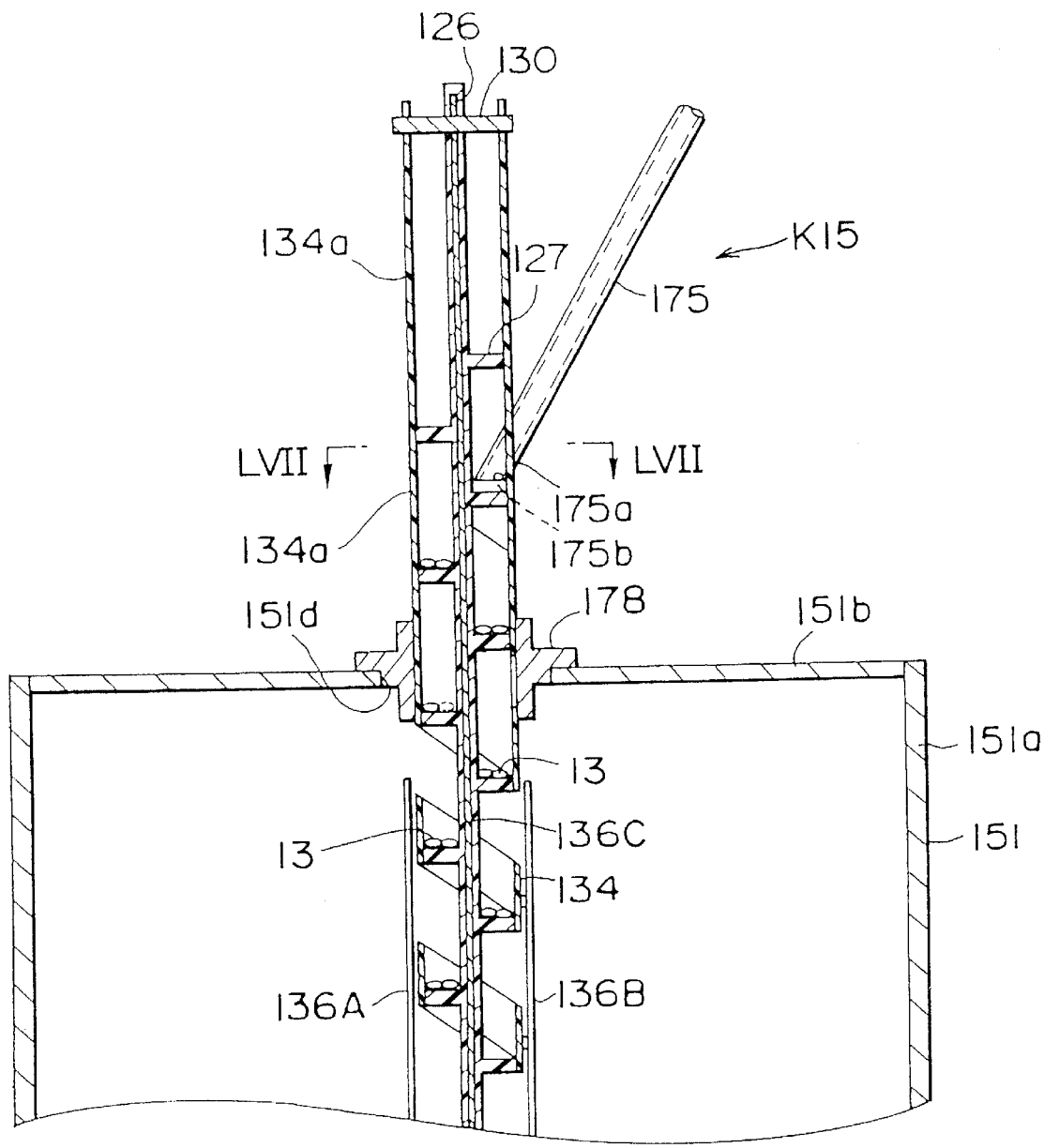
FIG. 56 is a fragmentary sectional view of a transfer device acting as a supply device, according to a fifteenth embodiment of the present invention.
Figure 57:
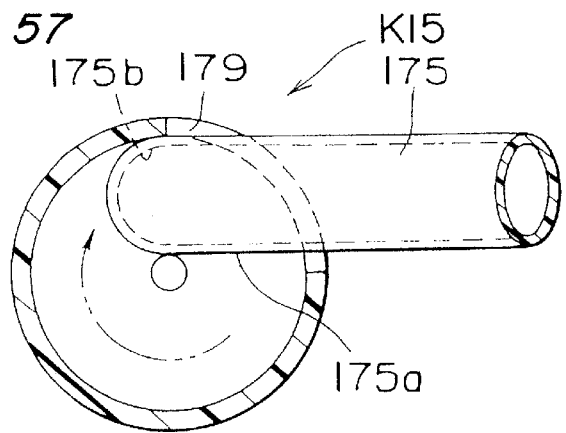
FIG. 57 is a sectional view taken along the line LVII—LVII in FIG. 56.

FIGS. 56 and 57 show a discharge device K15 according to a fifteenth embodiment of the present invention, which acts as a supply device. In the transfer device K15, a portion of the side wall member 134, corresponding to several pitches of the helical vane 127, at the uppermost portion 127b of the helical vane 127 is formed as the blind wall 134a. A flange member 178 is fitted around a lower end portion of the blind wall 134a. A lower portion of the transfer device K15 is inserted through a through-hole 151d formed on the cover 151b of the drum 151. Flange member 178 is, in turn, mounted on an upper face of the cover 151b such that an upper portion of the transfer device K15 projects out of the flange member 178.

A recess 179 is formed in the blind wall 134a at the upper portion of the transfer device K15 which projects out of the cover 151b, so as to be disposed at a vertically intermediate location between two neighboring vanes of the helical vane 127. The lower end portion 175a of the chute 175 is obliquely downwardly inserted into the recess 179 such that the lower end opening 175b is disposed above the guide face 131 of the helical vane 127. Thus, the tablets 13 fed from the chute 175 are laterally supplied to the guide face 131 of the helical vane 127 at the vertically intermediate location between the two neighboring vanes of the helical vane 127. Therefore, in the transfer device K15, the falling distance of the tablets 13 to the guide face 131 is short. Hence, collisions between the tablets 13 and the guide face 131 of the helical vane 127 are not great. Thus, the tablets 13 are not subjected to flaws, cracks and chips.

Figure 58:
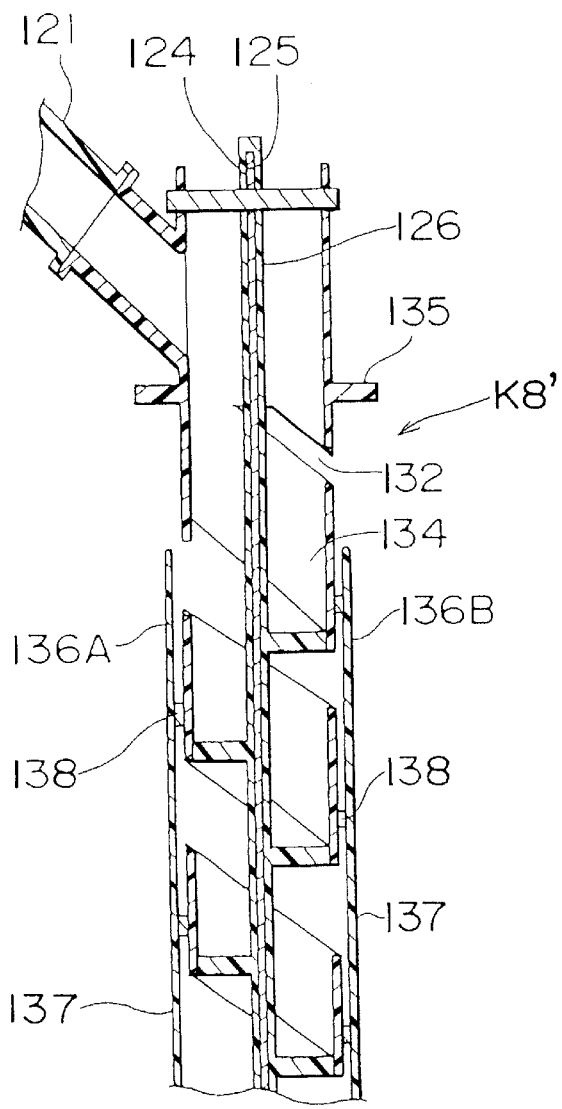
FIG. 58 is a fragmentary sectional view of a transfer device which is a first modification of the transfer device of FIG. 33.

The transfer devices K8 to K15 may be variously modified. Initially, FIG. 58 shows a first modification K8' of the transfer device K8, in which the supply pipe 121 of the transfer device extends slopingly upwardly from an upper end portion of the transfer device K8'.

In the transfer devices K8 and K9, the side wall member 134 is brought into close contact with the outer peripheral edge 127a of the helical vane 127 of the guide member 124. However, a gap between the outer peripheral edge 127a of the helical vane 127 and the side wall member 134 having a dimension not allowing the tablet 13 to pass therethrough may also be provided.

Although shown as tablets in the transfer devices K8 to K 11, the solid articles to be supplied are not restricted to the tablets. Thus, the transfer device of the present invention can also be used for supplying, into the vessel, other pharmaceutical solid articles such as granules, powders, capsules, etc. and various solid articles such as candies.

Figure 59:
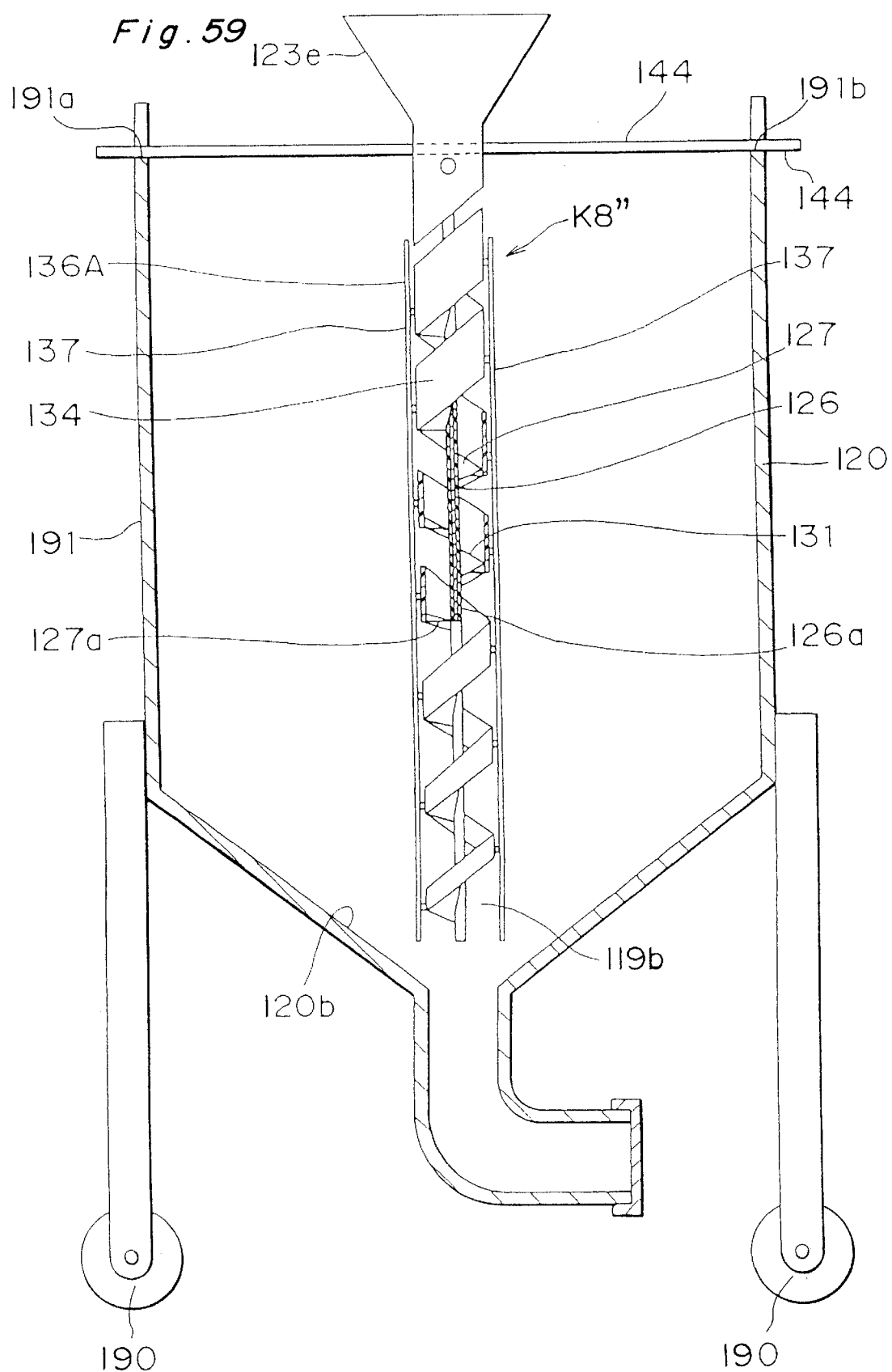
FIG. 59 is a partly sectional front elevational view of a transfer device which is a second modification of the transfer device of FIG. 33.

Likewise, the flow bin, the hopper and the drum referred to above, are not the only vessels which may be supplied solid articles from the transfer device of the present invention. Thus, various other vessels may be supplied solid articles, from the transfer device of the present invention. For example, FIG. 59 shows a second modification K8" of the transfer device K8. The transfer device K8" is mounted on a transfer vessel 191 with wheels 190 for moving the transfer vessel 191. In the transfer device K8"', a funnel-like supply portion 123e is provided at an upper end of the tubular mounting portion 123. In addition, the rod member 144 is provided in the same manner as in the transfer device K9. By detachably inserting opposite ends of the rod member 144 into slots 191a and 191b formed on an upper end of the transfer vessel 191, the transfer device K8" is mounted on the transfer vessel 191.

Furthermore, if the side wall member 134 of the transfer devices K8 and K9 is formed integrally with the helical vane 127 of the guide member 124, the structural aspects of transfer devices K8 and K9 are further simplified. Thus, the transfer devices K8 and K9 can be made more compact and lighter. Furthermore, the height H of the side wall member 134 is not restricted to that of the transfer devices K8 and K9. Rather, the height H may be increased discontinuously from the lower end portion to the upper end portion of the guide member 124 or it may be kept constant.

Figure 60:
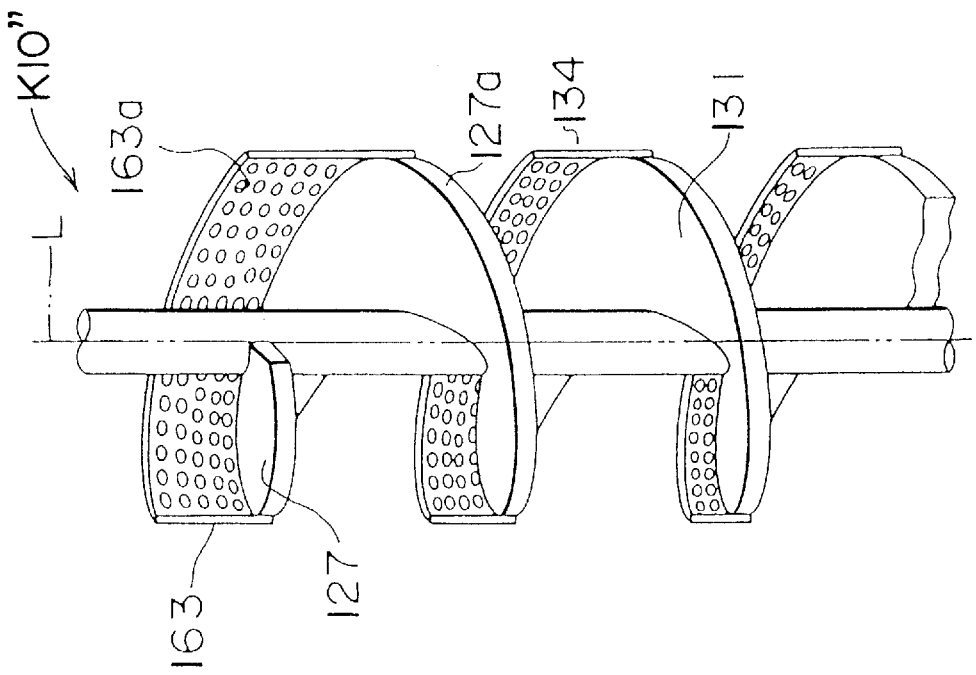
FIGS. 60 and 61 are views similar to FIG. 45, showing first and second modifications of the transfer device of FIG. 45, respectively.
Figure 61:
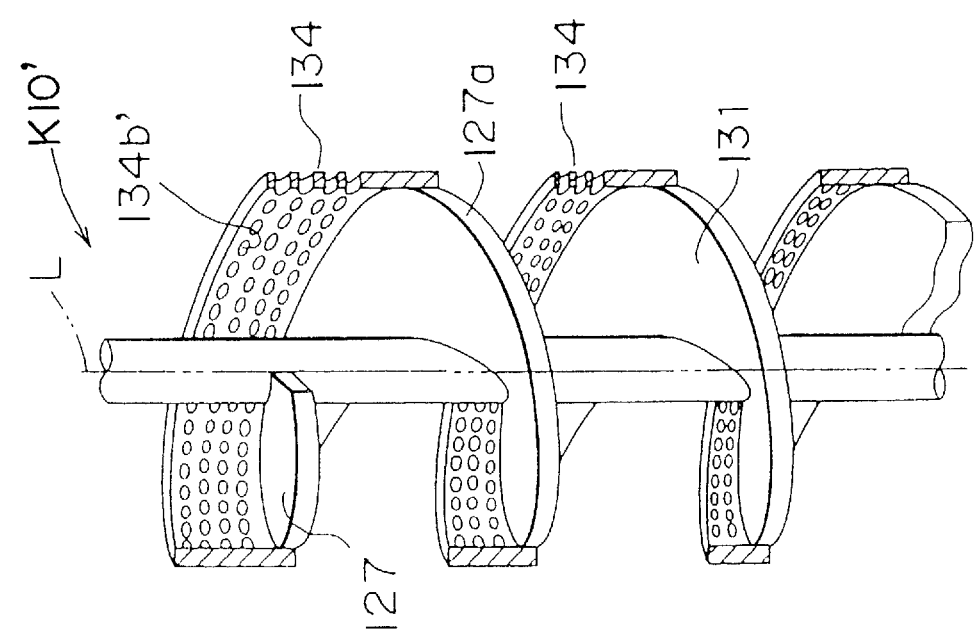
Figure 62:
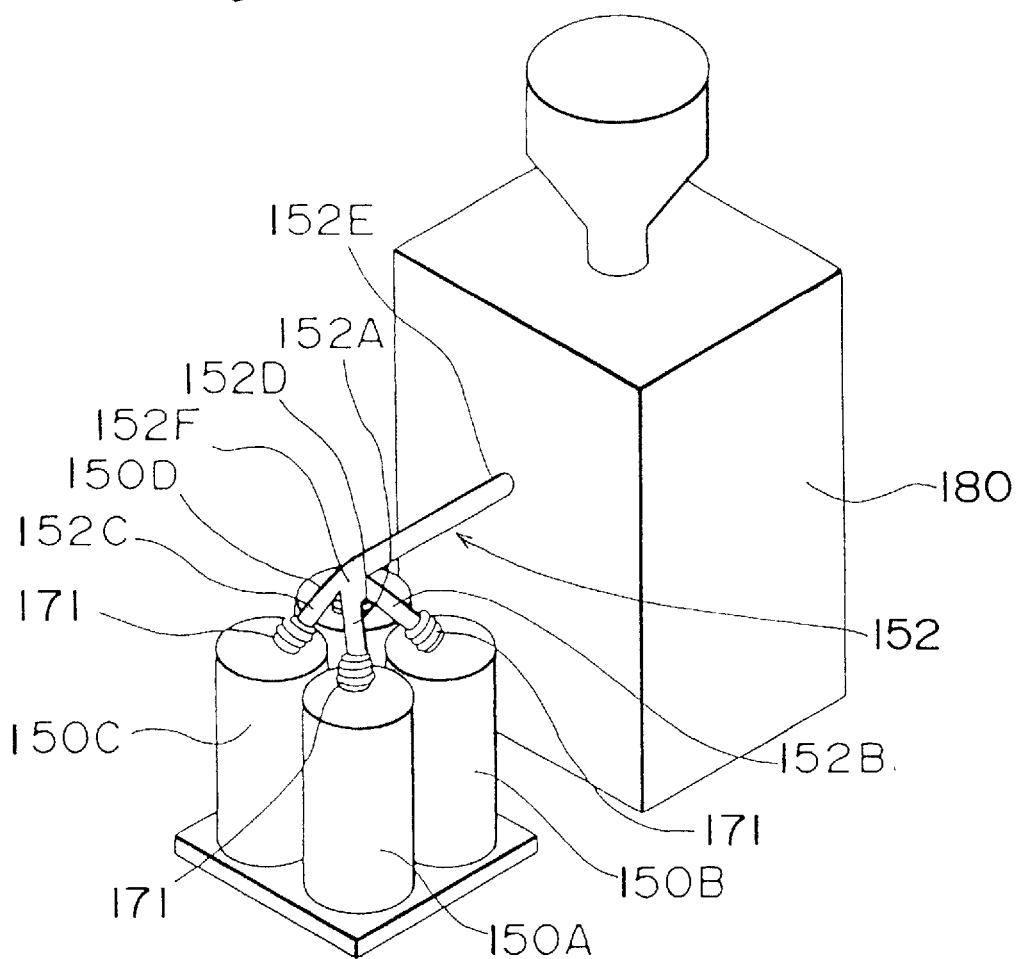
FIG. 62 is a perspective view of an example for using the transfer device of FIG. 33.
Figure 63:
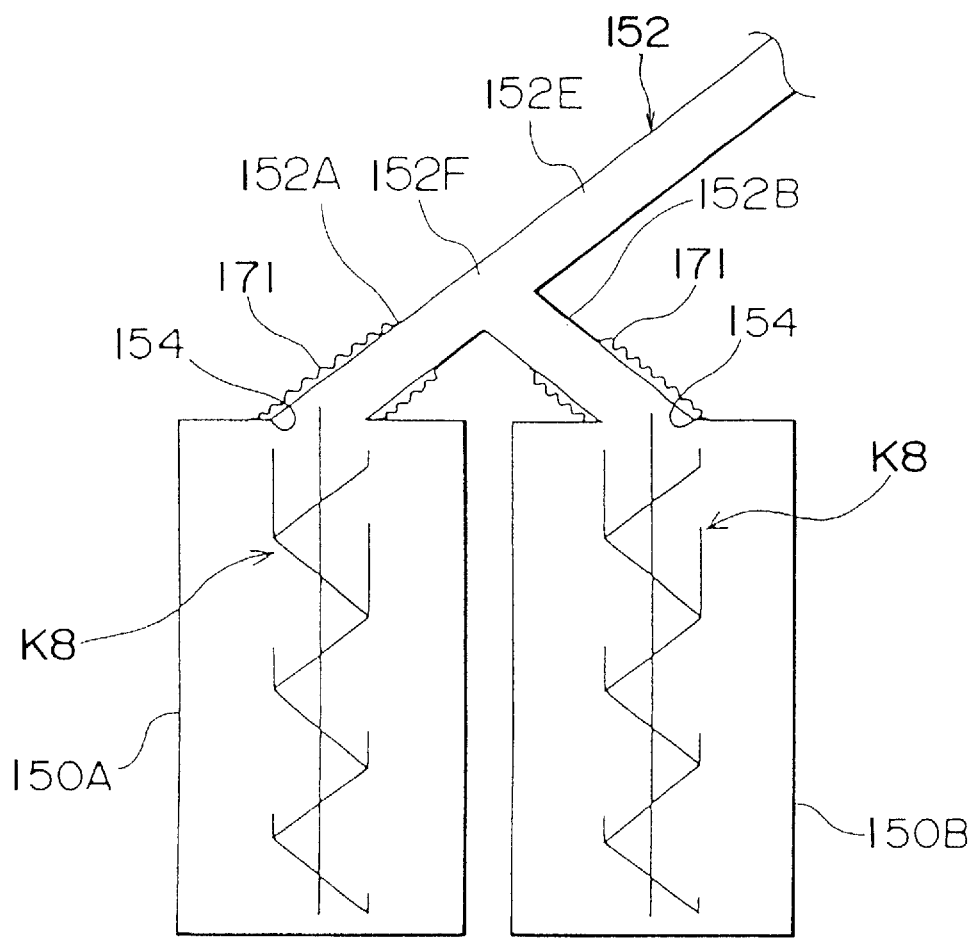
FIG. 63 is a fragmentary schematic sectional view of FIG. 62.

In the transfer device K10, the net member 153 acts as the side wall member 134 to facilitate exceptional air permeability. FIG. 60 shows a first modification K10 of the transfer device K10, in which a number of venting holes 134b' are formed on a side wall member 134 made of resin. Alternatively, FIG. 61 shows a second modification K10" of the transfer device K10, in which the side wall member 134 is formed by a punching metal 163 having a number of venting holes 163a.

Pigs. 62 to 65 show another example for using the transfer device K8. In this example, the transfer device K8 of the present invention is mounted on each of four vessels 150A, 150B, 150C and 150D. Four branches 152A, 152B, 152C and 152D of a branch pipe 152 for supplying the tablets 13 from a device 180 are, respectively, connected with the transfer devices K8 of the vessels 150A to 150D. A bellows-like tubular member 171 made of nylon or the like is attached to a mouth 154 of each of the vessels 150A to 150D sealing the interior of each of the vessels 150A to 150D.

Figure 64:
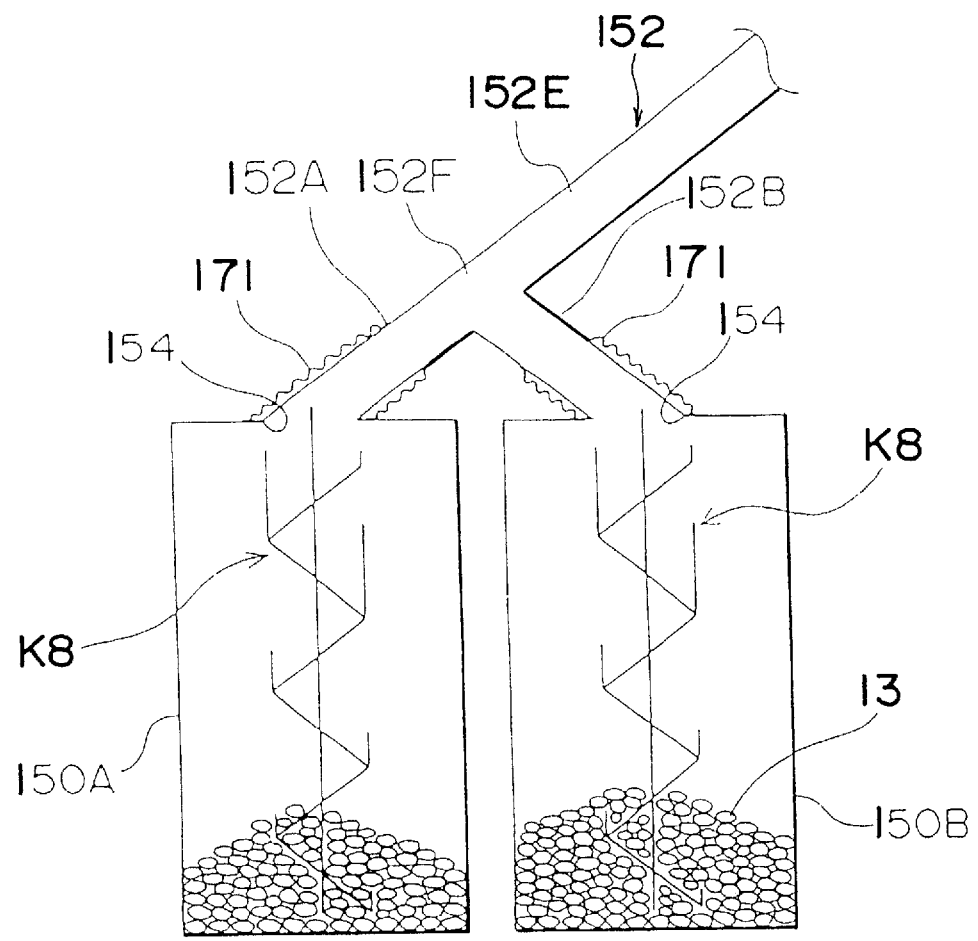
FIGS. 64 and 65 are fragmentary schematic sectional views explanatory of operation in another example of FIG. 62 for using the transfer device of FIG. 33.
Figure 65:
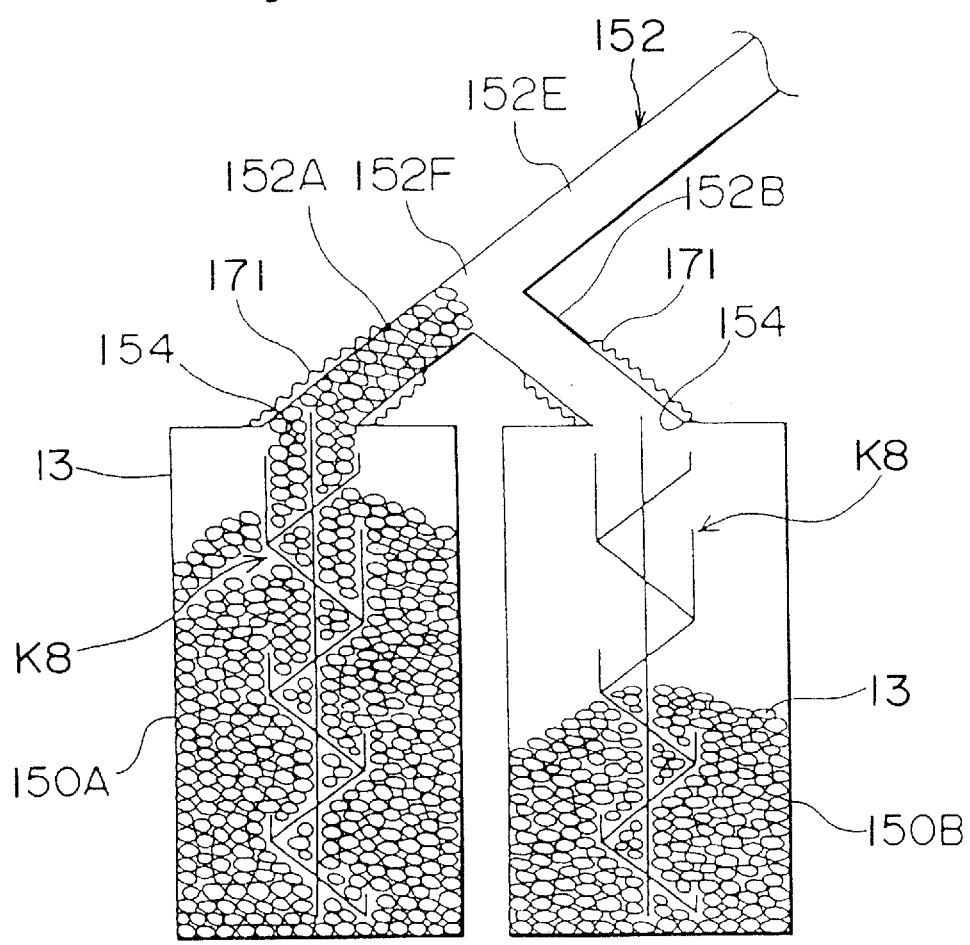

The tablets 13 supplied from the device 180 as shown in FIG. 64 are passed through a main pipe 152E of the branch pipe 152 reaching a branch portion 152F of the branch pipe 152. In turn, tablets 13 are carried into one of the branches 152A to 152D at the branch portion 152F in accordance with the inertial force of the tablets 13. Furthermore, the tablets 13 are fed from one of the branches 152A to 152D to a corresponding transfer device K8 so as to be supplied into a corresponding vessel 150A to 150D. When one of the vessels 150A to 150D and a corresponding one of the branches 152A to 152D, for example, the vessel 150A and the branch 152A, have been filled with the tablets 13 as shown in FIG. 65, a region from the branch portion 152F to the vessel 150A is closed by the tablets 13. Therefore, the tablets 13 delivered subsequently from the device 180 to the branch portion 152F cannot flow into the branch 152A leading to the vessel 150A filled with the tablets 13. The tablets 13 are, thus, supplied into other vessels 150B to 150D which are not filled with the tablets 13.

Therefore, in this example, a switching damper for selecting one of the branches 152A to 152D, to which the tablets 13 are carried from the main pipe 152E, is not required at the branch portion 152F. When all the vessels 150A to 150D have been filled with the tablets 13, the branch pipe 152 and the transfer devices K8 are pulled upwardly from the vessels 150A to 150B. The tablets 13 remaining in the branches 152A to 152D can be accommodated in an upper air gap of each of the vessels 150A to 150D. By employing the transfer devices K8 as described above, a large amount of tablets 13, which are likely to crack and chip in a closed state, can be automatically supplied into a plurality of vessels without using a switching device or a vessel moving device. Furthermore, even the tablets 13 in the branches can be accommodated in the vessels in a closed state by tilting, vibrating or upwardly pulling the transfer devices K8.

As is clear from the foregoing description, the following effects are gained in the transfer devices K8 to K15. The side wall member projects upwardly from the entire outer peripheral edge of the helical vane projecting helically from the central shaft in the guide member. In addition, the transfer device is vertically fixed in the vessel such that the lower end of the transfer device is disposed in the vicinity of the bottom portion of the vessel. Therefore, as the amount of solid articles supplied into the transfer device is increased, upwardly from the lower end portion of the guide member towards the upper end portion of the guide member so as to be supplied into the vessel. Accordingly, as the amount of the solid articles stored in the vessel increases, the location of fall of the solid articles to be supplied is displaced gradually upwardly. As a result, since the falling distance of the solid articles is small, it is possible to prevent flaws, cracks and chips on the surfaces of the solid articles at the time of supply of the solid articles from the transfer device into the vessel.

Meanwhile, as the amount of solid articles supplied as described above is increased further, the solid articles ride over the side wall member sequentially upwardly from the lower end portion of the guide member towards the upper end portion of the guide member. Therefore, the direction in which the solid articles are discharged from the transfer device into the vessel rotates about the axis of the central shaft. Accordingly, the solid articles can be stored in the vessel uniformly. Furthermore since the solid articles ride over the helical side wall member sequentially upwardly from the lower end portion of the guide member towards the upper end portion of the guide member to be discharged into the vessel, the solid articles can be supplied into the vessel continuously, thereby resulting in a high supply efficiency of solid articles. Furthermore, since the transfer device does not require a drive mechanism or a control mechanism, the transfer device is not only structurally simple but is also compact, thereby resulting in a low production cost of the transfer device.

Meanwhile, setting the height of the side wall member to a level larger than the height of the layers of the solid articles formed, in accordance with supply amount of the solid articles per unit time, on the helical vane will prevent the solid articles from falling over the side wall member at the upper end portion of the guide member before the lower end of the transfer device is closed by the solid articles.

By gradually increasing the height of the side wall member from the lower end portion of the guide member towards the upper end portion of the guide member, the location for discharging, including even solid articles having a large surface roughness, e.g., uncoated tablets, rises in response to the increase of the amount of solid articles filled in the vessel. Thus, it is possible to prevent the solid articles from falling from a high location.

The height of the side wall member may be set to be larger than the height of the layers of solid articles formed, in accordance with supply amount of the solid articles per unit time at the time of closure of the lower end of the transfer device, on the helical vane. In this case, when the solid articles flow into the vessel by riding sequentially upwardly over the side wall member from the lower end portion of the guide member after the lower end of the transfer device has been closed by the solid articles, it is possible to prevent the solid articles from falling at the upper end portion of the side wall member.

Forming one or a half pitch of a side wall as a blind wall at an upper end portion of the helical vane will prevent the occurrence of the phenomenon in which solid articles fall into the vessel by riding over the side wall member at the upper end portion of the guide member in spite of the fact that the height of the solid articles stored in the vessel is low.

If the central shaft of the guide member is formed by the resinous outer peripheral portion fitted around the metallic core, the guide member has high strength. Meanwhile, if the helical vane is integrally projected from the resinous outer peripheral portion of the central shaft, there is no joint between the central shaft and the helical vane. Thus, damage to the solid articles by the joint between the central shaft and the helical vane is prevented.

Where the opposite ends of the rod provided at the upper end portion of the central shaft of the guide member are detachably brought into engagement with the slots formed in the side wall member such that the guide member is fixed in the side wall member, the guide member can be easily removed from the side wall member. Thus, maintenance of the transfer device such as rinsing and inspections of the transfer device can be performed easily.

Furthermore, damage to the solid articles caused when the solid articles supplied to the transfer device strike the rod can be prevented if and outer peripheral portion made of silicone rubber is fitted around the metallic core of the rod.

Where, the distal end of the side wall member is tapered, the solid articles can ride smoothly over the side wall member without being caught by the distal end of the side wall member. Therefore, if the solid articles are further supplied to the transfer device when the lower end of the transfer device is already closed by accumulated solid articles and when the layers of solid articles are already formed on the helical vane, the solid articles can ride sequentially upwardly over the side wall member from the lower end portion of the guide member towards the upper end portion of the guide member so as to flow into the vessel.

If the side wall member is made of transparent resin, the solid articles flowing on the helical vane can be visually inspected.

Where a plurality of venting holes are formed on the side wall member, the air permeability of the solid articles flowing on the helical vane is improved. Thus, it is possible to prevent the solid article to be supplied from being damped.

Using a side wall member formed by a cylindrical net member having openings at interval, results in a further improvement of the solid articles, air permeability. Furthermore, even if the net member is separated from the guide member, the net member maintains its cylindrical shape. Thus, maintenance of the transfer device such as rinsing and inspection of the transfer device can be performed easily.

Where the guide face of the helical vane is inclined upwardly from the central shaft towards the inner peripheral surface of the side wall member, the layers of the solid articles are less likely to form on the helical vane even after the lower end of the transfer device has been closed by solid articles. Therefore, even in the case where the supply amount of the solid articles per unit time is increased, the solid articles are less likely to fall from the side wall member at the upper end portion of the guide member. Accordingly, the supply efficiency of the solid articles can be improved by increasing the supply amount of solid articles per unit time.

By providing a frame member which includes a rod disposed outside the side wall member the strength of the side wall member can be increased.

If the rod of the frame member includes a metallic core, the strength of the frame member can be increased. While, since the outer peripheral portion of the rod is made of resin, damage to the solid articles is prevented even if the solid articles flowing into the vessel by riding over the side wall member strike the rod.

Where the mounting means for mounting the transfer device on the opening of the vessel is provided, the transfer device can be removed from the vessel after the solid articles have been supplied into the vessel.

A hopper and a closure for closing half of the lower end opening of the hopper may be coupled with the upper end of the side wall member. The closure is disposed at a location corresponding to the lower half of one pitch of the helical vane from the upper end of the helical vane.

Where the lower end opening of a chute is provided, not only to deviate from the central shaft, but also to be disposed in the vicinity of the upper face of the helical vane, the falling distance of the solid articles from the lower end opening of the chute to the upper face of the helical vane is short. As a result, the solid articles do not strike the upper face of the helical vane hard, thus damage to the solid articles can be prevented.

A transfer device, in which the side wall member projects upwardly from the entire outer peripheral edge of a helical vane projecting helically from the central shaft, may be detachably mounted on the vessel. If the solid articles are supplied from the transfer device into the vessel, the solid articles can be stored uniformly in the vessel, intact, by preventing flaws, cracks and chips on the surfaces of the solid articles.

What is claimed is:

1. A transfer device for transferring solid articles into a vessel by gravity, comprising:
    a guide member adapted to be vertically erected on the vessel such that a lower end of said guide member is disposed adjacent to a bottom portion of the vessel, said guide member including a central shaft and a helical vane projecting from an outer peripheral surface thereof, said helical vane being adapted to transfer a layer of solid articles to be formed thereon as a function of an amount of solid articles to be delivered into the vessel per unit time, said lower end of said guide member adapted to be closed by an accumulation of solid articles; and
    a side wall extending along an entire outer periphery of said helical vane so as to project upwardly from an upper face thereof, said side wall having a height greater than that of the layer of solid articles transferred on said helical vane, said height of said side wall also being greater than that of the layer of solid articles formed at the time said lower end of said guide member is closed by an accumulation of solid articles, and said height of said side wall increasing from said lower end towards an upper end of said guide member.

2. A transfer device as claimed in claim 1, wherein said side wall is made of transparent resin.

3. A transfer dev ice as claimed in claim 1, wherein said side wall includes a blind wall formed around an upper half of an uppermost pitch of said helical vane so as to close an opening between two vertically neighboring portions of said side wall.

4. A transfer device as claimed in claim 1, wherein said side wall includes a blind wall formed around an entirety of an uppermost pitch of said helical vane so as to close an opening between two vertically neighboring portions of said side wall.

5. A transfer device as claimed in claim 1, wherein said central shaft includes a metallic core and a resinous outer peripheral portion fitted around said metallic core such that said helical vane projects integrally from said resinous outer peripheral portion of said central shaft.

6. A transfer device as claimed in claim 1, wherein said side wall is provided separately from said guide member and is of a cylindrical shape having opposite open ends, said side wall being continuously formed with a helical opening; and further comprising:
    a rod provided at an upper end portion of said central shaft and having opposite ends;
    a pair of slots provided at an upper end of said side wall; and
    said guide member being inserted into said side wall and said opposite ends of said rod being detachably engaged with respective said slots such that said guide member is fixed in said side wall.

7. A transfer device as claimed in claim 6, wherein said rod includes a metallic core and an silicone rubber outer peripheral portion fitted around said metallic core.

8. A transfer device as claimed in claim 1, wherein said side wall has a tapered end.

9. A transfer device as claimed in claim 1, wherein said side wall has a plurality of venting holes.

10. A transfer device as claimed in claim 1, wherein said side wall is formed by a cylindrical net member in which openings of a predetermined length are formed helically at a predetermined interval.

11. A transfer device as claimed in claim 1, wherein a guide face of said helical vane is inclined upwardly from said central shaft towards an inner peripheral surface of said side wall.

12. A transfer device as claimed in claim 1, further comprising:
    at least one frame member including a rod disposed outside said side wall parallel with said central shaft and a coupling portion joining said rod and an outside portion of said side wall.

13. A transfer device as claimed in claim 1, further comprising:
    at least one frame member formed by a rod disposed outside said side wall parallel with said central shaft, said rod being coupled with an outside portion of said side wall by a screw or an adhesive.

14. A transfer device as claimed in claim 13, wherein said rod of said frame member is formed by a metallic core and a resinous outer peripheral portion fitted around said metallic core.

15. A transfer device as claimed in claim 1, further comprising:
    a mounting device detachably mounting said transfer device in an opening of the vessel.

16. A transfer device as claimed in claim 1, further comprising:

a hopper coupled with an upper end of said side wall for supplying the solid articles into said transfer device; and a closure provided at said upper end of said side wall closing a portion of a lower end opening of said hopper, said closure being disposed so as to close a lower half of an uppermost pitch of said helical vane.

17. A transfer device as claimed in claim 1, further comprising:

a chute for supplying the solid articles into said transfer device, said chute being coupled with an upper end of said side wall and disposed such that a lower end opening of said chute is offset from said central shaft such that said lower end opening is adjacent to an uppermost portion of said helical vane.

18. A transfer device as claimed in claim 1, further comprising:

a chute provided at a vertically intermediate position of said helical vane for laterally supplying the solid articles onto said helical vane.

19. A transfer assembly comprising a vessel having operatively connected thereto said transfer device of claim 1;

wherein said transfer device is mounted on a supply opening of said vessel.

20. A transfer device for transferring solid articles into a vessel by gravity, comprising:

a guide member adapted to be vertically erected on the vessel such that a lower end of said guide member is disposed adjacent to a bottom portion of the vessel, said guide member including a central shaft having a metallic core and a resinous outer peripheral portion fitted around said metallic core, and a helical vane projecting integrally from said resinous outer peripheral portion of said central shaft, said helical vane being adapted to transfer a layer of solid articles to be formed thereon as a function of an amount of solid articles delivered into the vessel per unit time; and a side wall extending along an entire outer periphery of said helical vane so as to project upwardly from an upper face thereof, said side wall having a height greater than that of the layer of solid articles to be transferred on said helical vane.

21. A transfer device as claimed in claim 20, wherein said side wall is made of transparent resin.

22. A transfer device as claimed in claim 20, wherein said side wall includes a blind wall formed around an upper half of an uppermost pitch of said helical vane so as to close an opening between two vertically neighboring portions of said side wall.

23. A transfer device as claimed in claim 20, wherein said side wall includes a blind wall formed around an entirety of an uppermost pitch of said helical vane so as to close an opening between two vertically neighboring portions of said side wall.

24. A transfer device as claimed in claim 20, wherein said side wall is provided separately from said guide member and is of a cylindrical shape having opposite open ends, said side wall being continuously formed with a helical opening; and further comprising:

a rod provided at an upper end portion of said central shaft and having opposite ends;

a pair of slots provided at an upper end of said side wall; and said guide member being inserted into said side wall and said opposite ends of said rod being detachably engaged with said respective slots such that said guide member is fixed in said side wall.

25. A transfer device as claimed in claim 24, wherein said rod includes a metallic core and an silicone rubber outer peripheral portion fitted around said metallic core.

26. A transfer device as claimed in claim 20, wherein said side wall has a tapered end.

27. A transfer device as claimed in claim 20, wherein said side wall has a plurality of venting holes.

28. A transfer device as claimed in claim 20, wherein said side wall is formed by a cylindrical net member in which openings of a predetermined length are formed helically at a predetermined interval.

29. A transfer device as claimed in claim 20, wherein a guide face of said helical vane is inclined upwardly from said central shaft towards an inner peripheral surface of said side wall.

30. A transfer device as claimed in claim 20, further comprising:

at least one frame member including a rod disposed outside said side wall parallel with said central shaft and a coupling portion joining said rod and an outside portion of said side wall.

31. A transfer device as claimed in claim 20, further comprising:

at least one frame member formed by a rod disposed outside said side wall parallel with said central shaft, said rod being coupled with an outside portion of said side wall by a screw or an adhesive.

32. A transfer device as claimed in claim 31, wherein said rod of said frame member is formed by a metallic core and a resinous outer peripheral portion fitted around said metallic core.

33. A transfer device as claimed in claim 20, further comprising:

a mounting device detachably mounting said transfer device in an opening of the vessel.

34. A transfer device as claimed in claim 20, further comprising:

a hopper coupled with an upper end of said side wall for supplying the solid articles into said transfer device; and a closure provided at said upper end of said side wall closing a portion of a lower end opening of said hopper, said closure being disposed so as to close a lower half of an uppermost pitch of said helical vane.

35. A transfer device as claimed in claim 20, further comprising:

a chute for supplying the solid articles into said transfer device, said chute being coupled with an upper end of said side wall and disposed such that a lower end opening of said chute is offset from said central shaft such that said lower end opening is adjacent to an uppermost portion of said helical vane.

36. A transfer device as claimed in claim 20, further comprising:

a chute provided at a vertically intermediate position of said helical vane for laterally supplying the solid articles onto said helical vane.

37. A transfer assembly comprising a vessel having operatively connected thereto said transfer device of claim 20;

wherein said transfer device is mounted on a supply opening of said vessel.

38. A transfer device for transferring solid articles into a vessel by gravity, comprising:

a guide member adapted to be vertically erected on the vessel such that a lower end of said guide member is disposed adjacent to a bottom portion of the vessel, said guide member including a central shaft and a helical vane projecting from an outer peripheral surface thereof, said helical vane being adapted to transfer a layer of solid articles to be formed thereon as a function of an amount of solid articles to be delivered into the vessel per unit time;

a side wall extending along an entire outer periphery of said helical vane so as to project upwardly from an upper face thereof and having a height greater than that of the layer of solid articles transferred on said helical vane, said side wall being provided separately from said guide member and having a cylindrical shape with opposite open ends, said side wall being continuously formed with a helical opening;

a first rod provided at an upper end portion of said central shaft and having opposite ends;

a pair of slots provided at an upper end of said side wall;

said guide member being inserted into said side wall and said opposite ends of said first rod being detachably engaged with respective said slots such that said guide member is fixed in said side wall.

39. A transfer device as claimed in claim 38, wherein said side wall is made of transparent resin.

40. A transfer device as claimed in claim 38, wherein said side wall includes a blind wall formed around an upper half of an uppermost pitch of said helical vane so as to close an opening between two vertically neighboring portions of said side wall.

41. A transfer device as claimed in claim 38, wherein said side wall includes a blind wall formed around an entirety of an uppermost pitch of said helical vane so as to close an opening between two vertically neighboring portions of said side wall.

42. A transfer device as claimed in claim 38, wherein said first rod includes a metallic core and an silicone rubber outer peripheral portion fitted around said metallic core.

43. A transfer device as claimed in claim 38, wherein said side wall has a tapered end.

44. A transfer device as claimed in claim 38, wherein said side wall has a plurality of venting holes.

45. A transfer device as claimed in claim 38, wherein said side wall is formed by a cylindrical net member in which openings of a predetermined length are formed helically at a predetermined interval.

46. A transfer device as claimed in claim 38, wherein a guide face of said helical vane is inclined upwardly from said central shaft towards an inner peripheral surface of said side wall.

47. A transfer device as claimed in claim 38, further comprising:

at least one frame member including a second rod disposed outside said side wall parallel with said central shaft and a coupling portion joining said second rod and an outside portion of said side wall.

48. A transfer device as claimed in claim 38, further comprising:

at least one frame member formed by a second rod disposed outside said side wall parallel with said central shaft, said second rod being coupled with an outside portion of said side wall by a screw or an adhesive.

49. A transfer device as claimed in claim 48, wherein said second rod of said frame member is formed by a metallic core and a resinous outer peripheral portion fitted around said metallic core.

50. A transfer device as claimed in claim 38, further comprising:

a mounting device detachably mounting said transfer device in an opening of the vessel.

51. A transfer device as claimed in claim 38, further comprising:

a hopper coupled with an upper end of said side wall for supplying the solid articles into said transfer device; and a closure provided at said upper end of said side wall closing a portion of a lower end opening of said hopper, said closure being disposed so as to close a lower half of an uppermost pitch of said helical vane.

52. A transfer device as claimed in claim 38, further comprising:

a chute for supplying the solid articles into said transfer device, said chute being coupled with an upper end of said side wall and disposed such that a lower end opening of said chute is offset from said central shaft such that said lower end opening is adjacent to an uppermost portion of said helical vane.

53. A transfer device as claimed in claim 38, further comprising:

a chute provided at a vertically intermediate position of said helical vane for laterally supplying the solid articles onto said helical vane.

54. A transfer assembly comprising a vessel having operatively connected thereto said transfer device of claim 38;

wherein said transfer device is mounted on a supply opening of said vessel.

55. A transfer device for transferring solid articles into a vessel by gravity, comprising:

a guide member adapted to be vertically erected on the vessel such that a lower end of said guide member is disposed adjacent to a bottom portion of the vessel, said guide member including a central shaft and a helical vane projecting from an outer peripheral surface thereof, said helical vane being adapted to transfer a layer of solid articles to be formed thereon as a function of an amount of solid articles to be delivered into the vessel per unit time;

a side wall extending along an entire outer periphery of said helical vane so as to project upwardly from an upper face thereof, said side wall having a height greater than that of the layer of solid articles transferred on said helical; and at least one frame member including a rod disposed outside said side wall parallel with said central shaft and a coupling portion joining said rod and an outside portion of said side wall.

56. A transfer device as claimed in claim 55, wherein said side wall is made of transparent resin.

57. A transfer device as claimed in claim 55, wherein said side wall includes a blind wall formed around an upper half of an uppermost pitch of said helical vane so as to close an opening between two vertically neighboring portions of said side wall.

58. A transfer device as claimed in claim 55, wherein said side wall includes a blind wall formed around an entirety of an uppermost pitch of said helical vane so as to close an opening between two vertically neighboring portions of said side wall.

59. A transfer device as claimed in claim 55, wherein said side wall has a tapered end.

60. A transfer device as claimed in claim 55, wherein a guide face of said helical vane is inclined upwardly from said central shaft towards an inner peripheral surface of said side wall.

61. A transfer device as claimed in claim 55, further comprising:

a mounting device detachably mounting said transfer device in an opening of the vessel.

62. A transfer device as claimed in claim 55, further comprising:

a hopper coupled with an upper end of said side wall for supplying the solid articles into said transfer device; and a closure provided at said upper end of said side wall closing a portion of a lower end opening of said hopper, said closure being disposed so as to close a lower half of an uppermost pitch of said helical vane.

63. A transfer device as claimed in claim 55, further comprising:

a chute for supplying the solid articles into said transfer device, said chute being coupled with an upper end of said side wall and disposed such that a lower end opening of said chute is offset from said central shaft such that said lower end opening is adjacent to an uppermost portion of said helical vane.

64. A transfer device as claimed in claim 55, further comprising:

a chute provided at a vertically intermediate position of said helical vane for laterally supplying the solid articles onto said helical vane.

65. A transfer assembly comprising a vessel having operatively connected thereto said transfer device of claim 55;

wherein said transfer device is mounted on a supply opening of said vessel.

* * * * *

UNITED STATES PATENT AND TRADEMARK OFFICE
CERTIFICATE OF CORRECTION

PATENT NO. : 5,868,234
DATED : February 9, 1999
INVENTOR(S) : Shuji MORIMOTO et al.

It is certified that error appears in the above-identified patent and that said Letters Patent is hereby corrected as shown below:

Title page, item [30] the Foreign Application Priority Data for the fifth listed application should read:
--Oct. 13, 1995   [JP]   Japan ................7-265067--.

Signed and Sealed this

Seventh Day of March, 2000

Attest:

Q. TODD DICKINSON

*Attesting Officer*    *Commissioner of Patents and Trademarks*